(12) United States Patent
Wippermann et al.

(10) Patent No.: US 10,708,570 B2
(45) Date of Patent: Jul. 7, 2020

(54) 3D MULTI-APERTURE IMAGING DEVICES, MULTI-APERTURE IMAGING DEVICE, METHOD FOR PROVIDING AN OUTPUT SIGNAL OF A 3D MULTI-APERTURE IMAGING DEVICE AND METHOD FOR CAPTURING A TOTAL FIELD OF VIEW

(71) Applicant: Fraunhofer-Gesellschaft zur Förderung der angewandten Forschung e.V., München (DE)

(72) Inventors: Frank Wippermann, Meiningen (DE); Andreas Brückner, Jena (DE); Andreas Bräuer, Schlöben (DE)

(73) Assignee: FRAUNHOFER-GESELLSCHAFT ZUR FÖDERUNG DER ANGEWANDTEN FORSCHUNG E.V., München (DE)

( * ) Notice: Subject to any disclaimer, the term of this patent is extended or adjusted under 35 U.S.C. 154(b) by 0 days.

(21) Appl. No.: 16/176,248

(22) Filed: Oct. 31, 2018

(65) Prior Publication Data

US 2019/0068950 A1 Feb. 28, 2019

Related U.S. Application Data

(63) Continuation of application No. PCT/EP2017/061028, filed on May 9, 2017.

(30) Foreign Application Priority Data

May 12, 2016 (DE) ........................ 10 2016 208 210

(51) Int. Cl.
*H04N 13/178* (2018.01)
*H04N 13/239* (2018.01)
*H04N 5/225* (2006.01)

(52) U.S. Cl.
CPC ......... *H04N 13/178* (2018.05); *H04N 5/2258* (2013.01); *H04N 13/239* (2018.05)

(58) Field of Classification Search
CPC ... H04N 13/178; H04N 5/2258; H04N 13/239
(Continued)

(56) References Cited

U.S. PATENT DOCUMENTS 9,240,049 B2 1/2016 Ciurea et al.
2003/0038876 A1 2/2003 Nagashima
(Continued)

FOREIGN PATENT DOCUMENTS

CN 101482693 A 7/2009
CN 103188424 A 7/2013
(Continued)

OTHER PUBLICATIONS

International Search Report and Written Opinion issued in application No. PCT/EP2017/061028 dated Sep. 18, 2017.
(Continued)

*Primary Examiner* — Jared Walker
(74) *Attorney, Agent, or Firm* — McClure, Qualey & Rodack, LLP.

(57) ABSTRACT

A 3D multi-aperture imaging device includes a plurality of image sensor areas. The 3D multi-aperture imaging device includes a first plurality of optical channels for projecting overlapping first partial fields of view of a total field of view on first image sensor areas of the image sensor and includes a second plurality of optical channels for projecting second partial fields of view of the total field of view overlapping each other and the first partial fields of view on second image sensor areas. The first and second pluralities of optical channels are arranged laterally offset from one another. The 3D multi-aperture imaging device includes a processor that is configured to receive image sensor data from the image
(Continued)

sensor that is configured to provide an output signal including a data header, wherein the data header includes information regarding the structure of the 3D multi-aperture imaging device.

24 Claims, 38 Drawing Sheets

(58) Field of Classification Search
USPC .................................................. 375/240.26
See application file for complete search history.

(56) References Cited

U.S. PATENT DOCUMENTS

| | | |
|---|---|---|
| 2009/0195640 A1 | 8/2009 | Kim et al. |
| 2010/0265385 A1 | 10/2010 | Knight et al. |
| 2011/0064327 A1 | 3/2011 | Dagher et al. |
| 2012/0013749 A1* | 1/2012 | Oberdoerster ....... H04N 5/3572 348/207.1 |
| 2012/0077522 A1* | 3/2012 | Mate .................. H04N 21/2187 455/456.3 |
| 2013/0147844 A1 | 6/2013 | Isozu et al. |
| 2014/0002726 A1 | 1/2014 | Rudmann et al. |
| 2014/0321712 A1 | 10/2014 | Ciurea et al. |
| 2016/0381348 A1 | 12/2016 | Hayasaka et al. |
| 2017/0111558 A1 | 4/2017 | Brueckner et al. |
| 2017/0118388 A1 | 4/2017 | Wippermann et al. |
| 2018/0084193 A1 | 3/2018 | Georgiev et al. |

FOREIGN PATENT DOCUMENTS

| | | |
|---|---|---|
| CN | 105493138 A | 4/2016 |
| DE | 102010031535 A1 | 1/2012 |
| DE | 102014213371 B3 | 8/2015 |
| JP | 2003143460 A | 5/2003 |
| JP | 2009182953 A | 8/2009 |
| JP | 2013122647 A | 6/2013 |
| JP | 2016500962 A | 1/2016 |
| TW | 200943936 A | 10/2009 |
| TW | 20121486 A | 4/2012 |
| TW | 201606354 A | 2/2016 |
| WO | 2011063347 A2 | 5/2011 |
| WO | 2015037211 A1 | 3/2015 |

OTHER PUBLICATIONS

International Preliminary Examination Report issued in issued in application No. PCT/EP2017/061028 dated Jul. 24, 2018.
Office Action issued in corresponding Taiwan patent application dated May 22, 2018.
Office Action issued in corresponding German patent application dated Jan. 24, 2017.
Japanese Office Action dated Feb. 6, 2020, issued in application No. JP 2018-559720.
English language translation of Japanese Office Action dated Feb. 6, 2020, issued in application No. JP 2018-559720.
Chinese Office Action dated Apr. 15, 2020, issued in application No. 201780043827.2.

* cited by examiner

Header — 1008d ~ 1008

Description data IV = correction data (optional)

H) Distortion
I) Vignetting
J) Defective pixels

Payload — 1012

K) Pixel-by-pixel image data
   a) Option color: each pixel has an allocated color according to the used image sensor (RGGB or RGBW or ...)

L)a) Pixel values continuously (size of each image can be derived from header data)
L)b) Start/stopp character string
L)c) Characterization of module and channel by uniquely allocatable nomenclatur M)a) Image data as RAW
M)b) Image data compressed
M)c) Image data de-mosaiced

Fig. 5b

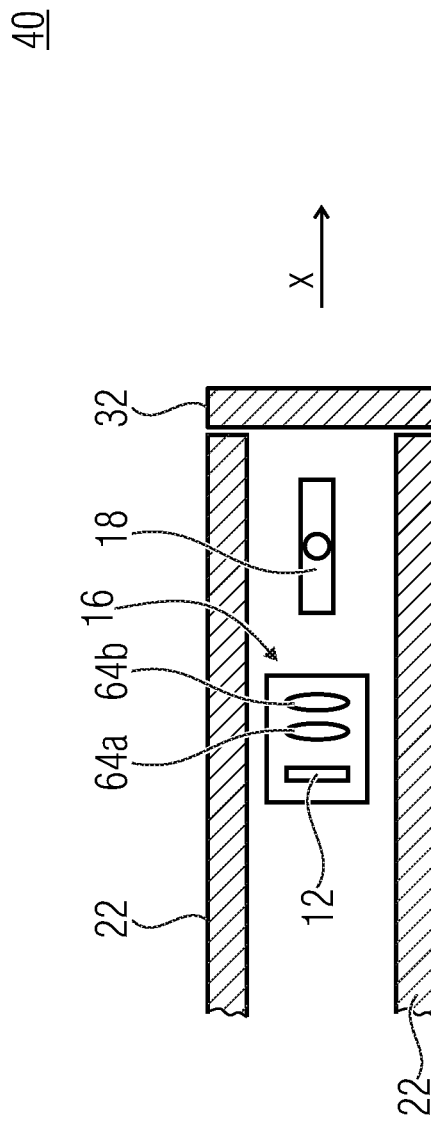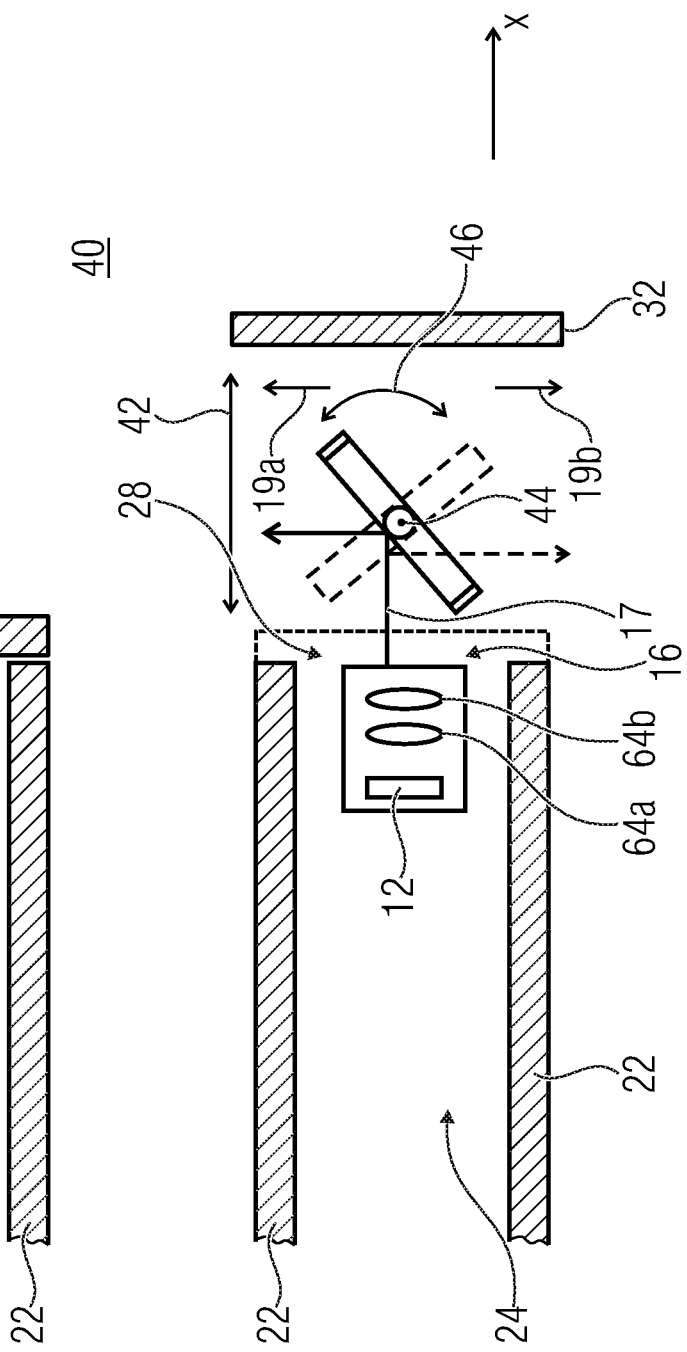

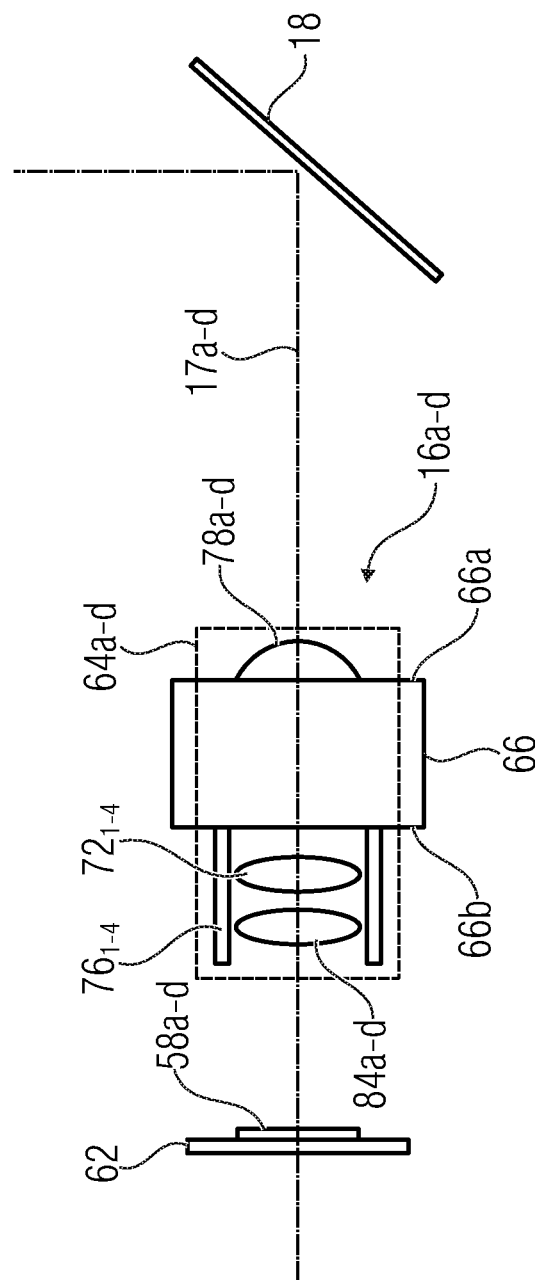

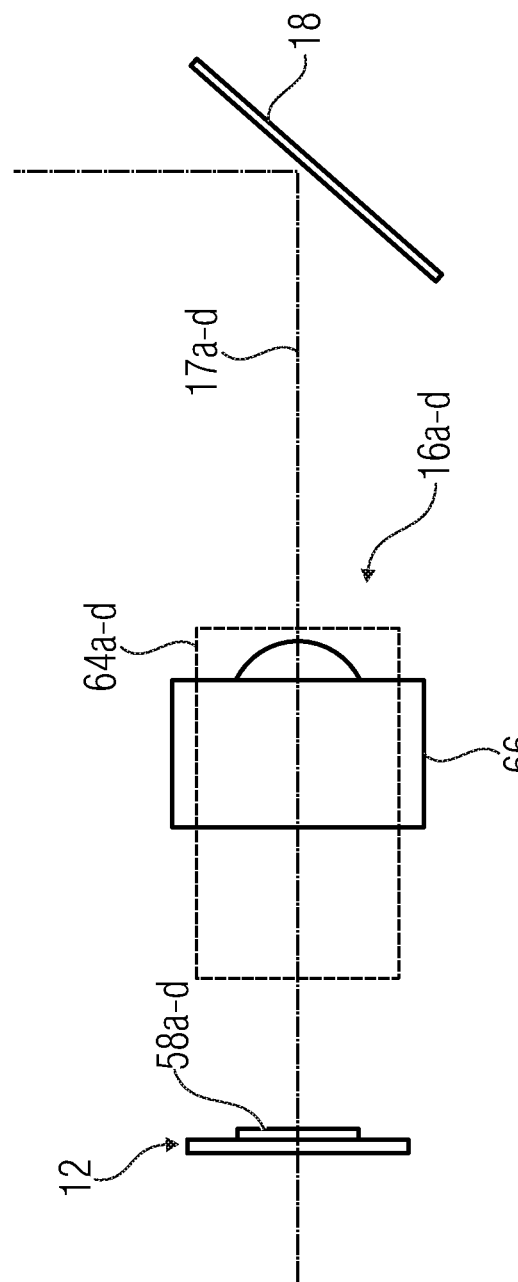

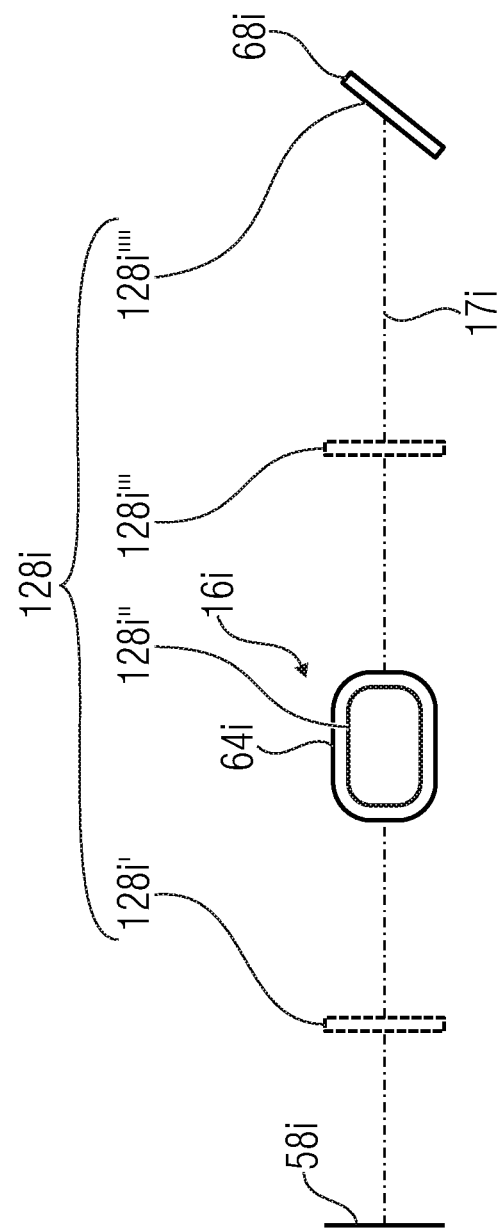

3D MULTI-APERTURE IMAGING DEVICES, MULTI-APERTURE IMAGING DEVICE, METHOD FOR PROVIDING AN OUTPUT SIGNAL OF A 3D MULTI-APERTURE IMAGING DEVICE AND METHOD FOR CAPTURING A TOTAL FIELD OF VIEW

CROSS-REFERENCE TO RELATED APPLICATIONS

This application is a continuation of copending International Application No. PCT/EP2017/061028, filed May 9, 2017, which is incorporated herein by reference in its entirety, and additionally claims priority from German Application No. 102016208210.8, filed May 12, 2016, which is also incorporated herein by reference in its entirety.

The present invention relates to 3D multi-aperture imaging devices and hence to multi-aperture imaging devices that are configured to capture a total field of view at least stereoscopically, to a method for providing an output signal of a 3D multi-aperture imaging device and to a method for capturing a total field of view.

BACKGROUND OF THE INVENTION

Conventional cameras transmit the total field of view in one channel and are limited as regards to their miniaturization. In mobile devices, such as smartphones, two cameras are used that are oriented in and opposite to the direction of the surface normal of the display. In some multi-aperture imaging systems, a contiguous partial field of view is allocated to each channel, which is transformed into a contiguous partial image area.

A concept allowing image processing of image data captured with 3D multi-aperture imaging devices and multi-aperture imaging devices would be desirable. Also, a concept allowing miniaturized devices for capturing a total field of view would also be desirable.

SUMMARY

According to an embodiment, a 3D multi-aperture imaging device may have: an image sensor with a plurality of image sensor areas, wherein each image sensor area includes a plurality of pixels; a first plurality of optical channels for projecting overlapping first partial fields of view of a total field of view on first image sensor areas of the image sensor; a second plurality of optical channels for projecting second partial fields of view of the total field of view overlapping each other and the first partial fields of view on second image sensor areas of the image sensor, wherein the first and second plurality of optical channels are arranged laterally offset from one another by a base distance; a processor that is configured to receive image sensor data from the image sensor including information on the first and second partial fields of view projected on the first and second plurality of image sensor areas and that is configured to provide an output signal including a data header and payload data, wherein the data header includes information regarding the structure of the 3D multi-aperture imaging device and wherein the payload data include image information acquired from the pixels of the first image sensor areas and the second image sensor areas; wherein the processor is configured to form the output signal such that the data header includes information regarding a pressure of an atmosphere surrounding the 3D multi-aperture imaging optics, an environmental temperature of the 3D multi-aperture imaging optics and/or an operating temperature of the 3D multi-aperture imaging optics According to another embodiment, a signal may have: a data header including information regarding a structure of a 3D multi-aperture imaging device, wherein the data header includes information regarding a pressure of an atmosphere surrounding the 3D multi-aperture imaging optics, an environmental temperature of the 3D multi-aperture imaging optics and/or an operating temperature of the 3D multi-aperture imaging optics; and payload data including image information acquired from pixels of first image sensor areas and second image sensor areas of the 3D multi-aperture imaging device, wherein the image information of the first and second image sensor areas each relate to a plurality of partial fields of view of a total field of view.

Another embodiment may have a device for processing an input signal including a data header and payload data, wherein the data header includes information regarding a structure of a 3D multi-aperture imaging device, wherein the data header includes information regarding a pressure of an atmosphere surrounding the 3D multi-aperture imaging optics, an environmental temperature of the 3D multi-aperture imaging optics and/or an operating temperature of the 3D multi-aperture imaging optics and wherein the payload data include image information acquired from pixels of first image sensor areas and second image sensor areas, wherein the image information of the first and second image sensor areas each relate to a plurality of partial fields of view of a total field of view, the device having: an input interface for receiving the input signal; and a processor for processing the payload data by considering the information regarding the structure of the 3D multi-aperture imaging device for at least first image sensor information of a first partial field of view of the partial fields of view and a second partial field of view of the partial fields of view.

According to another embodiment, a method for providing an output signal of a 3D multi-aperture imaging device may have the steps of: providing an image sensor with a plurality of image sensor areas, wherein each image sensor area includes a plurality of pixels; providing a first plurality of optical channels for projecting overlapping first partial fields of view of a total field of view on first image sensor areas of the image sensor; providing a second plurality of optical channels for projecting second partial fields of view of the total field of view overlapping each other and the first partial fields of view on second image sensor areas of the image sensor, wherein the first and the second plurality of optical channels are arranged such that the same are laterally offset from one another by a base distance; receiving image sensor data from the image sensor that include information on the first and second partial fields of view projected on the first and second plurality of image sensor areas; and generating the output signal, such that the output signal includes a data header and payload data, such that the data header includes information regarding the structure of the 3D multi-aperture imaging device and such that the payload data include image information acquired from the pixels of the first image sensor area and the second image sensor area; wherein the data header includes information regarding a pressure of an atmosphere surrounding the 3D multi-aperture imaging optics, an environmental temperature of the 3D multi-aperture imaging optics and/or an operating temperature of the 3D multi-aperture imaging optics.

A first aspect of the present invention is based on the knowledge that generating an output signal of a 3D multi-aperture imaging device is performed such that image information of pixels of the 3D multi-aperture imaging device are appropriately combined with meta information into an output signal, such that subsequent processing of the image information and/or changing the same is enabled independent of the 3D multi-aperture imaging device, wherein at the same time essential information of the structure of 3D multi-aperture imaging device can be considered and/or used. In that way, the concept of the output signal can be applied to different types of 3D multi-aperture imaging devices, even when the 3D multi-aperture imaging devices differ as regards to their structure.

A second aspect of the present invention is based on the knowledge that an orientation or position of adjacent partial fields of view of a total field of view can be varied or transformed with respect to an orientation or arrangement of adjacent optical channels of a multi-aperture imaging device in order to adapt the structure of a single-line array of optical channels to a device or a system in which the multi-aperture imaging device is installed without having to accept any limitations as regards to the total field of view to be captured.

According to an embodiment of the first aspect, a 3D multi-aperture imaging device includes an image sensor having a plurality of image sensor areas, wherein each image sensor area includes a plurality of pixels. The 3D multi-aperture imaging device includes a first plurality of optical channels for projecting overlapping first partial fields of view of a total field of view on first image sensor areas of the image sensor. The 3D multi-aperture imaging device includes a second plurality of optical channels for projecting second fields of view of the total field of view overlapping each other and the first partial fields of view on two image sensor areas of the image sensor. The first and second pluralities of optical channels are arranged laterally offset from one another by a base distance. The 3D multi-aperture imaging device includes a processor that is configured to receive image sensor data from the image sensor comprising information on the first and second partial fields of view projected on the first and second plurality of image sensor areas and that is configured to provide an output signal comprising a data header and payload data. The data header comprises information regarding the structure of the 3D multi-aperture imaging device. The payload data comprise image information acquired from the pixels of the first image sensor area and the second image sensor area.

It is an advantage of this embodiment that the payload data can be subsequently processed such that the information included in the data header regarding the structure of the 3D multi-aperture imaging device can be considered. Thus, for processing the image data, the structure of the 3D multi-aperture imaging device does not have to be completely known, since respective information can be obtained from the output signal. Thus, images of different 3D multi-aperture imaging devices can be processed and the differences can be extracted from the output signal itself.

According to a further embodiment, an image signal includes a data header comprising information regarding a structure of a 3D multi-aperture imaging device and payload data comprising image information acquired from pixels of first mage sensor areas and second image sensor areas of the 3D multi-aperture imaging device, wherein the image information of the first and second image sensor areas each relate to a plurality of partial fields of view of a total field of view.

It is advantageous that a structure and/or processing properties of the payload data can be represented by the data header, such that the image data of different 3D multi-aperture imaging devices, i.e. comprising a differing structure can be described by means of output signals that have the same structure which allows constant high-quality processing properties of the payload data.

According to a further embodiment, a device for processing an input signal comprising the features of the above-described output signal or image signal includes an input interface for receiving the input signal and a processor for processing the payload data by considering the information regarding the structure of the 3D multi-aperture imaging device for at least first image sensor information of a first partial field of view and a second partial field of view. It is an advantage of this embodiment that the device can receive and process input signals of 3D multi-aperture imaging devices having differing structures.

According to a further embodiment, a method for providing an output signal of a 3D multi-aperture imaging device comprises the following steps: providing an image sensor with a plurality of image sensor areas, wherein each image sensor area includes a plurality of pixels; providing a plurality of optical channels for projecting overlapping first partial fields of view of a total field of view on first image sensor areas of the image sensor; providing a second plurality of optical channels for projecting second partial fields of view of the total field of view overlapping each other and the first partial fields of view on second image sensor areas of the image sensor, wherein the first and second pluralities of optical channels are arranged such that the same are laterally offset from another by a base distance; receiving image sensor data from the image sensor, wherein the image sensor data comprise information on the first and second partial fields of view projected on the first and second plurality of image sensor areas; and generating the output signal such that the output signal comprises a data header and payload data, such that the data header comprises information regarding the structure of the 3D multi-aperture imaging device and such that the payload data comprise image information acquired from the pixels of the first image sensor area and the second image sensor area.

According to a further embodiment, a multi-aperture imaging device includes an image sensor with a plurality of image sensor areas, wherein each image sensor area includes a plurality of pixels. The multi-aperture imaging device includes a plurality of optical channels for projecting overlapping partial fields of view of a total field of view on image sensor areas of the image sensor. The plurality of optical channels forms a one-dimensional array, arranged along a first direction, while the partial fields of view of the (total) field of view form a one-dimensional array arranged along a second direction perpendicular to the first direction.

It is an advantage that extension directions of the optical channels and the partial optical areas and partial fields of view, respectively, can be arranged tilted or twisted with respect to one another in the total field of view, such that, for example, the multi-aperture imaging device can be arranged vertically in a device or a system, such as a vehicle, while the field of view extends horizontally.

According to a further embodiment, a method for capturing a total field of view comprises the following steps: arranging an image sensor with a plurality of image sensor areas, wherein each image sensor area includes a plurality of pixels; arranging a plurality of optical channels for projecting overlapping partial fields of view of the total field of view on image sensor areas of the image sensor. Arranging the plurality of optical channels is performed such that the plurality of optical channels forms a one-dimensional array arranged along a first direction, while the partial areas of the field of view form a one-dimensional array arranged along a second direction perpendicular to the first direction.

BRIEF DESCRIPTION OF THE DRAWINGS

Embodiments of the present invention will be detailed subsequently referring to the appended drawings, in which:

FIG. 5a-b is a schematic view of a structure of the output signal formed by the processor by considering a plurality of information sources according to an embodiment;

FIG. 12a is a schematic side-sectional view of a device according to an embodiment in the first operating state with a translationally displaceable cover;

FIG. 12b is a schematic side-sectional view of the device of FIG. 12a in the second operating state;

FIG. 19a-c are detailed illustrations of a multi-aperture imaging device according to an embodiment;

FIG. 19d-f are configurations of the multi-aperture imaging device according to FIG. 19a-c for the case of optics of optical channels held by a common carrier according to an embodiment;

FIG. 23a is a schematic view of a multi-aperture imaging device with an adjustment means for channel-individual adjustment of optical characteristics according to an embodiment;

DETAILED DESCRIPTION OF THE INVENTION

Figure 1A:
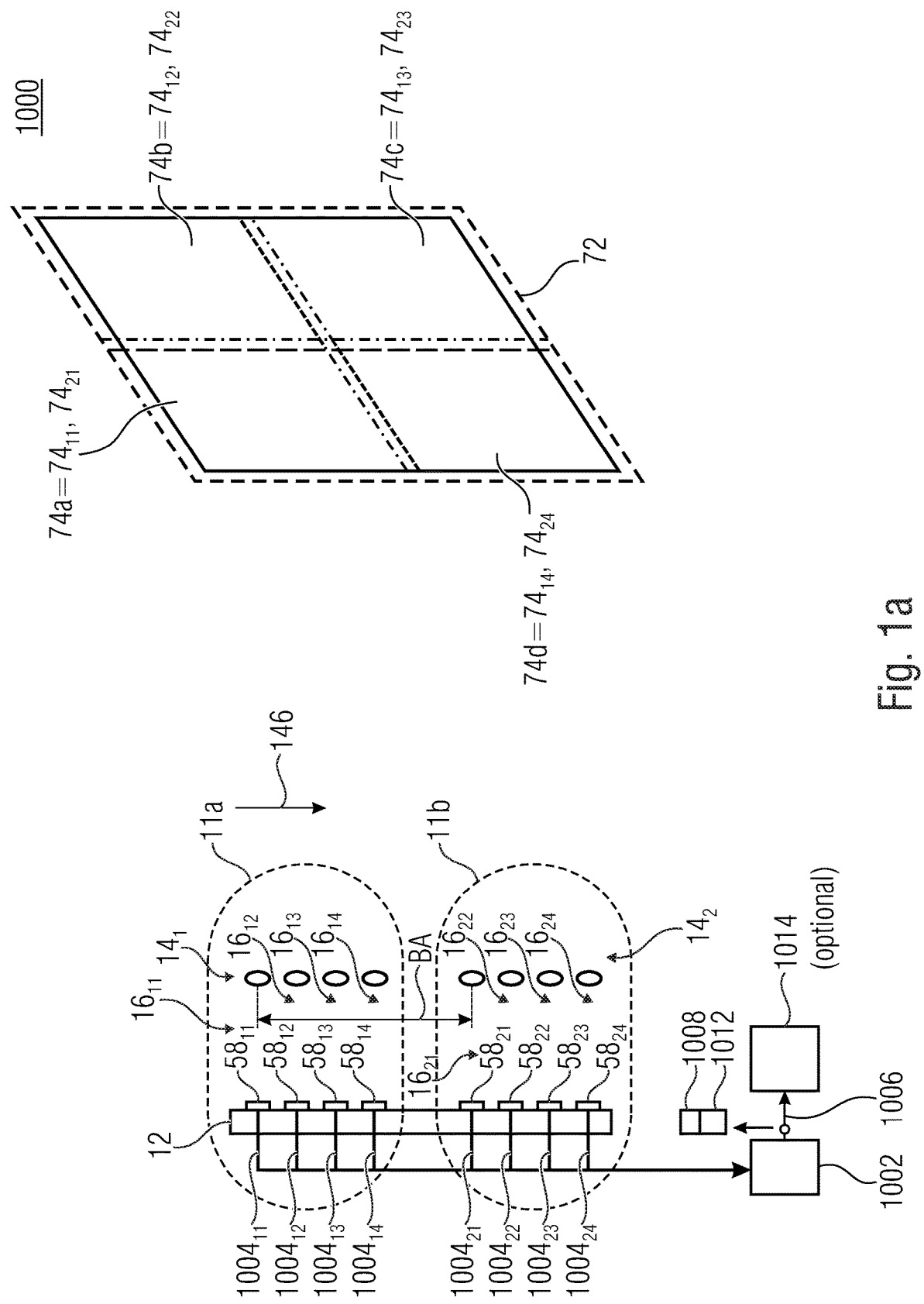
FIG. 1a is a schematic perspective view of a 3D multi-aperture imaging device according to an embodiment.

Before embodiments of the present invention will be discussed in detail below with reference to the drawings, it should be noted that identical, functionally equal or equal elements, objects and/or structures in the different figures are provided with the same reference numbers, such that the descriptions of these elements illustrated in the different embodiments are inter-exchangeable or inter-applicable.

The elements that are provided with a reference number that is provided with an index 1 at the first position from the left will subsequently belong to the first component 1 for the right channels, module 11a, of the apparatus 1000, and the elements provided with a reference number provided with an index 2 at the first position from the left hence belong to the second component 2 or second module 11b for the left channels, module 2, of the device 1000. Although the number of modules in FIG. 1b is two, the device could also have more that are arranged with respect to one another with a respective base distance.

Figure 1B:
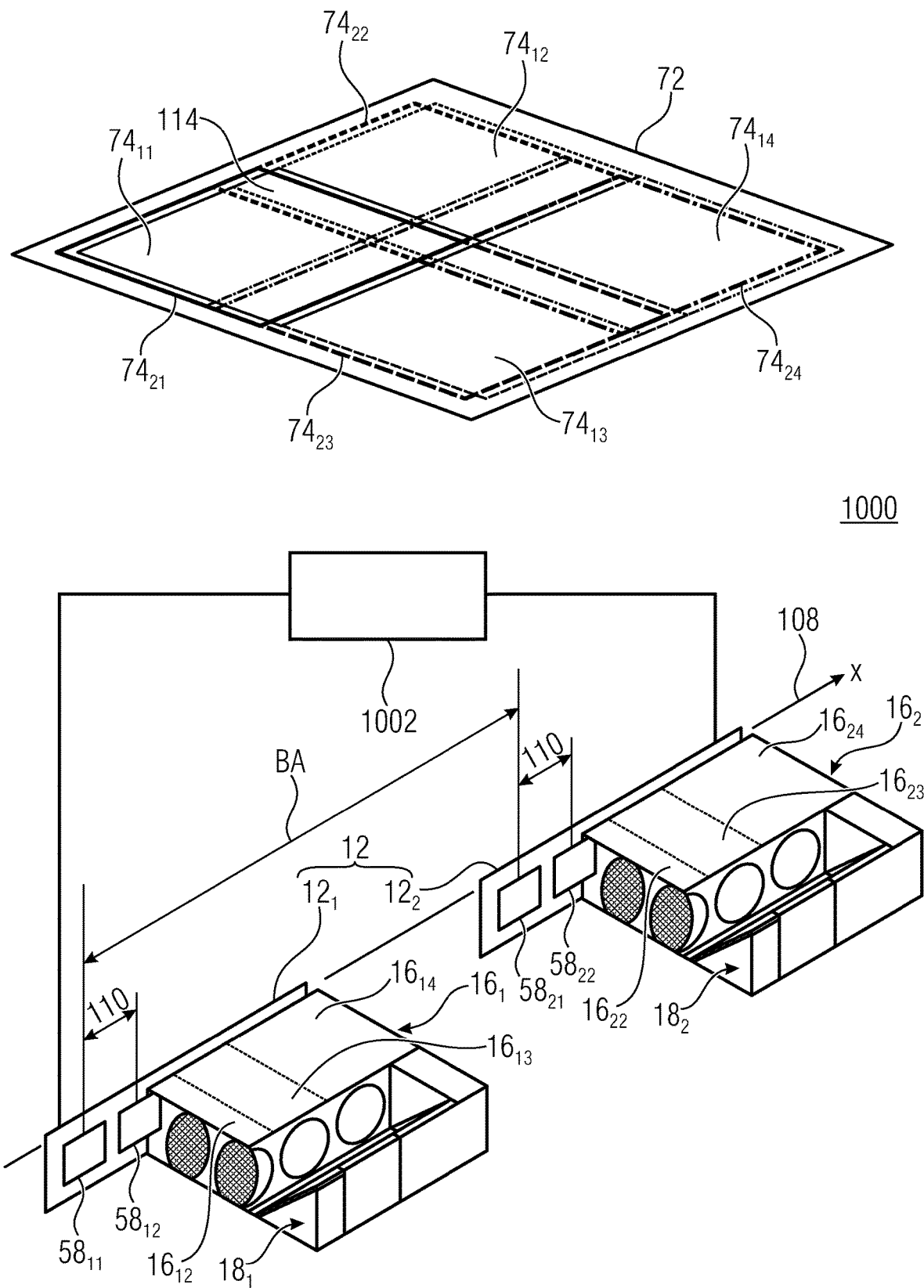
FIG. 1b is a 3D multi-aperture imaging device of FIG. 1a as it can be used according to embodiments described herein.

FIG. 1a shows a schematic perspective view of a 3D multi-aperture imaging device 1000. The 3D multi-aperture imaging device 1000 includes an image sensor 12. The image sensor 12 includes a plurality of image sensor areas $58_{11}$-$58_{24}$. Each of the image sensor areas $58_{11}$-$58_{24}$ includes a plurality of pixels, such that each of the image sensor areas $58_{11}$-$58_{24}$ is configured to capture a partial image of a total image. The total image can be considered as a projection of a total field of view 72.

The 3D multi-aperture imaging device 1000 can comprise, for example, two or more modules 11 or multi-aperture imaging devices 11. Each of the multi-aperture imaging devices 11a and 11b can be configured to project the total field of view at least almost completely or completely and to form a channel of an at least stereoscopic capturing system. Referring to a stereoscopic nomenclature, a first channel can, for example be a "right channel", while a second channel can be a "left channel". The determination left/right is not to have any limiting effect in this context, but can also be referred to by any other terms, such as top, bottom, central, front, back or the same.

For capturing, the 3D multi-aperture imaging device 1000 includes, for example, a first module 11a having a first plurality of optical channels $16_{11}$-$16_{14}$ that are arranged in an array $14_1$. Further, the 3D multi-aperture imaging device 1000 includes a second module 11b with a second plurality of optical channels $16_{21}$-$16_{24}$ that are arranged in a second array $14_2$. The modules 11a and 11b are arranged offset from one another by a base distance BA such that at least stereoscopic information can be derived based on a disparity obtained thereby.

Each of the optical channels $16_{11}$-$16_{24}$ is configured to capture a partial field of view 74a-74d and partial field of view 71a-74d of a total field of view 72, respectively. At least adjacent partial fields of view can overlap, for example the partial fields of view 74a and 74b or the partial fields of view 74b and 74c, but also diagonally adjacent partial fields of view, such as the partial fields of view 74a and 74c or 74b and 74d. The overlap can enable a simple calculation of the total image from partial images, in that the overlapping image areas allow a conclusion how the partial images are to be assembled, such as within a stitching method. In the illustrated arrangement of four partial areas 71a-74d that are arranged in two lines and two columns, all partial areas 71a-74d can overlap.

As illustrated by indices 11-14 and 21-24, the optical channel $16_{11}$ is configured, for example, to project the partial field of view 74a and $74_{11}$, respectively, on the image sensor area $58_{11}$. In a similar way, the optical channel $16_{21}$ is, for example, configured to project the partial field of view 74a and $74_{21}$, respectively, on the image sensor area $58_{21}$. In that way, each partial area 71a-74d is projected on two image sensor areas by two optical channels. Although, for example, the partial area 74a is illustrated such that same is projected completely by the module 11a as partial field of view $74_{11}$ and completely by the module 11b as partial field of view $74_{21}$, it is obvious that the partial fields of view $74_{11}$ and $74_{21}$ are not completely identical, for example due to production tolerances. Such effects, however, can be compensated by calibration or the same and will be neglected below.

The image sensor areas $58_{11}$-$58_{14}$ and the optical channels $16_{11}$-$16_{14}$ can be components of the first imaging module 11a, while the image sensor areas $58_{21}$-$58_{24}$ and the optical channels $16_{21}$-$16_{24}$ can be components of the second imaging module 11b. Each of the imaging modules 11a and 11b is, for example, configured to capture the total field of view 72, this means that the 3D multi-aperture imaging device can stereoscopically capture the total field of view 72 by means of modules 11a and 11b. This means that, for example, the partial fields of view $74_{21}$-$74_{22}$ captured by the optical channels $16_{21}$-$16_{24}$ can essentially correspond to the fields of view $74_{11}$-$74_{14}$, such that the partial fields of view $74_{21}$-$74_{24}$ that also overlap each other, essentially and completely, respectively, overlap the first partial fields of view $74_{11}$-$74_{14}$, which is represented by the designation 74a-74d.

The 3D multi-aperture imaging device includes a processor 1002 that is configured to receive image sensor data $1004_{11}$-$1004_{14}$ from the first module 11a and image sensor data $1004_{21}$-$1004_{24}$ from the second module 11b. The image sensor data $1004_{11}$-$1004_{24}$ can, for example, include the signal or sample values of the image sensor areas $58_{11}$-$58_{24}$ or also values derived therefrom, such as a pixel value or a color value. For example, the image sensor can be configured as a charge-coupled device (CCD), as complementary metal oxide semiconductor (CMOS) or as differently formed image sensor. The image sensor data $1004_{11}$-$1004_{24}$ can each be the output values of the respective sensor or partial sensor. Independent of the specific implementation, the image sensor data $1004_{11}$-$1004_{24}$ comprise information on the partial fields of view $74_{11}$-$74_{14}$ and $74_{21}$-$74_{24}$, respectively, projected on the image sensor areas $58_{11}$-$58_{14}$ and $58_{21}$-$58_{24}$.

The processor 1002 is configured to provide an output signal 1006 that comprises a data header 1008 and payload data 1012. The data header 1008 comprises information regarding the structure of the 3D multi-aperture imaging device 1000. The payload data 1012 comprise image information acquired from the pixels of the image sensor areas $58_{11}$-$58_{14}$ and $58_{21}$-$58_{24}$. These can be the image sensor data $1004_{11}$-$1004_{24}$ or information derived or processed therefrom, which will be discussed below in more detail. Thus, the output signal 1006 can be an image signal. Alternatively, the same can also be a video signal when several images of the total field of view are recorded as video.

Optionally, the 3D multi-aperture imaging device 1000 can comprise an output interface 1014 via which the output signal 1004 can be output. The output interface 1014 can, for example, be a wireless or wired interface. For example, the output interface 1014 can be connected permanently or temporarily to a memory, such as a hard drive or an external memory medium, such as a USB memory module (USB=Universal Serial Bus) or a memory card. Alternatively or additionally, the output interface 1014 can be configured to establish a wired or wireless connection to another device, such as a computer or laptop. As an alternative to the memory interface 1014, a memory module can be arranged.

Although the modules 11a and 11b are illustrated such that the optical channels $16_{11}$ and $16_{21}$ capture the partial field of view 74a, the optical channels $16_{12}$ and $16_{22}$ the partial field of view 74b, the optical channels $16_{13}$ and $16_{23}$ the partial field of view 74c and the optical channels $16_{14}$ and $16_{24}$ the partial field of view 74d and are arranged in the modules 11a and 11b in the same order along a line extension direction 146 of the arrays $14_1$ and $14_2$, the modules 11a and 11b can also be arranged in a differing order and/or can have a differing number. This means that the optical channel $16_{21}$ can capture a partial field of view 74a-74d differing from the optical channel $16_{11}$, that the optical channel $16_{22}$ can capture a partial field of view 74a-74d differing from the optical channel $16_{12}$, that the optical channel $16_{23}$ can capture a partial field of view differing from the optical channel $16_{13}$ and/or that the optical channel $16_{24}$ can capture a partial field of view 74a-74d differing from the optical channel $16_{14}$. This also means that the partial fields of view 74a-74b can be projected such that an equal constant disparity exists between optical channels that are directed on the same partial field of view 74a-74d, as described in FIG. 1a, or that, alternatively, different disparities can exist for different partial fields of view 74a-74d.

FIG. 1b shows the 3D multi-aperture imaging device 1000 as it can be used according to embodiments described herein. The image sensor 12 can be divided in two components $12_1$ and $12_2$, respectively, one component $12_1$ for the "right" optical channels $16_1$ and the other component $12_2$ for the "left" channels $16_2$. This means that the image sensor 12 of FIG. 1a can also be formed as several components wherein, for example, each module 11a and 11b can comprise one of the components.

In the example of FIG. 1b, the right and the left optical channels $16_1$ and $16_2$ are structured identically, but arranged laterally offset from one another by the base distance BA in order to obtain as much depth information as possible regarding the scene in the field of view of the device 1000.

In the exemplary case of FIG. 1b, each plurality $16_1$ and $16_2$ of optical channels comprises four juxtaposed optical channels. The individual "right" channels are distinguished by the second subscript index. Here, the channels are indexed from the right to the left. This means the optical channel $16_{11}$, not illustrated in FIG. 1b due to partial omission for clarity reasons, is, for example, arranged on the outer right edge along the base distance direction 1008, along which the left and right channels are arranged offset from one another by the base distance BA, i.e., furthest apart from the plurality $16_2$ of left channels, wherein the other right channels $16_{12}$-$16_{14}$ follow along the base distance direction 108. Thus, the channels $16_{11}$-$16_{14}$ form a single-line array of optical channels whose line extension direction corresponds to the base distance direction 108. The left channels $16_2$ are structured in the same way. The same are also distinguished by the second subscript index. The left channels $16_{21}$-$16_{24}$ are arranged beside one another and successively in the same direction as the right channels $16_{11}$-$16_{14}$, namely such that the channel $16_{21}$ is closest to the right channels and the channel $16_{24}$ furthest apart from the latter.

Each of the right channels $16_{11}$-$16_{14}$ includes respective optics that can consist of a lens system as indicated in FIG. 1b. Alternatively, each channel could comprise one lens. Each optical channel $16_{11}$-$16_{14}$ captures one of overlapping partial fields of view 74a-d and $74_{11\text{-}14}$, respectively, of the total field of view 72 that overlap each other as described in the context of FIG. 1a. The channel $16_{11}$ projects, for example, the partial field of view $74_{11}$ on an image sensor area $58_{11}$, the optical channel $16_{12}$ the partial field of view $74_{12}$ on an image sensor area $58_{12}$, the optical channel $16_{13}$ an allocated partial field of view $74_{13}$ on a respective image sensor area $58_{13}$ of the image sensor 12 not visible in FIG. 1b, and the optical channel $16_{14}$ an allocated partial field of view $74_{14}$ on a respective image sensor area $58_{14}$ also not shown in FIG. 1b since the same is concealed.

In FIG. 1b, the image sensor areas $58_{11}$-$58_{14}$ of the image sensor 12 and the components $12_1$ of the image sensor 12, respectively, are arranged in a plane parallel to the base distance direction BA and parallel to the line extension direction 108, respectively, and lens planes of the optics of the optical channels $16_{11}$-$16_{14}$ are also parallel to this plane. Additionally, the image sensor areas $58_{11}$-$58_{14}$ are arranged with a lateral inter-channel distance 110 with respect to each other, by which also the optics of the optical channels $16_{11}$-$16_{14}$ are arranged with respect to each another in that direction, such that the optical axes and optical paths of the optical channels $16_{11}$-$16_{14}$ run parallel to one another between the image sensor areas $58_{11}$-$58_{14}$ and the optics $16_{11}$-$16_{14}$. For example, centers of the image sensor areas $58_{11}$-$58_{14}$ and optical centers of the optics of the optical channels $16_{11}$-$16_{14}$ are arranged on the respective optical axis that runs perpendicular to the above-mentioned common plane of the image sensor areas $58_{11}$-$58_{14}$.

The optical axes and optical paths, respectively, of the optical channels $16_{11}$-$16_{14}$ are deflected by a beam-deflecting means $18_1$ and hence provided with a divergence that has the effect that the partial fields of view $74_{11}$-$74_{14}$ of the optical channels $16_{11}$-$16_{14}$ only partly overlap, e.g. in such a way that the partial fields of view $74_{11}$-$74_{14}$ overlap in pairs at the most by 50% in the spatial angle. As indicated in FIG. 1b, the beam-deflecting means $18_1$ can have, for example, one reflective facet for each optical channel $16_{11}$-$16_{14}$ that are tilted differently with respect to one another among the channels $16_{11}$-$16_{14}$. An average inclination of the reflective facets with respect to the image sensor plane deflects the total field of view of the right channels $16_{11}$-$16_{14}$ in a direction that is, for example, perpendicular to the plane where the optical axes of the optics of the optical channels $16_{11}$-$16_{14}$ run prior to and without beam deflection by the device $18_1$, respectively, or deviates from this perpendicular direction by less than 10°. Alternatively, the beam-deflecting means $18_1$ could also use prisms for refractive beam deflection of the individual optical axes and optical paths, respectively, of the optical channels $16_{11}$-$16_{14}$.

The beam-deflecting means $18_1$ provides the optical paths of the optical channels $16_{11}$-$16_{14}$ with a divergence such that the channels $16_{11}$-$16_{14}$ that are actually juxtaposed linearly in the direction 108 cover the total field of view 72 two-dimensionally or in a second direction perpendicular to the line extension direction 108.

It should be noted that the optical paths and optical axes, respectively, could also deviate from the described parallelism but that the parallelism of the optical paths of the optical channels could still be so distinct that the partial fields of view covered or projected on the respective image sensor areas $58_{11}$-$58_{14}$ by the individual channels $16_{11}$-$16_{14}$ would largely overlap without any measures, such as beam deflection, such that in order to cover a greater total field of view by the multi-aperture imaging device 1000 the beam-deflecting means 18 provides the optical paths with an additional divergence such that the partial fields of view of the channels $16_{11}$-$16_{14}$ overlap less. The beam-deflecting means $18_1$ has, for example, the effect that the total field of view comprises an aperture angle averaged across all azimuth angles and all transversal directions, respectively, that is greater than 1.5 times the respective average aperture angle of the partial fields of view of the optical channels $16_{11}$-$16_{14}$.

The left channels $16_{21}$-$16_{24}$ are structured in the same way as the right channels $16_{11}$-$16_{14}$ and are positioned in relation to the respective allocated image sensor areas $58_{21}$-$58_{24}$, wherein the optical axes of the optical channels $16_{21}$-$16_{24}$ running parallel to one another in the same plane as the optical axes of the channels $16_{11}$-$16_{14}$ are deflected by a corresponding beam-deflecting means $18_2$, such that the optical channels $16_{21}$-$16_{24}$ capture the same total field of view 72 almost congruently, namely in partial fields of view $74_{21}$-$74_{24}$ in which the total field of view 72 is two-dimensionally divided, that overlap each other, and each of which almost overlaps completely with the respective partial field of view $74_{11}$-$74_{14}$ of a respective channel of the right channels $16_{11}$-$16_{14}$. The partial field of view $74_{11}$ and the partial field of view $74_{21}$ overlap almost completely, the partial fields of view $74_{12}$ and $74_{22}$, etc. The image sensor areas $58_{11}$-$58_{24}$ can, for example, be formed of one image sensor chip each as described for the image sensor 12 in 1a, or can consist of a few image sensor chips, of two or only one common image sensor chip.

In addition to the above mentioned components, the 3D multi-aperture imaging device includes a processor 1002 that takes on the object of merging, for example, the images captured by the right optical channels $16_{11}$-$16_{14}$ during capturing by the 3D multi-aperture image device 1000 to a first total image. The problem that has to be solved here is the following: Due to the inter-channel distances 110 between adjacent channels of the right channels $16_{11}$-$16_{14}$, the images that have been captured during capturing by the channels $16_{11}$-$16_{14}$ in the image areas $58_{11}$-$58_{14}$ cannot be simply and translationally shifted with respect to one another and placed on top of one another. In other words, the same cannot be easily joined. The lateral offset along the direction BA, 108 and 110, respectively, in the images of the image sensor areas $58_{11}$-$58_{14}$ when capturing the same scene that correspond but reside in different images is called disparity. The disparity of corresponding image content depends again on the distance of this image content in the scene, i.e., the distance of the respective object from the device 1000. The processor 1002 could try to evaluate disparities between the images of the image sensor areas $58_{11}$-$58_{14}$ in order to merge these images into a first total image, namely a "right total image". However, it is a disadvantage that the inter-channel distance 110 exists and thereby only causes the problem, but that the inter-channel distance 110 is also relatively low such that the depth resolution and estimation is merely inaccurate. Thus, trying to determine corresponding image contents in an overlap area between two images, such as in the overlap area 114 between the images of the image sensor areas $58_{11}$ and $58_{12}$, for example by means of correlation, is difficult.

Thus, for merging in the overlap area 114 between the partial fields of view $74_{11}$ and $74_{12}$, the processor of FIG. 1b uses disparities in a pair of images, one of which has been captured by one of the left channels $16_{21}$ or $16_{22}$, whose projected second partial field of view, namely $74_{21}$ and $74_{22}$, respectively, overlaps with the overlap area 114. For example, for merging the images of the image sensor areas $58_{11}$ and $58_{12}$, the processor 1002 evaluates disparities in images, one of which has been captured by one of the image sensor areas $58_{21}$ or $58_{22}$ and another one by one of the channels involved in the overlap area 114, i.e., an image that has been captured by one of the image sensor areas $58_{11}$ or $58_{12}$. Then, such a pair has a base distance according to the basic base distance BA plus/minus one or none of a channel base distance 110. The latter base distance is significantly greater than a single channel base distance 110, which is why disparities in the overlap area 86 are easier to determine for the processor 1002. Thus, for merging the images of the right channels, the processor 1002 evaluates disparities that result with an image of the left channel and advantageously but not exclusively between images of one of the right channels and one of the left channels.

More specifically, it is possible that the processor 1002 takes that part of the partial field of view $74_{11}$ that does not overlap with any of the other partial fields of view of the right channels more or less directly from the image $58_{11}$ and performs the same for non-overlapping areas of the partials fields of view $74_{12}$, $74_{13}$ and $74_{14}$ based on the images of the image sensor areas $58_{12}$-$58_{14}$, wherein the images of the image sensor areas $58_{11}$-$58_{14}$ have, for example, been captured simultaneously. Merely in the overlap areas of adjacent partial fields of view, such as the partial fields of view $74_{11}$ and $74_{12}$, the processor 1002 uses disparities from image pairs which overlap in the total field of view 72 in the overlap area, but of which, in the majority, not exclusively one has been captured by one of the right channels and the other one by one of the left channels, such as again at the same time.

According to an alternative procedure, it would also be possible that the processor 1002 warps all images of the right channel according to an evaluation of disparities between pairs of images, one of which has been captured by the right channels and the other one by the left channels. In this way, for example, the total image that is calculated by the processor 1002 for the images of the right channels could be warped virtually not only in the overlap area of the partial fields of view $74_{11}$-$74_{14}$ of the right channels but also in the non-overlapping area onto one viewing point that is, for example, laterally in the center between the right channels $16_{11}$-$16_{14}$, in that also for those areas of the partial fields of view $74_{11}$-$74_{14}$ that do not overlap, disparities from image pairs are evaluated by the processor 1002 where one image has been captured by one of the right channels and another image by one of the left channels.

The 3D multi-aperture imaging device 1000 of FIG. 1b is not only able to generate a total image from the images of the right channels, but the 3D multi-aperture imaging device 140 of FIG. 1b is able, at least in one operating mode, to generate, from a captured image, in addition to the total image of the first channel, also a total image of the images of the left channels and/or, in addition to the total image of the right channels, also a depth map.

According to the first alternative, the processor 1002 is configured, for example, to merge images that have been captured by the left optical channels $16_{21}$-$16_{24}$ and the image sensor areas $58_{21}$-$58_{24}$ to a second total image, namely a total image of the left channel and to use for this, in an overlap area of laterally adjacent ones of the partial fields of view $74_{21}$-$74_{24}$ of the left optical channels, disparities in a pair of images of which the plurality but not only one has been captured by one of the right optical channels $16_{11}$-$16_{14}$ and overlaps with the respective overlap area of the pair of partial fields of view $74_{21}$-$74_{24}$, and the other one is captured by one of the left optical channels in which the partial field of view overlaps with the respective overlap area.

According to the first alternative, for one picture, the processor 1002 outputs two total images, namely one for the right optical channels and the other for the left optical channels. These two total images could, for example, be supplied separately to the two eyes of a user and hence result in a three-dimensional impression of the captured scene.

According to the other above-mentioned alternative, the processor 1002 generates, in addition to the total image to the right channels, a depth map by using disparities in pairs of images comprising at least one pair for each of the right channels 16$_{11}$-16$_{14}$ that comprises an image that has been captured by the respective right channel and a further image that has been captured by one of the left channels.

In the embodiment where the depth map is generated by the processor 1002 it is also possible to perform the above-mentioned warping for all the images that have been captured by the right channels based on the depth map. Since the depth map comprises depth information across the total field of view 72, it is possible to warp all images that have been captured by the right channels, i.e., not only in the overlap areas of the same but also in the non-overlap areas of the same on a virtual common aperture point and a virtual optical center, respectively.

The two alternatives could also both be performed by the processor 1002, the same could first generate the two total images, namely one for the right optical channels and the other for the left optical channels as described above, by using, when merging the images of the right channels in the overlap areas between the images of the right channels, also disparities from pairs of images where one of them belongs to the images of the left channels and during merging the images of the left channels in the overlap areas between the images of the left channels using also disparities from pairs of images where one of them belongs to the images of the right channels in order to generate then, from the total images representing the scene in the total field of view from different perspectives, a total image with allocated depth map, such as a total image belonging to a virtual view and lying in a virtual optical center between the optical centers of the optics of the right and left optical channels, but possibly not exclusively at the center between the same. For calculating the depth map and for warping one of the two total images or warping and merging both total images into the virtual view, the processor 1002 then used the right and left total image, so to speak, as an intermediate result from the previous merging of the left and right individual images, respectively. Here, the processor evaluated disparities in the two intermediate result total images in order to obtain the depth map and in order to perform warping or warping/merging of the same.

It should be mentioned that the processor 1002 can perform evaluation of disparities in a pair of images, for example by means of cross-correlation of image areas.

It should be noted that with a different coverage of the total field of view 72 by the partial fields of view of the left channels on the one hand and by the partial fields of view of the right channels on the other hand possibly also more or less than four channels (irrespective of their allocation to the left or right channels) overlap each other, such as it was also the case, for example, at the mutual overlap between the overlap areas of partial fields of views of the previous examples adjacent in line direction or column direction, where the partial fields of view of the right channels as well as the partial fields of view of the left channels each have been arranged in columns and lines. Then, for the number of disparity sources it applies in general that the same are $$\binom{N}{2},$$

wherein N refers to the number of channels with overlapping partial fields of view.

In addition to the above description, it should be noted that the processor 1002 optionally also performs channel-by-channel correction of perspective imaging faults of the respective channel and/or an adaptation of the image brightness both in each channel and also between the channels.

It should be noted that the embodiment of FIG. 1*b* has merely been exemplary in many ways. This concerns, for example, the number of optical channels. For example, the number of right optical channels is not four but is somehow greater than or equal to 2 or is between 2 and 10, both inclusive, and the overlap area of the partial fields of view of the right optical channels can lie, as far as the pair with the greatest overlap to the respective partial field of view is considered for each partial field of view and each channel, respectively, in terms of surface area, for all these pairs between ½ and ¹⁄₁₀₀₀ of an average image size of the images captured by the image areas 58$_{11}$-58$_{14}$, measured, for example, in the image plane, i.e., the plane of the image sensor areas. The same applies, for example, for the left channels. However, the number can differ between the right channels and the left channels. This means that the number of left optical channels, $N_L$, and right optical channels, $N_R$, does not necessarily have to be the same and a segmentation of the total field of view 72 in the partial fields of view of the left channels and the partial fields of view of the right channels does not have to be the same as it was the case in FIG. 1*b*. Concerning the partial fields of view and their overlap it can be the case, for example, that the partial fields of view project into one another by at least 20, 100, 500 or 1000 pixels, when considering an image distance and object distance, respectively, of 10 m, at least for all pairs having the greatest overlap, wherein this can apply to both the right channels as well as to the left channels.

Above that, in contrary to the explanations above, it is not entailed that the left optical channels and the right optical channels, respectively, are formed in a single line. The left and/or the right channels could also form a two-dimensional array of optical channels. Moreover, it is not entailed that the single-line arrays have a collinear line extension direction. However, the arrangement of FIG. 1*b* is advantageous in that the same results in a minimum installation height perpendicular to the plane in which the optical axes of the optical channels, i.e., both of the right and the left channels run prior to and without beam deflection, respectively. Regarding the image sensor 12 it had already been mentioned that the same can be formed of one, two or several chips. For example, one chip could be provided per image sensor area 58$_{11}$-58$_{14}$ and 58$_{21}$-58$_{24}$, wherein in the case of several chips the same could be mounted on one or several boards such as one board for the left channels and the image sensors of the left channels, respectively, and one board for the image sensors of the right channels.

Thus, in the embodiment of FIG. 1*b*, it is possible to place adjacent channels within the channels of the right or left channels as densely as possible, wherein in the optimum case the channel distance 110 corresponds, approximately, to the lens diameter. This results in a lower channel distance and hence a lower disparity. The right channels on the one hand and the left channels on the other hand could be arranged to one another with any distance BA, such that great disparities can be realized. All in all, the option of an artifact-reduced or even artifact-free image fusion and production of depth maps having a passive optical imaging system results.

Compared to the above examples, it would be possible to use more than only two groups of channels $16_1$ and $16_2$, for example by a number of multi-aperture imaging devices that is greater than two. The number of groups could be indicated by N. Then, in this case, if the number of channels per group were equal and the segmentation of the total field of view into partial fields of view were the same for all groups, a number of disparity sources of $$\binom{2N}{2}$$

for example, would result per overlap area of partial fields of view of the group $16_1$. A different segmentation of the total field of view for the groups of channels is also possible, as has already been mentioned above.

Finally, it should be noted that in the above description merely the exemplary case was used that the processor 1002 merges the images of the right channels. The same process could be performed by the processor 1002 as mentioned above for both and all channel groups, respectively, or also for the left or the same.

Figure 2:
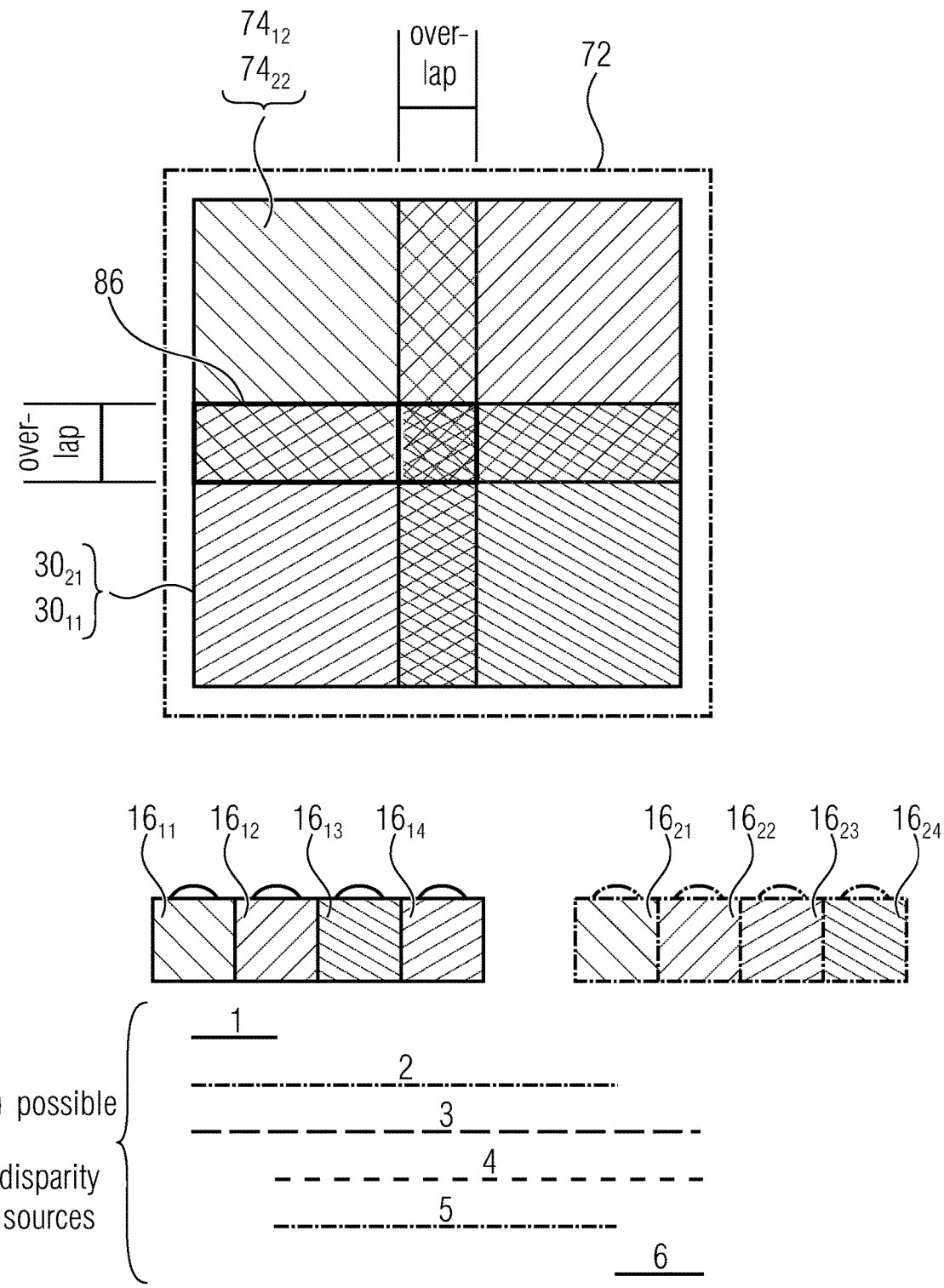
FIG. 2 is a schematic illustration of a concept as a basis for merging images according to embodiments described herein.

FIG. 2 shows additionally that the processor 1002 can use, as a basis for merging images that have been captured by a pair of image sensors on which a pair of optics of the left channels projects a pair of immediately adjacent partial fields of view, as it is exemplarily the case for the partial fields of view $74_{11}$ and $74_{12}$, beyond this pair of images also disparities in one or several of the further of all in all $$\binom{4}{2},$$

i.e., "two out of four", disparity sources, i.e., pairs of images of image sensor areas concerning disparities of scene objects in the overlap area between this pair of immediately adjacent partial fields of view. This is indicated exemplarily in FIG. 2 for the cross-hatched overlap area between the partial fields of view $74_{11}$ and $74_{12}$: Apart from the pair of images of the right channels $16_{11}$ and $16_{12}$ themselves (disparity source 1) to be merged, four pairs of images exist, one of which is projected by a right channel and one by a left channel on a respective image sensor area and captured by the latter (disparity source 2, 3, 4, 5), namely images captured by means of channels $16_{11}$ and $16_{21}$ (disparity source 2), images captured by means of channels $16_{11}$ and $16_{22}$ (disparity source 3), images captured by means of channels $16_{12}$ and $16_{22}$ (disparity source 4) and images captured by means of channels $16_{12}$ and $16_{21}$ (disparity source 5). Further, a pair of images exists of which both are projected by a left channel on a respective image sensor area and captured by the latter (disparity source 2, 3, 4, 5). The processor can use one or several of the additional sources 2 to 5 for supporting the merging. If the processor 1002 calculates, according to the alternative stated above, also a depth map for the total field of view 72, the processor can, according to the procedure, during merging of the image, determine the depth card at any point of the field of view 72 from the evaluation of the disparities from more than one pair of images, one of them projected by a right channel and one by a left channel on a respective image sensor area and captured by the latter, namely at points where another pair overlaps beyond the partial field of view of a right channel and the partial field of view of a left channel. In FIG. 2, this is merely the case at the overlap areas of partial fields of view of right channels that are identical with the partial fields of view of left channels due to the congruency, but in other embodiments this congruency might not exist.

The 3D multi-aperture imaging device of FIGS. 1a and 1b can, for example, be installed in a flat housing of a mobile device, such as a mobile phone. Here the plane of the image sensor areas $12_{11}$-$12_{14}$ and $12_{21}$-$12_{24}$ as well as any lens plane of the optics of the left and right channels can run parallel to a thickness direction of the flat housing. Due to the beam deflection by the beam-deflecting device $18_1$ and $18_2$, respectively, the total field of view of the 3D multi-aperture imaging device would, for example, be in front of a front side where, for example, a monitor of the mobile device is positioned or in front of a rear side of the mobile device.

Based on following FIGS. 3, 4, 5a, 5b and 6, it will be explained exemplarily what content or information can be included in the data header 1008 and/or the payload data 1012. Although the subsequent statements relate to the fact that the output signal 1006 comprises two components each, namely the data header 1008 and the payload data 1012, the data header 1008 and the payload data 1012 could also be arranged in an interlaced manner or in any order as long as an allocation of the respective content to the data header 1008 or the payload data 1012 is enabled. Further, the output signal 1006 can also comprise further components, such as serial numbers or checksums.

Figure 3:
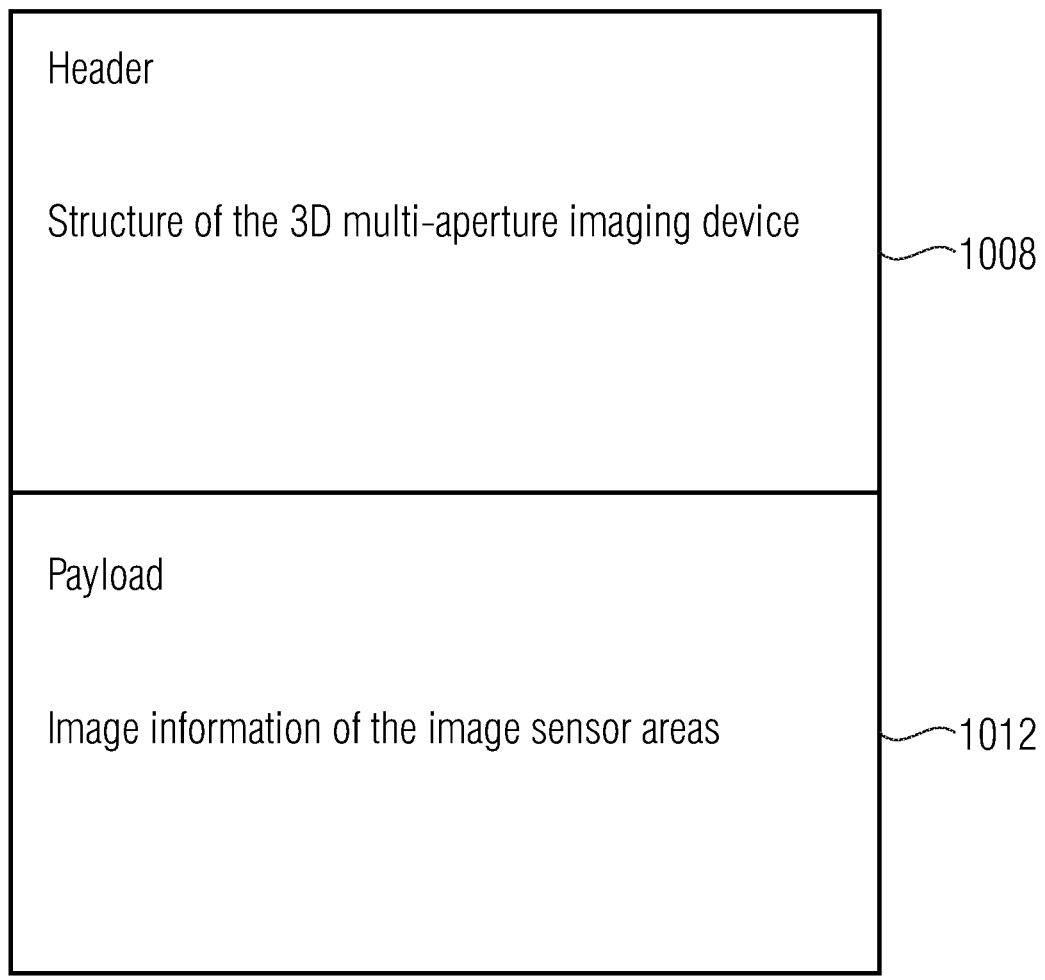
FIG. 3 is a schematic view of a structure of an output signal according to embodiments described herein comprising the data header and payload data, according to an embodiment.

FIG. 3 shows a schematic view of a structure of the output signal 1006 comprising the data header and header 1008, respectively, and the payload data 1012. The data header 1008 includes information regarding the structure of the 3D multi-aperture imaging device. The information regarding the structure of the 3D multi-aperture imaging device can consider a number of structure data, among that a number of the imaging modules, an allocation of the optical channels to the partial fields of view, a size and/or arrangement of the partial fields of view in the total field of view or the same. The payload data 1012 include image information of the image sensor areas. These can, for example, be processed or unprocessed image sensor values. The image information can, for example, exist successively for individual pixels or can be already sorted with regard to the total image.

Figure 4:
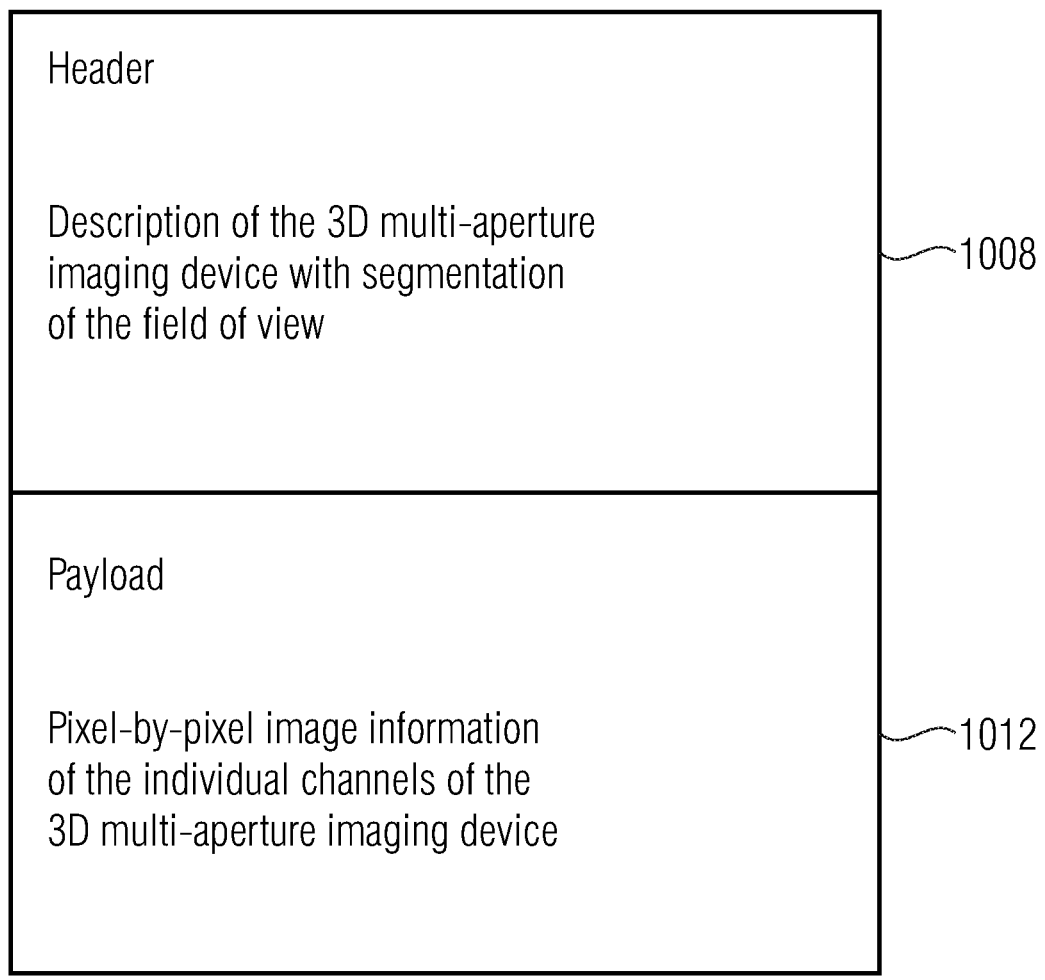
FIG. 4 is a schematic view of a structure of the output signal wherein the data header comprises the description of a 3D multi-aperture imaging device and information regarding segmentation of the total field of view according to an embodiment.

FIG. 4 shows a schematic view of a structure of the output signal 1006, wherein the data header 1008 comprises the description of the 3D multi-aperture imaging device and information regarding a segmentation of the total field of view. The information on the segmentation of the total field of view can relate to the first or second partial fields of view of the first or second and a further module of the 3D multi-aperture imaging device, respectively. The information can include, for example, statements on the number of partial fields of view into which the total field of view is segmented, for example based on what number of optical channels is arranged in the respective imaging module. The segmentation can be the same for at least two or all imaging modules, but can also differ for at least two or all imaging modules.

For example, the at least two imaging modules of the 3D multi-aperture imaging device are structured in the same way. In that way, an individual indication concerning the segmentation of the partial field of view in the data header 1008 can be sufficient, since this information is applicable to all imaging modules. According to a further embodiment, at least a first imaging module is configured differently to a further imaging module, this means the number and/or arrangement of the partial field of views in the total field of view differs. In that way, the data header 1008 can comprise information regarding the segmentation of the field of view for two, several or also all of the imaging modules of the 3D multi-aperture imaging device. The information regarding the segmentation of the total field of view can hence relate to a position and/or orientation of a partial field of view in the total field of view and/or can relate to the fact onto which image sensor area the partial field of view is projected Alternatively or additionally, the information regarding the structure of the 3D multi-aperture imaging device can relate to the number, the configuration, the orientation of the imaging modules in space or also to distances between the image modules in the 3D multi-aperture imaging device, i.e., the base distance BA.

The description of the 3D multi-aperture imaging device can relate to the structure of the 3D multi-aperture imaging device. For example, the data header 1008 can comprise information on what base distance the imaging modules have, what number of optical channels is arranged in the array 14₁ and/or 14₂ or what order or orientation the same have in space or in the imaging modules. Alternatively or additionally, a position of the imaging modules and/or an orientation of the same in space can be indicated. In a comparable configuration of the image modules, individual information regarding this configuration can be sufficient to describe all imaging modules of the 3D multi-aperture imaging device. This means that the processor can be configured to form the output signal such that the data header 1008 comprises information regarding the base distance BA.

According to the embodiment illustrated in FIG. 4, the payload data include pixel-by-pixel image information of the individual optical channels of the 3D multi-aperture imaging device. This means that the information of the pixels of the image sensor areas of the image sensor can be arranged sequentially in the payload data 1012 according to a predefined order. According to further embodiments, additional and/or alternative information can be arranged. Therefore, for example, the image information, i.e., the pixel values can exist in processed form. As a processed form, for example an image format, such as JPEG, Blender, IGES or the same can be implemented with and without compression. Both information regarding a three-dimensional image could be part of the payload data 1012, as well as the plurality of two-dimensional images from which three-dimensional effects or information can be derived. This means that first and second partial fields of view projected on the first and second plurality of image sensor areas can be compressed regarding the provided image values in order to obtain compressed image data. The processor 1002 can be configured to form the output signal such that the payload data comprise information regarding the compressed image data.

The processor 1002 can be configured to evaluate, for example, each image sensor area sequentially and hence each partial field of view sequentially and to process the obtained image information from the pixels of the image sensor areas. This means that the pixel-by-pixel image information of the payload data 1012 can have a structure where, like in a mosaic, each partial field of view is described after the other. A mosaic-like shape can, for example, be obtained by interlacing the partial fields of view 74a-d in the overlap areas 114. Alternatively, the processor 102 can be configured to preprocess the image information of the image sensor areas in order to obtain the de-mosaiced total image. The processor 102 can be configured to form the output signal 1006 such that the payload data 1012 comprise information regarding the total image. For example, each column or each line of the total image can be represented sequentially as pixel-by-pixel image information. On the other hand, in a mosaic-like representation, each partial image can be represented column by column or line by line.

Figure 5A:
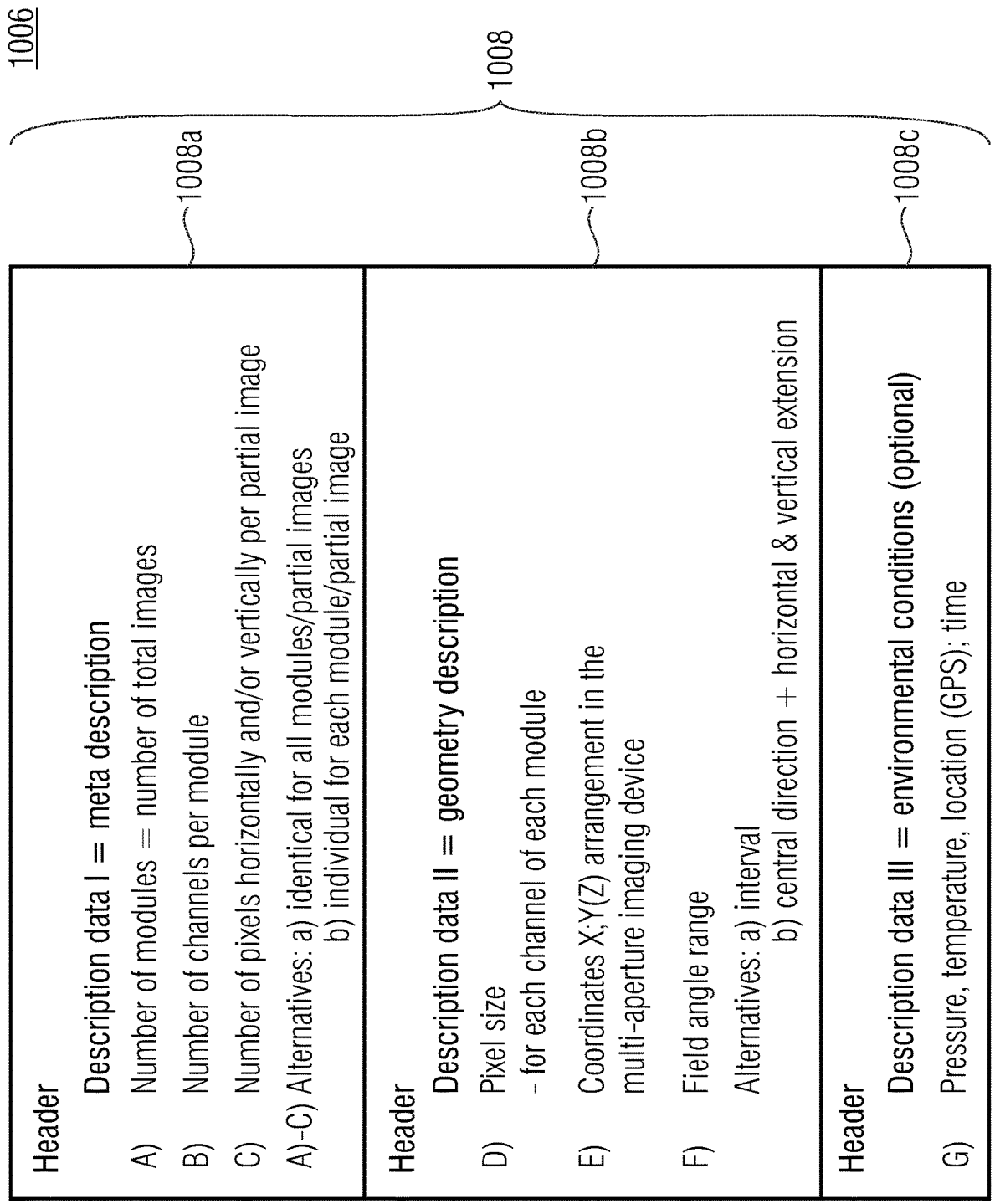

FIGS. 5a and 5b show a schematic view of a structure of the output signal 1006 formed by the processor 1002 by considering a plurality of information sources. Here, FIGS. 5a and 5b can be considered as one figure which means that the portion of the data header 1008 illustrated in FIG. 5b is part of the data header 1008 illustrated in FIG. 5a and that the payload data 1012 illustrated in FIG. 5b are also part of the output signal 1006 like the parts of the data header 1008 illustrated in FIG. 5a. Although components 1008a, 1008b, 1008c and 1008d are illustrated as separate information blocks, information contained in the data header 1008 can have any structure with respect to one another. The illustrated segmentation merely serves for illustration purposes and is not to have any limiting effect.

The processor 1002 can be configured to form the output signal 1006 such that the data header comprises information regarding the number of imaging modules 11. The imaging modules can be configured to completely capture the total field of view, this means the information regarding the number of imaging modules can be put on the same level as a number of total images of the total field of view.

Alternatively or additionally, the data header can comprise information on what number of optical channels is arranged per imaging module 11. Alternatively or additionally, the data header 1008 can comprise information on what number of pixels is arranged along a first and/or second image axis that can be referred to, for example, as horizontal and vertical. The information can relate to the number of pixels per partial image, i.e., image sensor area and/or total image of pixels captured or arranged in the total image. This means that the processor can be configured to form the output signal 1006 such that the payload data comprise information regarding the image sensor areas 58, such as number of pixels along a line and/or column or a geometric extension of the image sensor areas 58.

The respective information can be identical for all imaging modules 11 and/or for the optical channels, i.e., the partial images, such that presence of the information regarding all imaging modules and/or partial images results in a sufficient description. Alternatively, for at least each deviating statement but also individually for each imaging module or partial image, individual information can be arranged in the data header 1008. This previous description of A) number of modules, B) number of channels per module and C) number of pixels along the image axes and/or the base distance can be arranged as meta description concerning the structure of the 3D multi-aperture imaging device 1000 and is characterized as element 1008a of the data header 1008. The information can be inserted individually and in any combination with one another by the processor, wherein, for example, a specification of a model number or the same of an imaging module or 3D multi-aperture imaging device can also provide such information when the implementation of the module or the device is encoded thereby. Simply put, the processor 1002 is configured to add information to the output signal 1006 on what optical channel views into what portion of the total field of view and/or what distance the optical channels have to one another. This can be advantageous in particular for the individual partial images in the output signal 1006.

A geometry description is characterized as element 1008b of the data header 1008, which can be inserted by the processor 1002 in the data header 1008 of the output signal 1006. The geometry description can relate to D) a pixel size of the pixels of the image sensor area 58 of the image sensor 12. According to an embodiment, the pixels have identical or comparable sizes. The specification of the pixel size can hence be made globally for all pixels. According to a further embodiment, the total number of pixels of the image sensor areas 58 has differing sizes. The pixel size can be arranged for each different configuration of the pixels as well as for an allocation of the size to the respective pixels in the element 1008b. This means that the processor 1002 can be configured to form the output signal 1006 such that the data header 1008 can comprise, for at least one of the image sensor areas 58, information regarding a number of pixels with respect to a first image extension direction and a number of pixels for a second image extension direction. This can, for example, be the extension direction along which the partial fields of view extend in space. The first and second direction can be arranged perpendicular to one another and can correspond to number of lines or columns.

Further, the processor 1002 can be configured to E) insert two-dimensional (X/Y) or three-dimensional (X/Y/Z) coordinates for one, several or each optical channel of each module 11 or at least to insert a relative positioning with respect to one another. Thus, the coordinates can be local coordinates of an arrangement of the optical channels 16 with respect to other optical channels and/or global coordinates, i.e., an arrangement of the optical channels within the 3D multi-aperture imaging device. In both cases, an arrangement of the optical channels 16 in the module 11 and/or in the 3D multi-aperture imaging device 1000 can be described. This means that the processor 1002 can be configured to form the output signal 1006 such that the data header 1008 comprises, for at least one of the optical channels 16, information regarding a spatial coordinate of the at least one optical channel 16 in the 3D multi-aperture imaging device 1000. Simply put, the output signal 1006 can be formed such that the same comprises information on a geometric arrangement of the optical channels.

Further, the element 1008b of the data header 1008 can be formed by the processor 1002 such that the same includes information F) regarding a field angle range of at least one optical channel or also of the imaging module. The field angle range can be indicated as interval along one, advantageously along two image directions. This can also be referred to as "ranging from ... to ..." or "viewing direction ±xy". Alternatively or additionally, the field angle range can be indicated by a central direction of the module 11 or the optical channel 16 and can be supplemented by an extension of the field angle range along the at least one, advantageously two image axes.

Alternatively or additionally, the data header 1008 can include an optional element 1008c comprising information G) on environmental conditions of the 3D multi-aperture imaging device 1000. For this, for example, a pressure of an atmosphere or environment surrounding the 3D multi-aperture imaging device, an environmental temperature of the 3D multi-aperture imaging device, an operating temperature of the 3D multi-aperture imaging device, a time of image capturing or generation of the output signal 1006 and/or a position of the 3D multi-aperture imaging device can be inserted in the data header 1008. The location can be determined, for example, by means of a positioning system, such as GPS, Galileo or Glonass or can be provided by an external data source, such as a sensor. The indication of temperature at which the image was captured can provide advantages when image data are corrected later. In that way, the temperature can have an influence on a plastic deformation of imaging optics and/or housing parts of the 3D multi-aperture imaging device that result in a change of the projection of the total field of view on the image sensor areas 58. When knowing the temperature-dependent change of the deformation, this temperature dependency can be corrected. Alternatively or additionally, the processor can be configured to form the data header 1008 such that the same comprises information on an orientation or viewing direction of the at least one optical channel, a module and/or the 3D multi-aperture imaging device. Alternatively or additionally, the processor can be configured to form the data header 1008 such that the element 1008c comprises camera specific information regarding at least one autofocus drive. The at least one autofocus drive can, for example, be used for focusing the captured image. Here, the camera-specific information can include an indication on focusing the image information or payload data. This can, for example, be focusing used commonly for all modules, i.e., an autofocus drive for module-individual focusing, i.e., at least two autofocus drives or channel-individual focusing, i.e., a plurality of autofocus drives. The information can be the indication of a global or relative position of an element of the autofocus drive and/or a controlled variable, such as a current variable or voltage variable for controlling the autofocus drive. The global or relative position can be reconstructed from the controlled variable, such that the focusing can be inferred.

Further, as illustrated in FIG. 5b, the data header 1008 of the output signal 1006 can comprise an optional element 1008d comprising information regarding possible corrections.

Independent of other information, the element 1008d and hence the data header 1008 can comprise information regarding H) an indication of at least one optical channel of the 3D multi-aperture imaging device, regarding I) vignetting, i.e., shading of the total image or partial image towards the edge of the image and/or information on J) defective pixels on the image sensor and the image sensor areas 58, respectively. Later, every information H), I) and J) can also be used for correcting the image.

As described in the context of FIG. 4 by K), the payload data 1012 can also include pixel-by-pixel image data. In a first embodiment, characterizing information regarding the pixels can be stated successively, for example, according to option a) color information. Based on a used image sensor, for example, an allocation of four color values per pixel according to a red, green, green, blue scheme, such as according to a Bayer filter or according to a red, green, blue, white arrangement or the same. The respective color information and/or brightness information can be arranged successively in the payload data 1012 for successive pixels. Alternatively, the color information can also be arranged in a different reconstructable scheme by the processor 1002. The image data can also comprise pixel-by-pixel depth data, an indication on a segmentation of pixels towards pixel clusters and/or an indication of depth information and/or distance information regarding pixel clusters. The image data can, for example, be arranged sorted in clusters in the payload data and the depth data or the cluster information can accordingly be arranged in the data header.

As indicated by option L)a), the pixel values can possibly be arranged successively without separation information, line break information or intermediate information, such as when the size of each image can be derived from the header data, for example by information C). Alternatively or additionally, a start/stop character string can be arranged between the pixel values or between some pixel values. The start/stop character string can include at least one bit and can indicate that a new portion of the image starts, such as a new partial image, a new image column or a new image line. This means that the payload data can comprise information regarding a line break or a column break of the captured image. This can be advantageous when the above stated information C) is not present in the header data. Alternatively or additionally, for each group of pixels, information can be inserted in the header data that allows characterization of the imaging module 11 and the optical channel 16, i.e., an allocation of the pixels to the module 11 and the optical channel 16 as indicated by option L)c).

The image data can be arranged as M)a) raw data (RAW) and/or as M)b) compressed image data and/or as M)c) de-mosaiced image data in the payload data 1012. As an alternative or in addition to K), the image data can comprise pixel-by-pixel depth data, can comprise an indication on a segmentation of pixels towards pixel clusters and/or an indication of depth information and/or distance information regarding pixel clusters.

Figure 6:
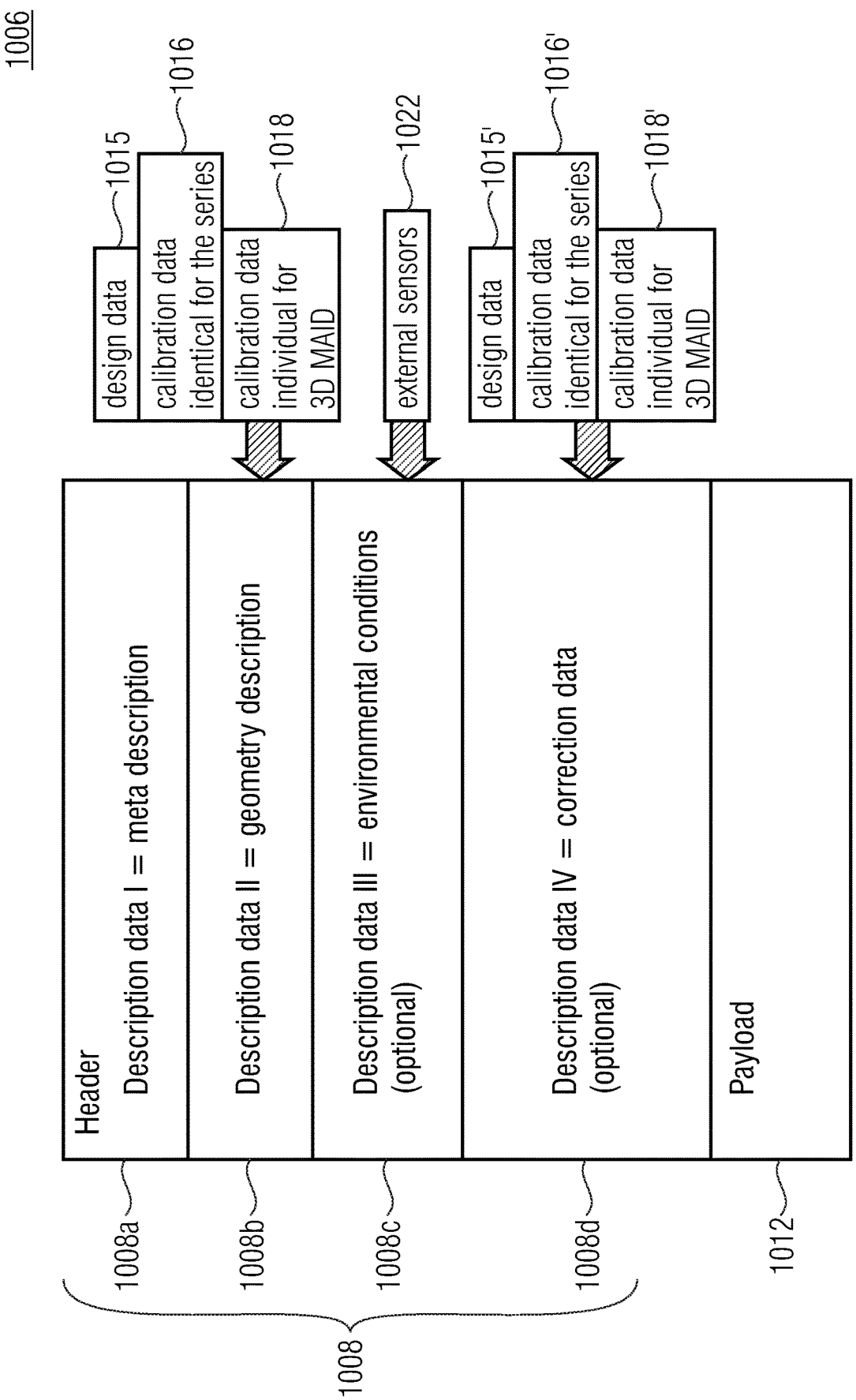
FIG. 6 is a schematic overview of elements of the output signal according to an embodiment.

FIG. 6 shows a schematic overview of the output signal 1006 that can comprise the elements 1008*a*-1008*d* of the data header 1008. For the geometric description of the element 1008*b* and/or the correction data of the element 1008*d*, design data 1015 of the 3D multi-aperture imaging device (3D MAID) can be considered by the processor 1002. The pixel size D) can, for example, be part of that. Alternatively or additionally, calibration data 1016 can be used by the processor 1002, for example in that the processor 1002 reads the same from a data memory. The calibration data, for example the field angle range F), can be the same across one series of multi-aperture imaging devices structured in the same or identical manner.

Alternatively, individual calibration data 1018 can be used by the processor 1002, such as calibration data that are individual for the 3D multi-aperture imaging device, such as the actual coordinates E) of the optical channels in the 3D multi-aperture imaging device. In that way, for example, production tolerances can be compensated.

On the other hand, in the element 1008*d*, the design data 1015' can be used by the processor 1002 in that the distortion H) of the optical channels and/or the vignetting I) are considered. Alternatively or additionally, these data or information H) and/or I) can also be used as calibration data 1006' that are identical for the series of 3D multi-aperture imaging devices. Alternatively or additionally, calibration data 1018' can be used by the processor 1002, for example by measuring the pixels in order to detect the defective pixels J) and in order to consider this in the payload data and/or in the correction data 1008*d*.

The output signal 1006 can, for example, be stored as file or data block in a memory or can be transmitted as signal.

In other words, when all image modules 11 are configured in the same way, a number of optical channels per image, a number of modules and/or a number of horizontal and vertical pixels per partial image can be stated in the data header 1008, globally for all modules 11. Here, the number of modules can be a number of quasi-redundant images representing a multiplicity of the views. In that way, for example, with a number of two modules a stereo image, with a number of three modules a triplet image and with a number four modules a quattro image can be obtained. Alternatively, multiple, i.e., more than four imaging modules or multi-aperture imaging devices can be arranged.

If the 3D multi-aperture imaging device comprises, for example, three multi-aperture imaging devices, i.e., modules, the same includes, for example, a third plurality of optical channels for projecting third partial fields of view of the total field of view overlapping each other and the first partial fields of view on third image sensor areas of the image sensor, wherein the first and second plurality of optical channels are laterally offset from one another by a base distance. The processor is configured to receive image sensor data from the image sensor that comprise information on the third partial fields of view projected on the third plurality of image sensor areas and that is configured to provide the output signal such that the payload data comprise image information acquired from the pixels of the first image sensor areas, the second image sensor areas and the third image sensor areas. The information of the data header can relate to a structure or an arrangement of the three modules. Alternatively, as already described, a higher number of modules is possible.

Alternatively, a number of modules, for at least two modules 11 or for each module 11 a number of optical channels per image and/or a number of pixels horizontally and vertically per partial image can be specified, e.g. when the modules differ from one another. Individual and global information regarding the modules can also be arranged together in the output signal 1006, wherein this can result in redundant information reproduction.

The geometry data 1008*b* of the channel arrangement can relate to a number and/or designation of the modules, to a number and/or designation of the optical channel in the respective module 11, to a two-dimensional or three-dimensional coordinate of the channel or module and/or to an angular orientation of at least one optical channel in the 3D multi-aperture imaging device. Based on the knowledge of the design data, the geometry data can be derived and/provided, such as in a memory. Alternatively, the geometry data can also be determined by a measurement which can result in an at least partial compensation of production tolerances. Here, the geometry data can additionally show a dependence on external influence quantities such as temperature and pressure. Knowing these quantities during further imaging processing or image reconstruction allows the implementation of a respectively adapted correction. Alternatively or additionally, camera information, such as regarding a manufacturer, a model, an f-number, exposure time, ISO value, light value, focal length, flash usage and/or flash strength, can be incorporated in the geometry data 1008*b*, like in DSLR cameras. Alternatively or additionally, the camera information can comprise information regarding position data and indications of a controlled variable (control current, control voltage) of the autofocus drives.

The geometry data 1008*b* can further indicate a field angle range and/or a central field or viewing direction as well as an extension (horizontal/vertical) of the field angle along the image axes channel by channel, i.e., for each optical channel. The field angle data can be design data. Alternatively or additionally, the field angle data can also be measured during calibration, wherein the calibration can be specified at the specific structure or can correspond to typical values that are determined at a representative model. Alternatively or additionally, additional parameters, such as pressure and temperature can be incorporated for selecting and calculating the data set, respectively, wherein the data sets can be acquired from design data or from calibration, wherein the calibration can be determined at the specific structure and corresponds to typical values that have been determined at a representative model.

Alternatively or additionally, the geometry data 1008b can comprise a number of lines and/or columns per optical channel, also globally or individually per channel. Alternatively or additionally, an indication regarding the pixel size can be incorporated by the processor 1002.

The element 1008d can comprise additional environmental conditions, such as pressure, temperature, time or location. The processor 1002 can obtain such information via a connection of the processor 1002 to external sensors by the sensor data 1022 illustrated in FIG. 6.

The optional element 1008d can include correction data for the optics. Concerning the distortion H), the processor 1002 can access design data regarding the optical and/or perspective (Keystone) distortion for the processor 1002 and process the same. Alternatively or additionally, measured data can be processed from a calibration, wherein the calibration can be determined at the specific structure or can correspond to typical values that have been determined at a representative model of a 3D multi-aperture imaging device.

Concerning the vignetting I), these can be global or channel individual design data or calibration data as discussed above. Alternatively or additionally, information J) regarding defective pixels can be arranged on the image sensor 12.

The payload data 12 can comprise image data of each image. Here, fixed numbers of lines and/or columns can be considered. Alternatively, for example, start/stop bits can be arranged. Alternatively or additionally, a characterization of the module and/or the channel can be performed. The image data can be arranged in the payload data 1012 as RAW, compressed or packed image data, such as JPEG or the same and/or as de-mosaiced image. Also, different files with geometry data, correction data and payload can be generated by the processor 1002, this means the output signal 1006 can be generated in a discontinuous manner. The output signal 1006 can also be generated such that, for each optical channel, an individual payload file is output by the processor 1002. Here, it should be noted that the processor 1002 can also insert the channel-by-channel or cluster-by-cluster depth information into the data header 1008 in the form of geometry data.

Figure 7:
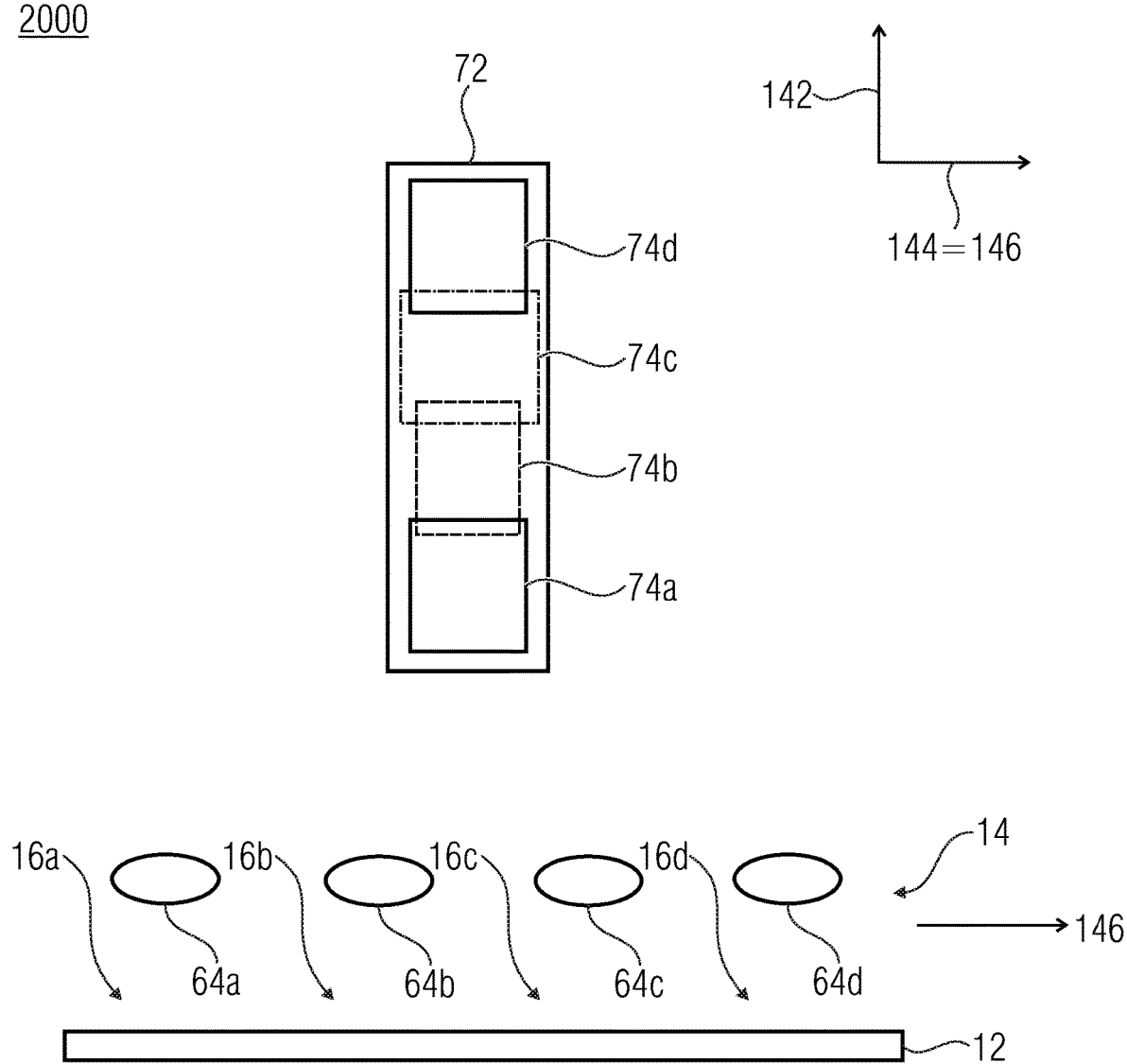
FIG. 7 is a schematic view of a further multi-aperture imaging device according to a second aspect of embodiments described herein.

FIG. 7 shows a schematic view of a multi-aperture imaging device 2000 according to a second aspect of embodiments described herein, which can be arranged, for example, as imaging module 11 in the 3D multi-aperture imaging device 1000. The multi-aperture imaging device 2000 is configured to project the partial fields of view 74a-74d on the image sensor 12 by means of the optical channels 16a-16d each comprising at least one optics or lens 64a-64d. The array 14 is arranged, for example, along the line extension direction 146. Thus, the optical channels 16a-16d are arranged in a one-dimensional array 14, this means the optical channels 16a-16d are arranged, for example, in a single line.

The total field of view 72 can extend along a first image direction 142 and along a second image direction 144 in space, wherein the directions 142 and 144 can be perpendicular to one another. The partial fields of view 74a-74d can be arranged beside one another and overlapping along the direction 142, such that an extension of the image along the direction 144 is influenced or determined by the number of pixels and/or the field angle of the optical channels 16a-16d along the direction 144 and the extension of the image along the direction 142 by the number of pixels and the field angle of the optical channels 16a-16a along the direction 142 as well as additionally by the number of partial fields of view 74a-74d as well as by the overlap factors. This means that the plurality of optical channels 16a-16d forms the one-dimensional array 14 which is arranged along the direction 144 and 146 in space, while the partial fields of view 74a-74d of the total field of view also form a one-dimensional array arranged perpendicular to the direction 144 along the direction 142. Thus, the multi-aperture imaging device 2000 can comprise the feature that a conversion between an arrangement direction of the array 14 and an arrangement of the corresponding partial fields of view 74a-74d is performed in space. This can be performed, for example, by a respective viewing direction of the optical channels 16a-16d. Alternatively or additionally, the multi-aperture imaging device 2000 can comprise a beam-deflecting means that is not illustrated, which performs such a deflection.

For example, the multi-aperture imaging device 2000 can advantageously be arranged in systems where essentially images are captured that have a significantly greater extension along a first image direction 142 compared to a second viewing direction 144. This can apply, for example, to camera systems in vehicles capturing a driving route of the vehicle along a horizontal direction. This means the direction 142 can, for example, be a horizontal direction. In such an example, the optical channels 16a-16d can be arranged along a vertical direction in the vehicle. It is obvious that the directions 142 and 146 are mutually exchangeable, this means the indications horizontal and vertical are not to have any limiting effect.

The multi-aperture imaging device 2000 can be arranged at least in duplicate as module 11a and 11b in the 3D multi-aperture imaging device 1000. In deviation from the illustration, the 3D multi-aperture imaging device can have less or more than four channels but at least two.

Figure 8:
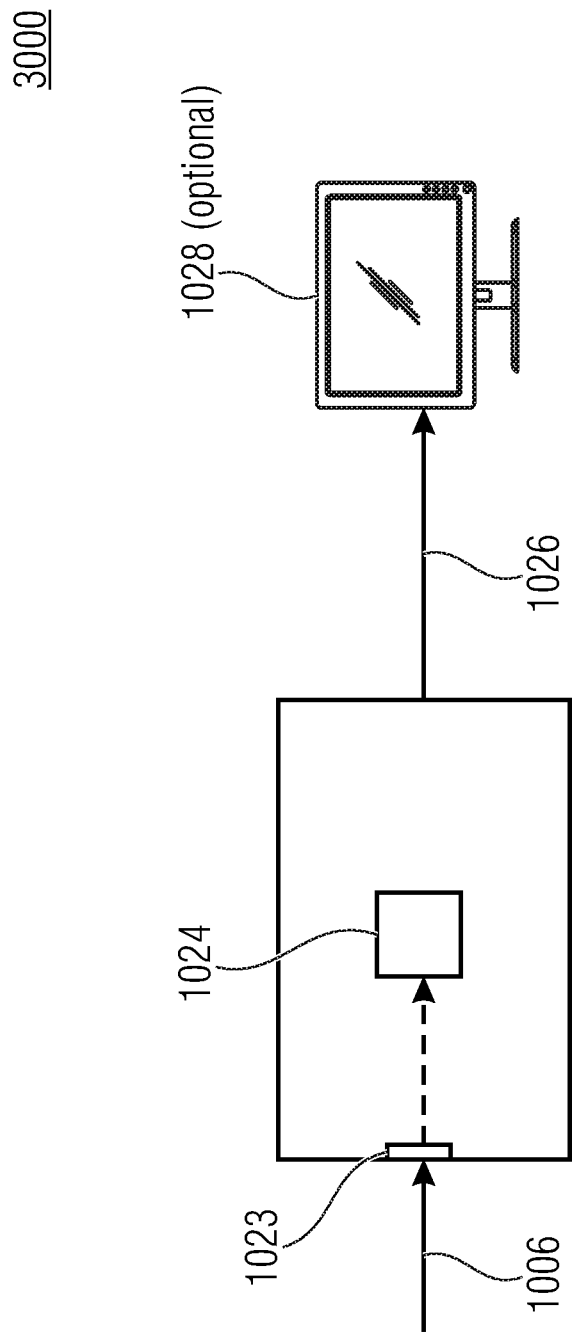
FIG. 8 is a schematic block diagram of a device for processing the output signal according to an embodiment.

FIG. 8 shows a schematic block diagram of a device 3000 for processing the output signal 1006. The device 3000 can comprise a wireless or wired interface 1023 for receiving the output signal 1006. Thus, subsequently, the signal 1006 is referred to an input signal for the device 3000. The device 3000 includes a processor 1024 for processing the payload data 1012 of the input signal 1006 while considering the information regarding the structure of the 3D multi-aperture imaging device 1000 for at least first image sensor information of a partial field of view $74_{11}$-$74_{24}$ of the first module 11a and the partial field of view $74_{21}$-$74_{24}$ of the second module 11b. Alternatively or additionally, the processor 1024 can be configured to process other or additional information of the data header 1008. A function that can be implemented by the processor 1024 is, for example, a subsequent change of focusing of varying areas in the image data that are included in the payload data 1012 of the input signal 1006.

The device 3000 can be configured to output an image signal 1026 which allows a representation of the post-processed image data. In that way, the signal 1026 can be illustrated, for example, on an optional monitor 1028 or display 1028. Alternatively or additionally, the signal 1026 can also be transmitted in a wired or wireless manner, for example to another device. The other device can be a further processing device or a memory element.

The device 3000 can be configured to process the output signal even when the same indicates that a number of more than two modules have been used for capturing the total field of view.

The functions of the processor 1024 can also be realized in the processor 1002, this means that the processors 1002 and 1024 can be mutually configured to perform the functions described with respect to the other processor 1024 and 1022, respectively.

The captured image data of the 3D multi-aperture imaging device 1000 can thus be stored in a format allowing the calculation of three-dimensional object data and the subsequent, i.e., after the actual image capturing object distance dependent determination of the areas to be focused.

The data format can consist of a header and a payload area or can at least comprise the same. In the header area, descriptive data of the image-capturing multi-aperture imaging system and possibly additional sensor data can be listed, whereas in the payload area essentially the pixel-by-pixel image data can be listed.

Multi-aperture imaging devices obtained in that way can comprise a linear channel arrangement, i.e., optical channels arranged in a single line and can have a low or even minimum installation size. The above described aspects allow adjustable three-dimensional image capturing and image representation. Above that, subsequent determination of the depth of field range can be performed.

In the following, reference is made to further advantageous implementations of multi-aperture imaging devices and 3D multi-aperture imaging devices, each of which can be combined as additional features with the features of the 3D multi-aperture imaging device 1000. This means that the multi-aperture imaging devices described below can be arranged as an imaging module in the 3D multi-aperture imaging device 1000.

FIG. 8a shows a schematic side sectional view of a device 10 according to an embodiment in a first operating state. The device 10 can be a mobile or immobile device, such as a mobile phone, a smartphone, a mobile computer such as a tablet computer and/or a mobile music player.

The device 10 includes a multi-aperture imaging device 11, comprising an image sensor 12, an array 14 of juxtaposed optical channels 16 and beam-deflecting means 18. The beam-deflecting means 18 is configured to deflect an optical path 17 of the optical channels 16 and will be discussed in detail below. The device 10 includes a housing 22 with external surfaces 23 enclosing a housing volume 24. This means the housing volume 24 can include an inner volume of the housing 22 and the volume of the housing 22. Thus, the housing volume includes also a volume claimed by the housing walls and is hence enclosed by the external surfaces 23 of the housing. The housing 22 can be formed in a transparent or opaque manner and can include, for example, plastic materials and/or metal materials. The beam-deflecting means 18 has a first position inside the housing volume 24. Holes or openings in the sides of the housing, such as for acoustical channels of microphones or for electrical contacts of the device 10, can be neglected for determining the housing volume 24. The housing 22 and/or members arranged within the housing 22 can block the optical path 17 of the optical channels 16 after deflection by the beam-deflecting means 18, such that a field of view 26 arranged outside the housing 22 that is to be captured by the multi-aperture imaging device 11 cannot be captured at all or only to a limited extent. The members can, for example, be an accumulator, printed circuit boards, non-transparent areas of the housing 22 or the same. In other words, instead of a conventional camera objective, a different, possibly non-optical, device can be arranged on a housing.

The housing 22 can comprise an opening 28 through which the housing volume 24 is connected to an external volume 25 of the housing 22. At times, the opening 28 can be completely or partly closed by a cover 32. The first operating state of the device 10 can be an inactive operating state of the multi-aperture imaging device 11 where the optical channels 16 are directed, for example, on the inner side of the housing 22 or are not deflected at all.

In other words, the installation height of the structure of the multi-aperture imaging device is at least partly determined by the diameter of optics of the optical channels 16 (lenses). In a (possibly optimum) case, the extension of the mirrors (beam-deflecting means) in this thickness direction is equal to the extension of the lenses in this direction. Here, however, the optical path of the optical channel 16 is restricted by the mirror 18. This results in a reduction of image brightness, wherein this reduction depends on the field angle. The present embodiments solve this problem by moving parts of or the total multi-channel camera structure, such that, in the operating state of the camera, parts of the structure project beyond the housing, e.g., of a smartphone compared to the non-usage state of the camera. The movement of the parts, such as the beam-deflecting means, can be rotational (folding out or folding open), translational (extending) or a mixed form. The additional movements of parts and the total system, respectively, allow a minimum structural shape in the non-usage mode of the camera, similar to known objectives of compact cameras, and a greater structural shape in the usage mode of the camera optimized for realizing the technical function.

Figure 9A:
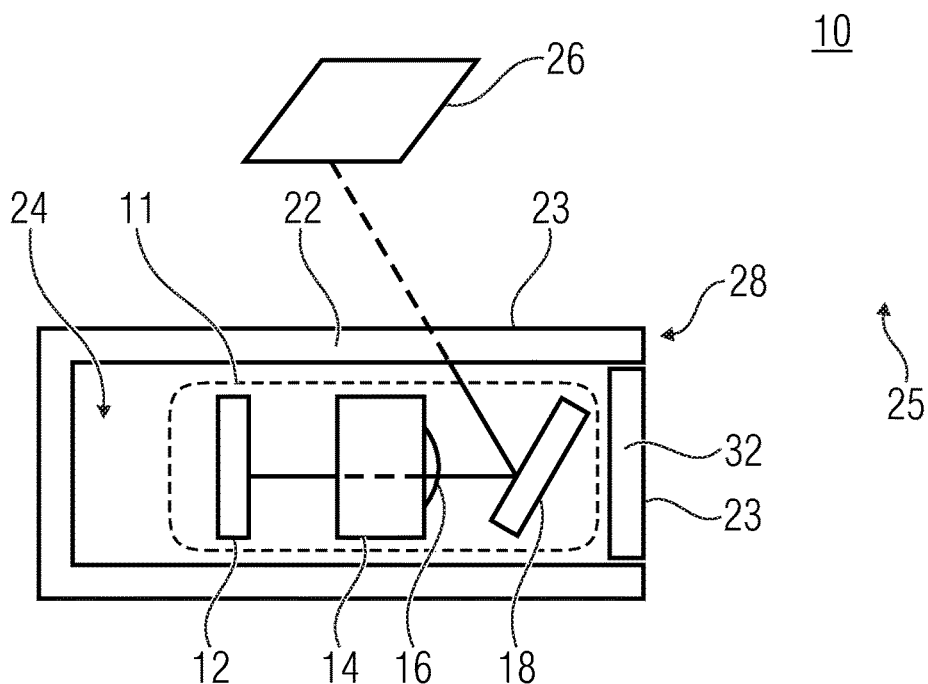
FIG. 9a is a schematic side-sectional view of a device according to an embodiment in a first operating state.
Figure 9B:
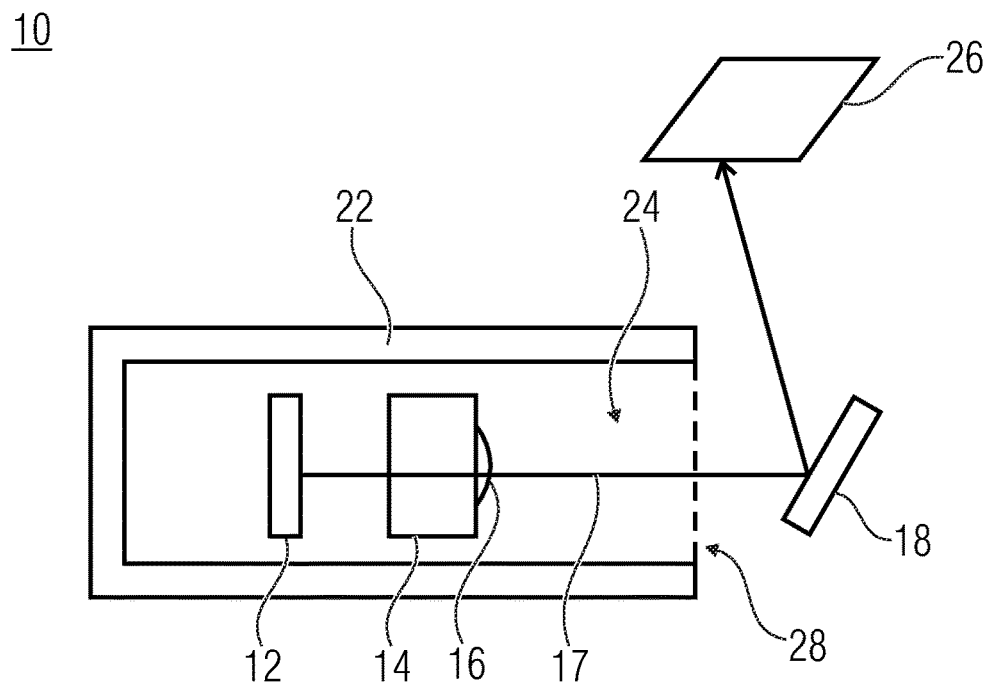
FIG. 9b is a schematic side-sectional view of the device of FIG. 9a in a second operating state.

FIG. 9b shows a schematic side sectional view of the device 10 in a second operating state. In the second operating state, the beam-deflecting means 18 has a second position outside the housing volume 24. This enables the beam-deflecting means 18 to deflect the optical paths 17 of the optical channels 16 outside the housing volume 24 and the field of view 26 so that the same can be captured outside the housing 22 by the multi-aperture imaging device 11. The cover 32 can be moved away from the position shown in FIG. 1a, such that the beam-deflecting means 18 can be moved out of the housing volume 24 through the opening 28 of the housing 22. The beam-deflecting means 18 can be moved translationally and/or rotationally between the first position and the second position. It is advantageous that the members inside the housing 22 and/or the housing 22 itself do not block the deflected optical path 17 of the optical channels 16.

The multi-aperture imaging device 11 can be arranged in a camera housing which is arranged again at least partly inside the housing 22. The camera housing can be formed, for example, at least partly by a travel carriage as described in the context of FIG. 13. This differs from a concept where a single-channel camera is oriented in different directions by means of a folding mechanism in that in the present case rotation or tilting of the image sensor and/or the imaging optics can be prevented.

A total field of view can be captured by means of the device 10 such that, starting from the first position, the beam-deflecting means is moved into the second position, where the beam-deflecting means is placed at least partly outside of a housing volume. When the beam-deflecting means is in the second position, the total field of view can be captured by the array of juxtaposed optical channels of the multi-aperture imaging device whose optical paths are deflected by the beam-deflecting means.

Figure 10A:
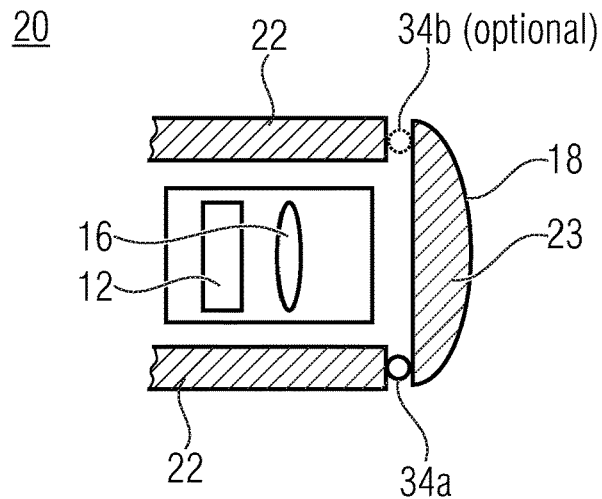
FIG. 10a is a schematic side-sectional view of a device according to a further embodiment comprising a cover.

FIG. 10a shows a schematic side sectional view of a device 20 according to a further embodiment in a first operating state. The device 20 comprises the cover 23 which is pivoted on the housing 22, for example via a connecting element 34a and/or via an optional connecting element 34b. The connecting element 34a and/or 34b can be configured to allow tilting and hence rotational movement between the cover 23 of the beam-deflecting means 18 with respect to the housing 22 and can be formed, for example, as hinge or roller bearing.

The beam-deflecting means 18 can form a cover of the housing or can be part thereof. One of the beam-deflecting surfaces of the beam-deflecting means 18 can be an outer edge of the housing. The beam-deflecting means 18 comprising a first position and closes the housing 22 partly or completely. The beam-deflecting means 18 can comprise, for example, a reflective area for deflecting the optical path 17 and can comprise contact areas that are configured to form a mechanical contact with the housing 22 in the first position. Simply put, the camera might not or only hardly be visible when not in use.

Figure 10B:
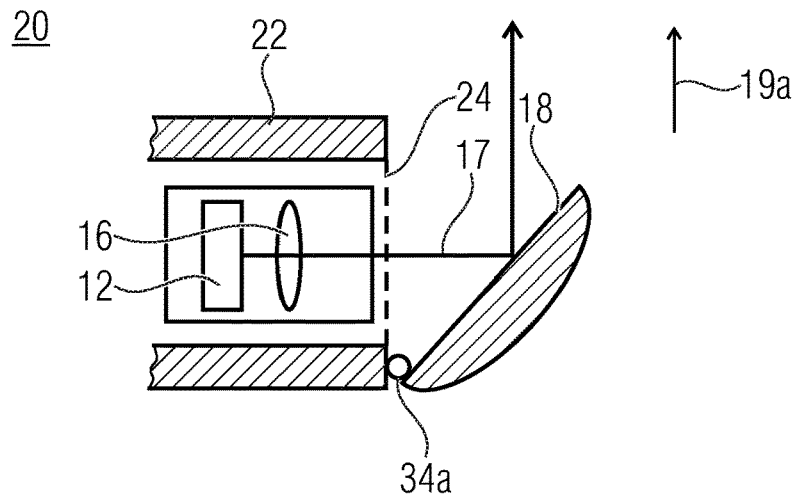
FIG. 10b is a schematic side-sectional view of the device of FIG. 10a in a second operating state.

FIG. 10b shows a schematic side sectional view of the device 20 in a second operating state. In the second operating state, the beam-deflecting means 18 can be moved rotationally with respect to the housing 22, i.e., folded out, such that the housing volume 24 is opened. The rotational tilting allows an inclined or tilted orientation of the beam-deflecting means 18 with respect to a course of the optical path 17 of the optical channel 16 between the image sensor 12 and the beam-deflecting means 18, such that the optical path 17 is deflected in a first direction 19a at the beam-deflecting means 18.

Figure 10C:
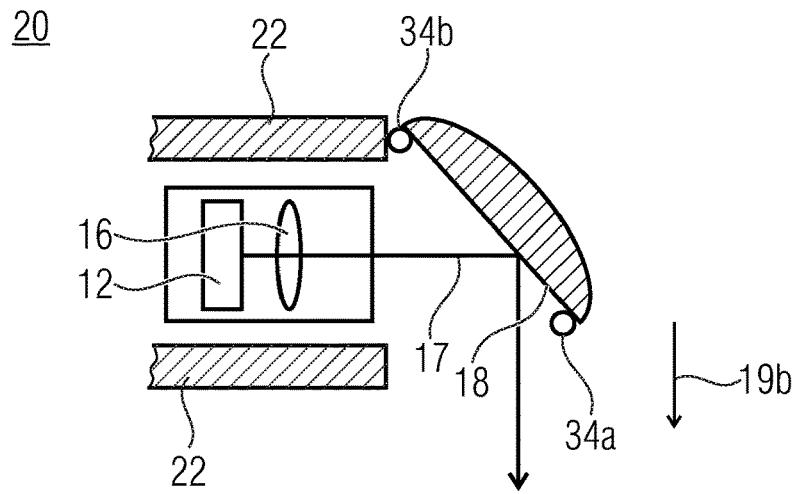
FIG. 10c is a schematic side-sectional view of the device of FIG. 10a in a third position.

FIG. 10c shows a schematic side sectional view of the device 20 in a third position. The device 20 can be in the second operating state. Compared to the second position as illustrated in FIG. 10b, the beam-deflecting means 18 can deflect the optical path 17 of the optical channels 16 in a different direction 19b, such that a different field of view or a field of view positioned at a different location can be captured. For example, this can be a first side and an opposite side such as front side and rear side, left and right or top and bottom of the device 20 and/or a user into which the optical path 17 is deflected. The connecting elements 34a and 34b can be connected, for example, with a frame structure and the beam-deflecting means 18, such that the beam-deflecting means 18 can alternatively comprise the second or third position. By a switchable viewing direction of the multi-aperture imaging device, conventional solutions in particular in smartphones using two cameras with viewing direction to the front and back can be replaced by one structure.

Figure 11A:
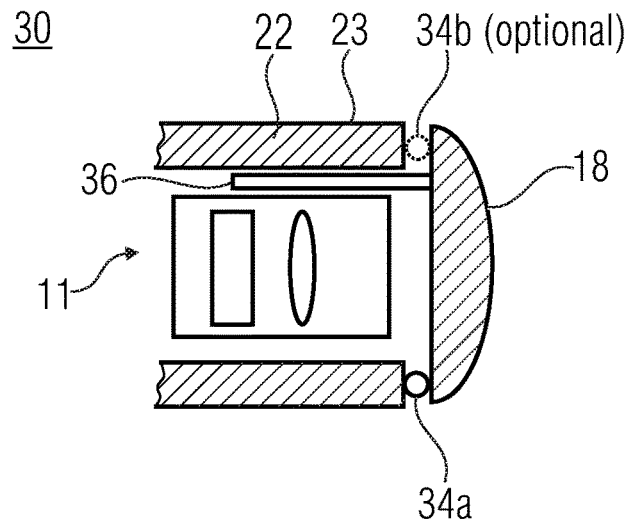
FIG. 11a is a schematic side-sectional view of a device according to a further embodiment in the first operating state comprising an at least partly transparent cover.

FIG. 11a shows a schematic side sectional view of a device 30 according to a further embodiment in the first operating state. Compared to the apparatus 20 as described in FIGS. 3a-c, the device 30 comprises an at least partly transparent cover 36 arranged between an outer edge 23 of the housing 22 and the multi-aperture imaging device 11. The at least partly transparent cover is connected to the beam-deflecting means 18 and configured to move based on a movement of the beam-deflecting means 18. The at least partly transparent cover 36 can, for example, comprise polymer and/or glass materials.

In other words, devices can be provided which allow encapsulation of the optics for protection from decontamination with the option of changing the encapsulated volume (moveable cover glasses).

Figure 11B:
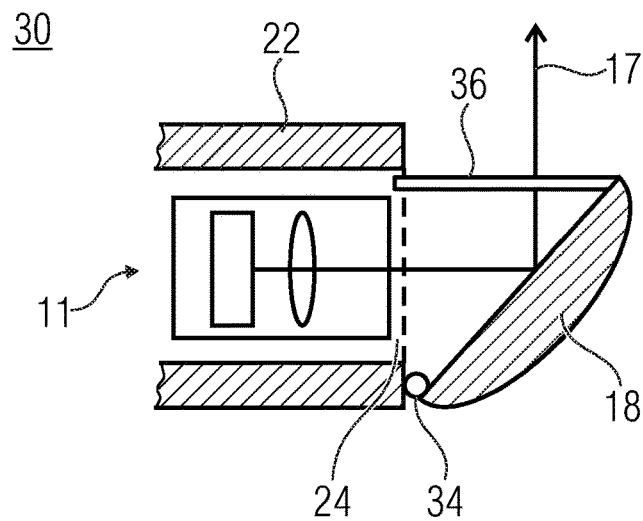
FIG. 11b is a schematic side-sectional view of the device of FIG. 11a in the second operating state.

FIG. 11b shows a schematic side sectional view of the device 30 in the second operating state. Compared to the device 20 in FIG. 10b, the at least partly transparent cover is moved at least partly out of the housing volume 24. This can be performed by a rotational movement of the beam-deflecting means around the connecting element 34. The beam-deflecting means 18 is configured to deflect the optical path 17 of the optical channels 16 such that the optical channels run through the at least partly transparent cover. The cover 36 is configured to reduce or prevent entry of particles, dirt and/or moisture into the housing volume 24. Here, the cover 36 can be formed in a transparent and/or partly opaque manner for the optical paths 17. The cover 36 can, for example, be opaque for specific wavelength ranges of electromagnetic radiation. It is an advantage of the cover 36 that due to the reduced amount of particles, dirt and/or moisture, long operating life of the device and/or a continuously high image quality can be obtained since contamination of optics of the optical channels is low.

Figure 11C:
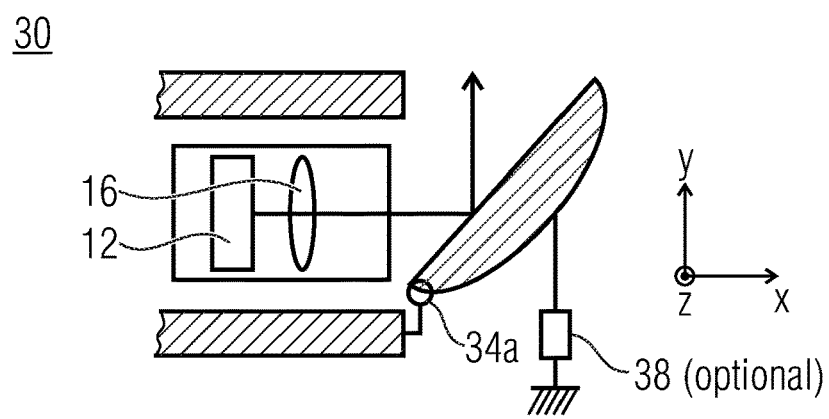
FIG. 11c is a schematic side-sectional view of the device of FIG. 11a, wherein a beam-deflecting means is additionally translationally movable.

FIG. 11c shows a schematic side sectional view of the device 30 where the beam-deflecting means 18 is translationally movable with an optional actuator 38 along a direction y perpendicular to a direction x of the optical path 17 between the image sensor 12 and the optical channels 16 and perpendicular to a direction z perpendicular to a line-extension direction of the array of optical channels 16. The beam-deflecting means 18 can also be moved translationally around the connecting element 34 based on the rotational movement, for example around a guide, a level or the same. The folding up (rotational movement) can be performed manually or by using an actuator. The optional actuator 38 can be arranged on the beam-deflecting means 18. Alternatively, the actuator 38 can be arranged between the housing 22 and the beam-deflecting means 18. The actuator 38 can be arranged, for example, between the housing 22 and the connecting element 34a and/or between the connecting element 34a and the beam-deflecting means 18. It is an advantage that due to the translational movement of the beam-deflecting means along the x direction of the housing, shading of the field of view to be captured by the housing 22 can be reduced.

FIG. 12a shows a schematic side sectional view of a device 40 according to an embodiment in the first operating state, in the first position the beam-deflecting means 18 is arranged inside the housing volume of the housing 22 and is configured to be moved, based on a translational movement 42, from the first position to the second position which is schematically illustrated in FIG. 12b. As illustrated in FIG. 12a, the housing can comprise the cover 32 which closes the housing 22 and an opening therein, respectively, in the first operating state. The beam-deflecting means 18 can be oriented in the first operating state such that the same has a minimum extension perpendicular to a direction x which is defined by the optical path inside the housing 22.

FIG. 12b shows a schematic side sectional view of the device 40 in the second operating state. The beam-deflecting means is moved out of the housing volume 24 based on the translational movement 42, for example, along the x direction. For this, the beam-deflecting means 18 can be moved through the opening 28. The beam-deflecting means 18 can be rotationally moveable around an axis of rotation 44. During the translational movement between the first operating state and the second operating state, the beam-deflecting means 18 can perform a rotational movement around the axis of rotation 44. An angular orientation of the beam-deflecting means can be amended compared to the first operating state of FIG. 11a, such that the area of the beam-deflecting means used by the optical path of the multi-aperture imaging device increases in comparison to the first operating state. A rotational movement 46 around the axis of rotation 44 allows a variable inclination of the beam-deflecting means 18 with respect to the optical path 17 between the optical channels 16 and the beam-deflecting means 18 and hence a variable direction in which the optical path 17 of the optical channel 16 is deflected. The optical channels 16 can comprise optics 64a-b.

In addition to the beam-deflecting means 18, optics 64a-b of the optical channels 16 and/or the image sensor 12 can be arranged outside the housing volume 24 in the second operating state. The optics 64a-b of the optical channels 16 and/or the image sensor 12, for example, can be moved together with the beam-deflecting means 18.

In other words, multi-aperture cameras with linear channel arrangement comprise several optical channels that are juxtaposed and each transmit parts of the total field of view. Advantageously, a mirror is mounted in front of the imaging lenses which can be used for beam deflection and contributes to reducing the installation height. In combination with a mirror that is adapted channel by channel, such as a facet mirror, wherein the facets are planar or curved in an arbitrary manner or provided with a freeform area, it is advantageously possible that the imaging optics of the optical channels are essentially structured identically, whereas the viewing direction of the channels is predetermined by the individual facets of the mirror array. A surface of the beam-deflecting means is at least mirrored at the reflecting facets allocated to the optical channels. It is also possible that the imaging optics of the channels are implemented differently, such that different viewing directions result by the angle of the mirror facet and the implementation of the respective optical channel. It is further possible that several channels use the same area of the beam-deflecting means and hence the number of facets is smaller than the number of channels. Here, the deflecting mirror can be pivoted, wherein the axis of rotation runs, for example, parallel to the extension direction of the channels. The deflecting mirror can be reflective on both sides, wherein metallic or dielectric layers (sequences) can be used. The rotation of the mirror can be analog or stable along one/several directions. Based on the rotational movement, the beam-deflecting means can be movable between at least a first position and a second position, wherein the optical paths are deflected in differing directions in each position. In a similar way as described for the positions of the beam-deflecting means 18 in FIGS. 10a-c, the beam-deflecting means can also be moved around an axis of rotation. In addition to the translational movement of the housing cover 32 and the beam-deflecting means 18, parts and all additional components of the multi-aperture imaging device, respectively, can be co-moved in a translational manner in the same direction, wherein the same or also different travel ranges are possible.

Figure 13A:
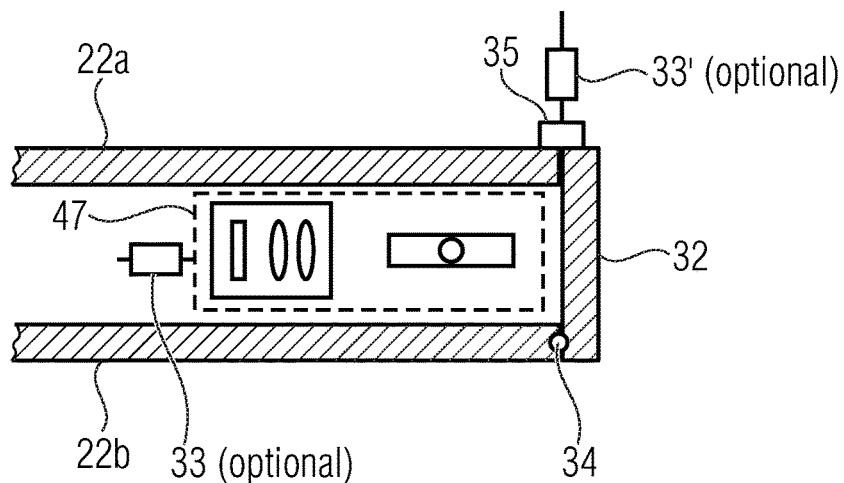
FIG. 13a is a schematic side sectional view of a device according to an embodiment where the cover is arranged in a rotationally moveable manner.

FIG. 13a shows a schematic side sectional view of the device 50 where the cover 32 is arranged rotationally moveable via a moving element 34 on a housing side 22b of the housing 22. The beam-deflecting means 18 can be mechanically connected to a travel carriage 47. The travel carriage 47 can be considered as mechanical transport means for moving at least the beam-deflecting means 18. The device 50 can include an actuator 33 that is configured to translationally move the travel carriage 47. The actuator can include any drive, such as step motor, piezoelectric drive or a voice coil drive. As an alternative or in addition to the actuator 33, the device 50 can include an actuator 33' that is configured to release a mechanical lock 35 which locks the cover 32 and the housing on, at least, one housing side 22a. The beam-deflecting means or travel carriage 47 can be driven out of the housing by means of a spring force when the lock 33' is released. This means the lock 35 can be configured to maintain the beam-deflecting means 18 in the first position. The travel carriage 47 can also be arranged in the device 40. This means the travel carriage 47 can also be used for translational movement of the cover 32.

Figure 13B:
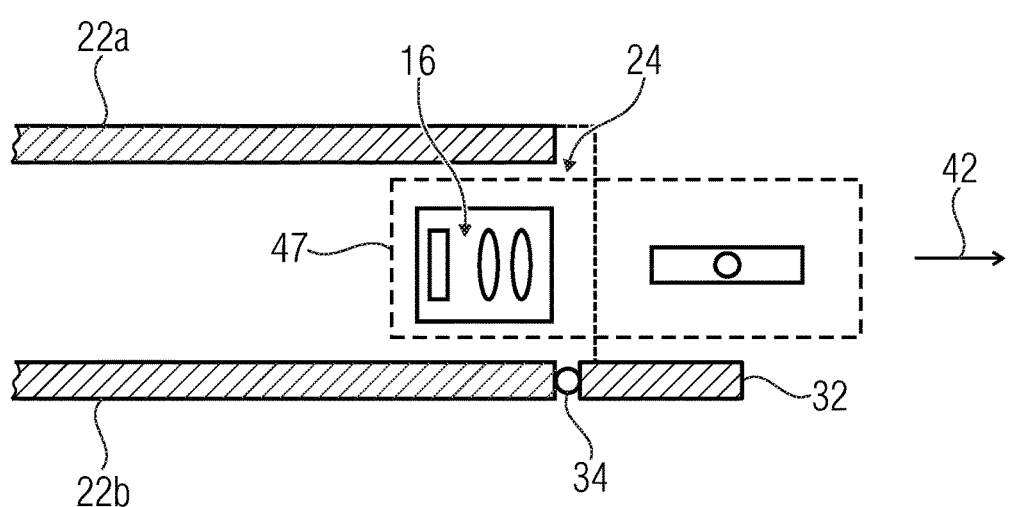
FIG. 13b is a schematic side sectional view of the device of FIG. 13a where a travel carriage is translationally moveable.

FIG. 13b shows a schematic side sectional view of the device 50 where the travel carriage 47 is moved along the translational direction of movement 42, such that the beam-deflecting means 18 is moved out of the housing volume 24. The image sensor 12 and/or optics of the optical channels 16 can also be mechanically connected to the travel carriage 47 and can be moved together with the beam-deflecting means 18 to the same extent. Alternatively, the image sensor 12 and/or the optics of the optical channels 16 can be moveable to a smaller extent than the beam-deflecting means 18, such that a distance between the image sensor 12, the optics and/or beam-deflecting means 18 increases during extension. Alternatively or additionally, the image sensor 12 and/or the optics of the optical channels can be located stationary with respect to the housing, such that merely the beam-deflecting means 18 is moved by means of the travel carriage 47. An increasing distance between the image sensor 12, the optics and/or beam-deflecting means 18 during an extension allows a lower distance of the components in the first operating state, such that the multi-aperture imaging device can be accommodated in the housing 22 with less installation space requirements.

Figure 13C:
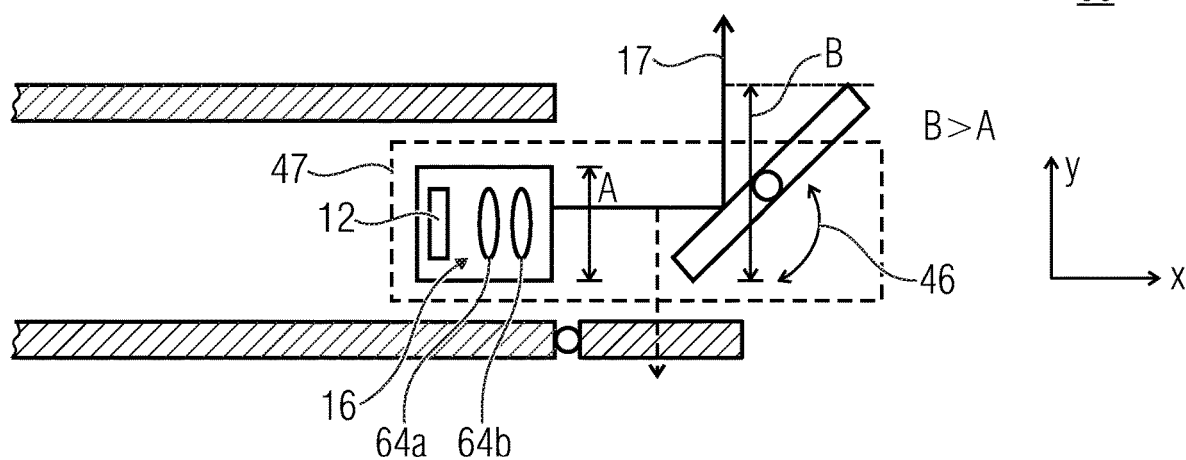
FIG. 13c is a schematic side sectional view of the device of FIG. 13a in the second operating state.

FIG. 13c shows a schematic side sectional view of the device 50 in the second operating state. The beam-deflecting means can be pivoted for performing the rotational movement 46 as described, for example, for the device 40. As described in the context of FIG. 12b, the angular orientation of the beam-deflecting means 18 can be amended compared to the first operating state of FIG. 13a or the state in FIG. 13b, such that the area of the beam-deflecting means used by the optical path of the multi-aperture imaging device increases compared to the first operating state. The side of the beam-deflecting means 18 facing the optical channels 16 and the image sensor 12, respectively, can have a dimension B perpendicular to the translational direction of movement 42, for example along the y direction that is greater than a dimension A of the image sensor 12 and the optical channels 16, respectively, along this direction. The dimension B is, for example, perpendicular to a line-extension direction of the array and parallel to a surface of an image sensor on which the optical channels impinge. This can have the effect that a high amount of light can be deflected by the beam-deflecting means 18 and a brightness of an image to be captured is high. In a position shown in FIG. 13a, the extension or dimension B is smaller than in the position shown in FIG. 13c or a position where the beam-deflecting means 18 directs the optical path in another viewing direction.

Figure 14A:
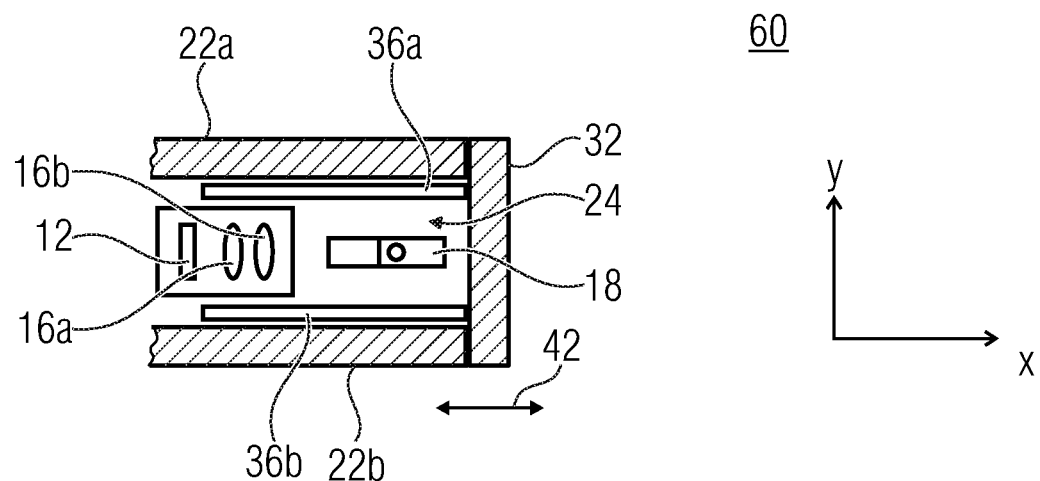
FIG. 14a is a schematic side sectional view of a device according to an embodiment in the first operating state comprising at least partly transparent covers compared to the device of FIG. 13.

FIG. 14a shows a schematic side sectional view of a device 60 according to an embodiment in the first operating state. The beam-deflecting means 18 is in the first position. Compared to the device 40 and the device as described in FIGS. 4a and 4b, the device 50 comprises at least partly transparent covers 36a and 36b that are connected to the cover 32 and can be moved with the same along the translational direction of movement 42. The at least partly transparent covers 36a and 36b can each be arranged on different sides of the beam-deflecting means 18 between the same and the housing 22. In the first operating state, the covers 36a and 36b can be arranged partly or completely inside the housing volume 24. The covers 36a and 36b can be arranged, for example, on the travel carriage 47 illustrated in FIG. 13a-c or can be transparent areas of the travel carriage 47.

Figure 14B:
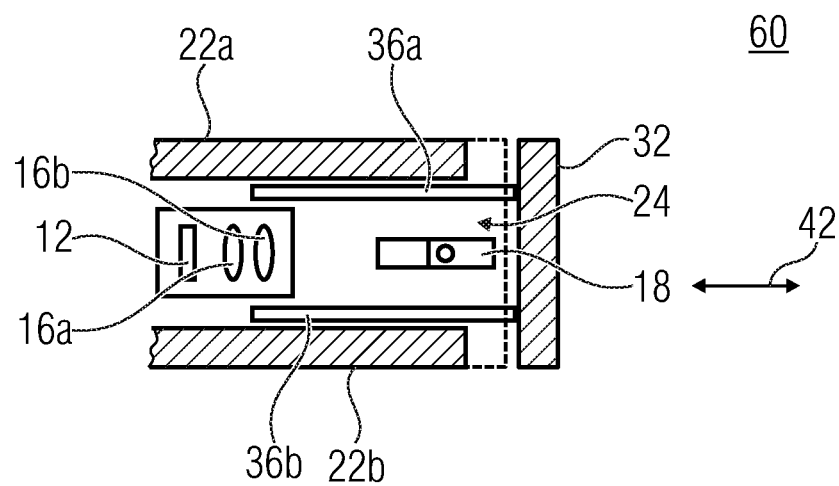
FIG. 14b is a schematic side sectional view of the device of FIG. 14a wherein the beam-deflecting means comprises an intermediate position between a first position and a second position.

FIG. 14b shows a schematic side sectional view of the device 60 where the beam-deflecting means 18 is in an intermediate position between the first position and the second position. The intermediate position of the beam-deflecting means can be obtained, for example, during retraction or extension of the beam-deflecting means 18 into the housing volume 24 and out of the housing volume 24, respectively. The beam-deflecting means 18 is partly moved out of the housing volume 24.

Figure 14C:
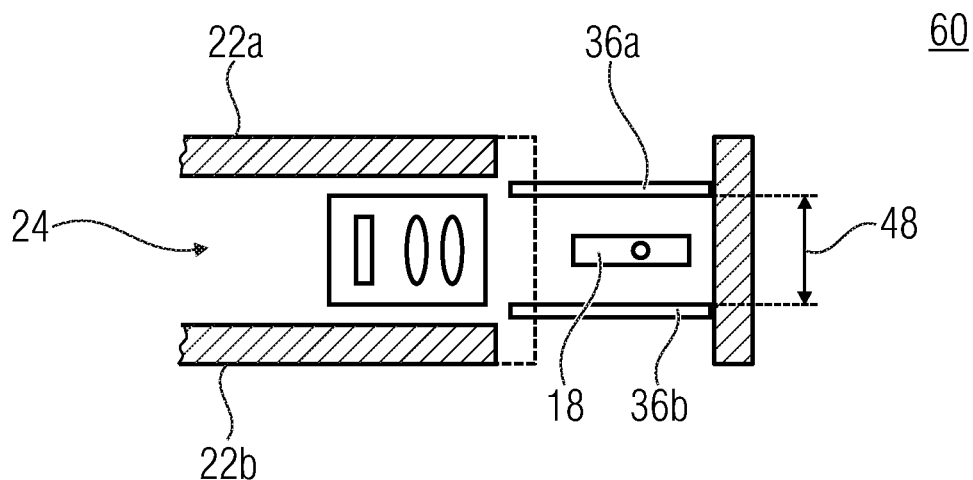
FIG. 14c is a schematic side sectional view of the device of FIG. 14a where the beam-deflecting means is completely extended out of a housing volume.

FIG. 14c shows a schematic side sectional view of the device 60 where the beam-deflecting means 18 is in the second position, i.e., the beam-deflecting means 18 is, for example, completely extended out of the housing volume 24. The at least partly transparent covers 26a and 36b have a distance 48 to one another that is smaller than a comparative distance between lateral faces of the housing 22a and 22b.

Figure 14D:
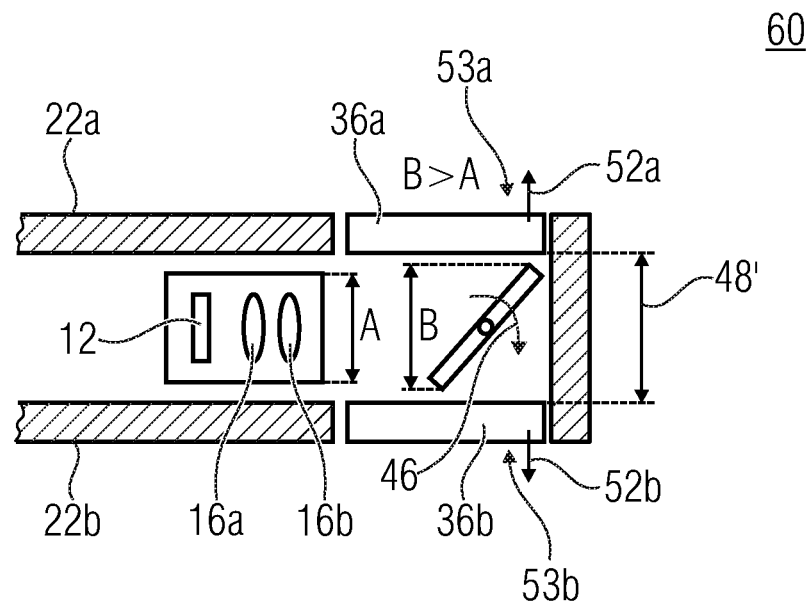
FIG. 14d is a schematic side sectional view of the device of FIG. 14a where a distance between the at least partly transparent covers is enlarged compared to FIG. 14a-c.

FIG. 14d shows a schematic side sectional view of the device 60 where a distance of the at least partly transparent covers 36a and 36b is enlarged compared to FIGS. 14a-c. The at least partly transparent covers 36a and/or 36b can be moveable along a translational direction of movement 52a and 52b, respectively, e.g. along a positive or negative y direction facing away from the respective other at least partly transparent cover 36a and 36b, respectively. The state of the at least partly transparent covers 36a and 36b illustrated in FIG. 14a-c can be considered as retracted or folded-in state. The state illustrated in FIG. 14d can be considered as extended or folded out state, where a distance 48' between the at least partly transparent covers 36a and 36b is changed and enlarged, respectively, with respect to the distance 48. The distance 48' can, for example, be greater than or equal to the distance between the comparable sides of the housing 22. The beam-deflecting means 18 is configured to deflect the optical paths of the optical channels such that the same run through the at least partly transparent covers 36a and/or 36b. As described in the context of FIG. 12b, FIG. 13a and FIG. 13b, the angular orientation of the beam-deflecting means 18 can be amended compared to the first operating state of FIG. 14a or the state in FIG. 14b or 14c, such that the area of the beam-deflecting means used by the optical path of the multi-aperture imaging device increases compared to the first operating state. Alternatively or additionally, the enlarged distance 48' can allow an increased extent of the rotational movement 46. With the rotational movement 46, the beam-deflecting means 18 can be switchable between at least a first and a further position, wherein each position can be allocated to a viewing direction of the multi-aperture imaging device. A rotation of the mirror can be analog or stable along one/several directions. The rotational movement 46 for changing a viewing direction of the multi-aperture imaging device can be combined with a rotational movement of the beam-deflecting means 18 for optical image stabilization, which is described in the context of FIG. 9. The covers 36a and/or 36b can encapsulate the other components of the multi-aperture imaging device.

The oppositely arranged covers 36a and/or 36b and transparent areas thereof, respectively, can comprise a switchable diaphragm, such that the switchable diaphragm is introduced, for example, above and/or below or along any direction of the beam-deflecting means. The diaphragm can be switched depending on the operating state and viewing direction of the camera. For example, a viewing direction of the multi-aperture imaging device which is not used can be at least partly closed by the diaphragm for reducing entry of stray light. The diaphragms can be, for example, mechanically moved or can be electrochromic. The areas influenced by the diaphragm can additionally be provided with a switchable diaphragm which covers the optical structure for the case of non-usage. The diaphragm can be electrically controllable and can include an electrochromic layer (sequence). The diaphragm can include a mechanically moved part. The movement can be performed by using pneumatic, hydraulic, piezoelectric actuators, DC motors, step motors, thermal actuators, electrostatic actuators, electrostrictive and/or magnetostrictive actuators or drives. In a state of the multi-aperture imaging device where the viewing direction penetrates a diaphragm, the diaphragm can be switched such as to let the optical paths of the optical channels pass. This means that the multi-aperture imaging device can have a first operating state and a second operating state. The beam-deflecting means can deflect the optical path of the optical channels in the first operating state such that the same passes through a first transparent area of the cover 36a. In the second operating state, the optical path of the optical channels can be deflected such that the same passes through a second transparent area of the cover 36b. A first diaphragm 53a can be configured to optically close the first transparent area in the second operating state at least partly. A second diaphragm 53b can be configured to optically close the second transparent area at least partly in the first operating state at times. In that way, entry of stray light from a direction which is not the current viewing direction of the multi-aperture imaging device can be reduced, which has an advantageous effect on the image quality. The first and/or second diaphragm 53a-b can be effective for at least one, for at least two or for all of the optical channels. For example, at least one, at least two or all optical channels of the multi-aperture imaging device can pass through the first diaphragm when the optical path of the optical channel is directed through the first transparent area and can pass through the second diaphragm when the optical path of the optical channels is directed through the second transparent area.

It should be noted that it is possible to combine a mechanism for folding out the beam-deflecting means according to FIGS. 2 and 3 with a mechanism for translational movement, i.e., mixed forms can occur. Folding out the housing and/or extending the beam-deflecting means can be performed such that possibly the imaging module, i.e., the optical channels, optics thereof and/or the image sensor are moved out of the housing volume. An angular change of the beam-deflecting means can enable an extension of the multi-aperture imaging device in thickness direction to be large and/or that the beam-deflecting means can unimpededly deflect the optical path towards the "front" and "back". Cover glasses, such as the covers 36 can also be fixed with respect to the folded out or extended elements. The cover glasses can have any planar or non-planar surface.

Figure 15:
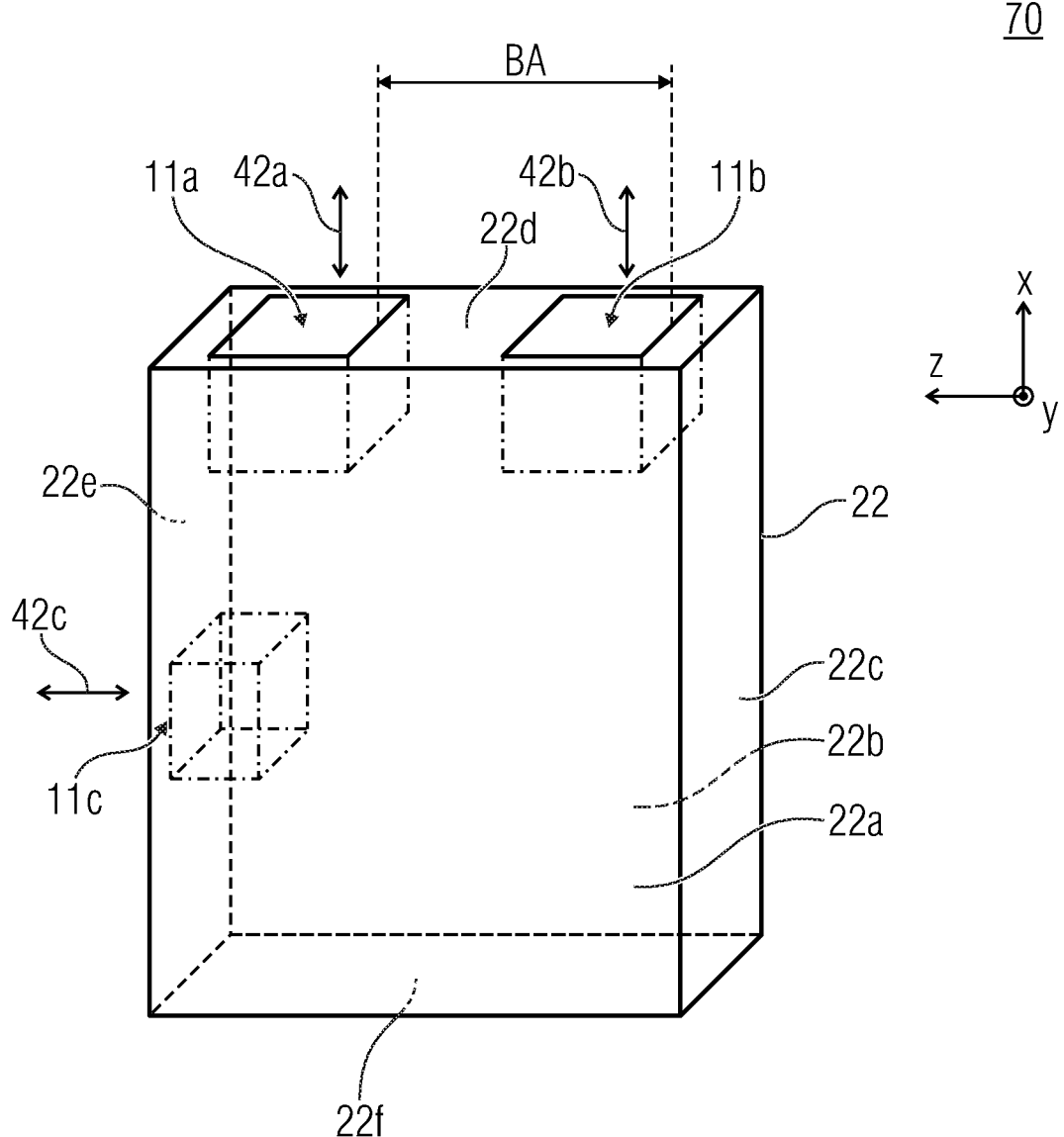
FIG. 15 is a schematic perspective view of a device according to an embodiment comprising three multi-aperture imaging devices.

FIG. 15 shows a schematic perspective view of a device 70 according to an embodiment having the three multi-aperture imaging devices 11a-c. The device 70 can comprise the processor 1002, as it is described for the multi-aperture imaging device 1000. The multi-aperture imaging devices 11a-c can be translationally movable along a respective translational movement direction 42a-c. The multi-aperture imaging devices 11a-c can be arranged in secondary sides 22c-f of the housing 22. The housing can be formed in a flat manner, this means a first extension of the housing 22 along a first housing direction, for example an x direction, and a second extension of the housing 22 along a second housing direction, for example a z direction can have at least a three-fold dimension, at least a five-fold or at least a seven-fold dimension compared to a third extension of the housing 22 along a third housing direction, such as a y direction. A main side 22a and/or 22b of the housing 22 can have the first and second dimension and can be arranged, for example, in parallel to an x/z plane in space. The secondary sides 22c-f can connect the main sides 22a and 22b and can be arranged between the same, respectively.

The multi-aperture imaging devices 11a and 11b can be arranged in or on the same side 22d in the housing 22 and can have, for example, a base distance BA to one another, such as for the purpose of stereoscopy. More than two modules would also be possible. In this way, the total field of view can be captured, for example, stereoscopically or higher by usage of the multi-aperture imaging device 11c and at least one further multi-aperture imaging device 11a and/or 11b. The multi-aperture imaging devices 11a, 11b and/or 11c can be individually moveable. Alternatively, two or more of the modules can also be movable together as total system.

As will be described in detail below, the device 70 can be configured to capture a total field of view at least stereoscopically. The total field of view is arranged, for example, on one of the main sides 22a or 22b, but can also be arranged on a secondary side 22c-f. For example, the multi-aperture imaging devices 11a-c can each capture the total field of view. While the multi-aperture imaging devices 11a-c are illustrated in a manner spatially spaced apart from one another, the multi-aperture imaging devices 11a, 11b and/or 11c can also be arranged spatially adjacent or combined. The arrays of the imaging devices 11a and 11b, possibly arranged in a single line, can, for example, be arranged beside one another or parallel to one another as described, for example, in the context of FIG. 21b. The arrays can form lines with respect to one another, wherein each multi-aperture imaging device 11a and 11b comprises a single-line array. The imaging devices 11a and 11b can comprise a common beam-deflecting means and/or a common carrier of optics of the optical channels and/or a common image sensor.

Figure 16:
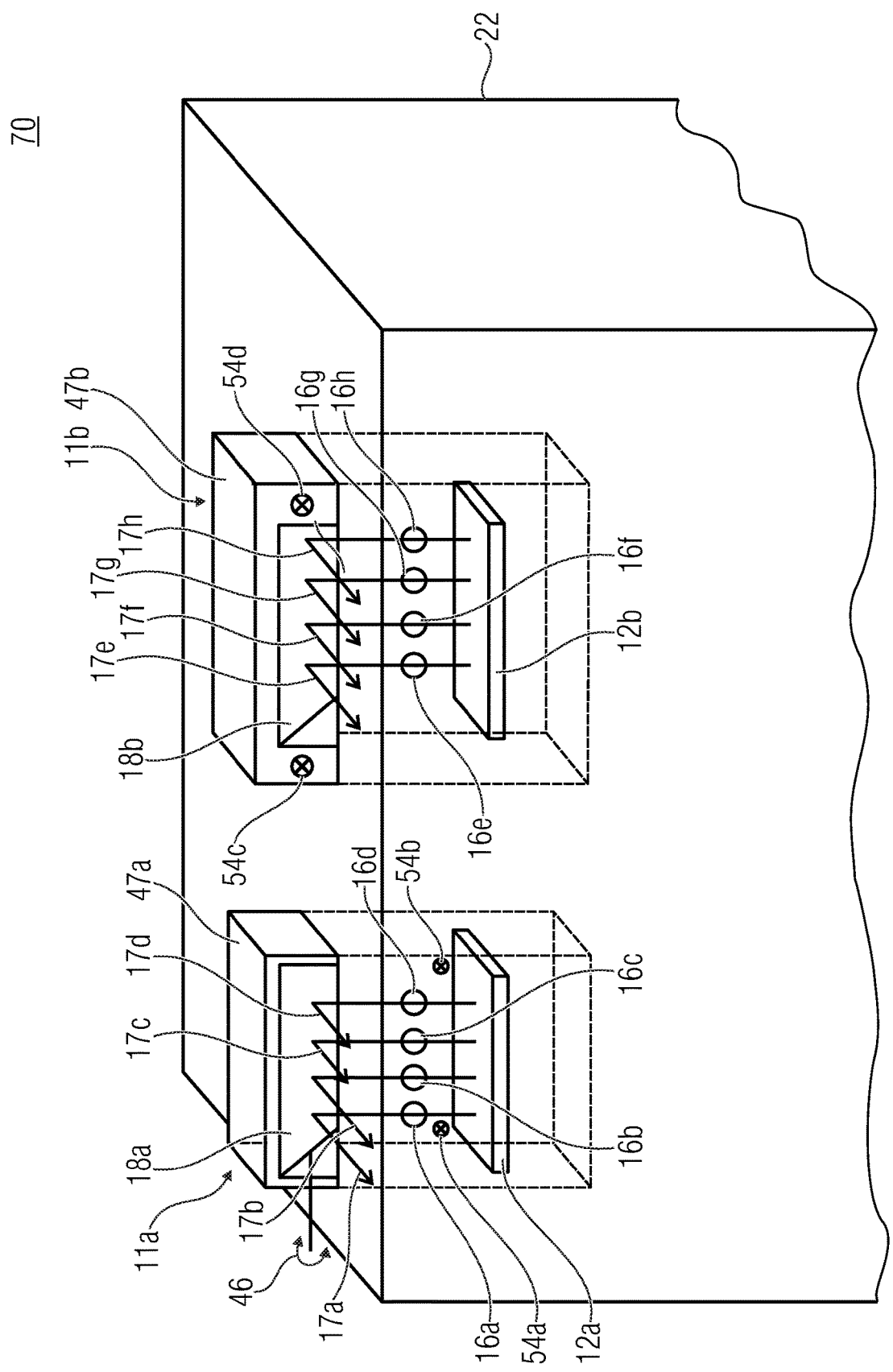
FIG. 16 is an enlarged perspective view of a section of the device of FIG. 15.

FIG. 16 shows an enlarged perspective view of a section of the device 70 and the multi-aperture imaging devices 11a and 11b. The device 70 is in the second operating state. The multi-aperture imaging device 11a and/or 11b projects, for example, beyond the original housing side. The beam-deflecting means 18a and 18b are moved at least partly and based on the translational directions of movement 42a and 42b outside the housing volume. Alternatively, in the second operating state, merely part of the beam-deflecting means of the multi-aperture imaging devices 11a-c can be moved out of the housing volume of the housing 22.

The multi-aperture imaging devices 11a-b comprise, for example, four optical channels 16a-d and 16e-h each. The beam-deflecting means 18a and 18b are each configured to deflect the optical paths 17a-d and 17e-h, respectively, of the optical channels 16a-d and 16e-h, respectively. As will be described in detail below, other multi-aperture imaging devices can have a differing number of optical channels. The multi-aperture imaging devices 11a-b can have the same or a differing number of optical channels.

The multi-aperture imaging devices 11a and 11b each comprise illumination means 54a and 54b and 54c and 54d, respectively. The illumination means 54a-d are configured to illuminate the total field of view to be captured at least partly and, for example, can each be configured to illuminate a center of the total field of view (object area) to be captured. According to an embodiment, at least one of the illumination means 54a or 54b and 54c or 54d, respectively, can be arranged such that the same illuminates the total field of view along a central viewing direction of the optical channels 16a-d and 16e-h, respectively. The total field of view can comprise differing partial fields of view that are each captured by at least one optical channel 16a-d and 16e-h, respectively. A central viewing direction of optical channels 16a-d or 16e-h can, for example, be a geometrical average of the viewing directions or a median value of the viewing directions.

The illumination means 54a-b and 54c-d can be operated as a flash light of the respective multi-aperture imaging device 11a or 11b and can include any light source. Advantageously, the light source can be configured, for example, as a light emitting diode (LED) since the same have low insulation space requirements and low energy requirements. According to further embodiments, a multi-aperture imaging device can include no, one or more than two illumination means 54a-d, wherein the number of illumination means 54a-d of a multi-aperture imaging device can differ from other multi-aperture imaging devices of a device or can be the same. At least one of the illumination means 54a-d can be configured to illuminate several fields of view. In that way, light can, for example, be selectively emitted by the illumination means in one or several directions. The illumination means can emit light along at least two viewing directions of the multi-aperture imaging device. For this, the illumination means can comprise at least two light sources. The light sources can emit light in opposite sides of the device. For example, one light source each can be mounted on a top and bottom, front and rear and/or left and right side of the travel carriage 47, where only the light source(s) of that side are used that opposes the field of view to be captured according to the selected orientation and hence the operating state of the beam-deflecting means 18 and emits light in its direction. The above mentioned front, rear top and bottom as well as the terms left or right merely serve for illustration purposes and are not to be understood in a limiting sense, since the same are mutually exchangeable with each orientation in space. This means, for example, that light sources 54i can be arranged on the front and rear of the travel carriage 47b and depending on the position of the beam-deflecting means 18b respective light sources can be used. The other opposite light sources can remain unused.

For example, the illumination means 54a and 54b are arranged between the beam-deflecting means 18a and the image sensor 12a of the multi-aperture imaging device 11a. The beam-deflecting means 18 can be configured to deflect illumination radiation, for example flashlight, emitted by the illumination means 54a and/54b. The illumination means 54a-b can be arranged in the first operating state and in the second operating state of the device 70 inside the housing volume. The illumination radiation can be at least partly part of the optical paths 17a-d. As illustrated, for example, for the multi-aperture imaging device 11b, an illumination means 54c and/or 54d can be arranged laterally beside the beam-deflecting means on the travel carriage 47b. The illumination means 54c and 54d can be moved with the translational movement 42b into the housing 22 or out of the housing 22. While the illumination means is described in the context of the device 70, also other devices or multi-aperture imaging devices described herein can comprise an illumination means.

The illumination means 54c and 54d can be mechanically connected to the travel carriage 47a and can thus be arranged within the volume 42 in the first operating state and hence be arranged in a manner invisible for a user. Alternatively and/or additionally, the illumination means 54a and 54b can be arranged in a stationary manner inside the housing 22. A movement of the travel carriage 47b can effect a movement of the illumination means 54c and 54d.

Together with the beam-deflecting means 18a and 18b, respectively, optics 16a-d or 16e-f and possibly the image sensor 12a and 12b, respectively, can be moved out of the housing volume by the movement of the travel carriage 47a and 47b, respectively.

In other words, LEDs for realizing additional illumination (flash light) can be mounted on the moveable parts. Here, the LEDs can be arranged such that the same radiate in the central direction of the channels and the beam-deflecting means can provide further areas that are used for deflecting the radiation, respectively.

Figure 17:
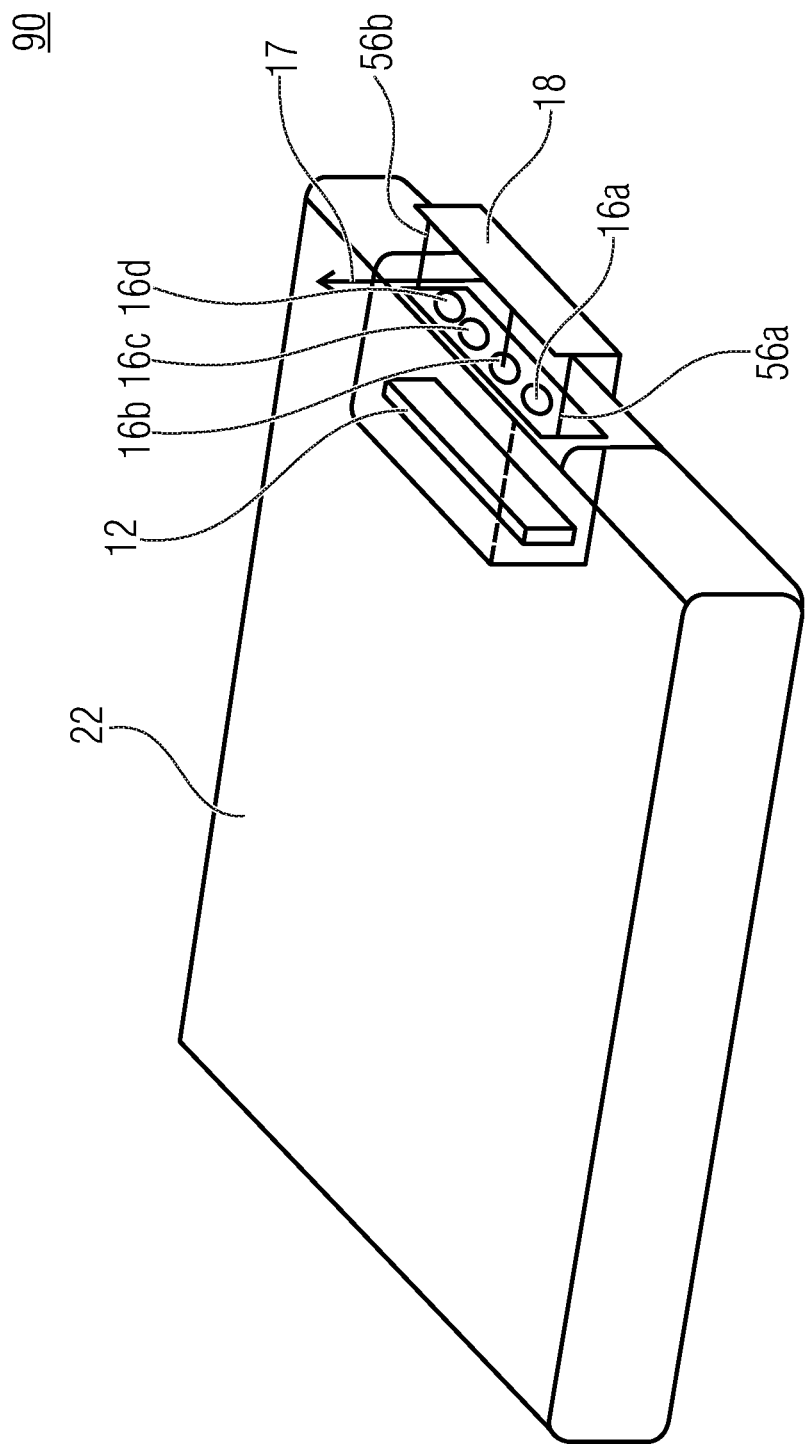
FIG. 17 is a schematic perspective view of a device according to an embodiment wherein the beam-deflecting means is connected to the multi-aperture imaging device by means of mounting elements.

FIG. 17 shows a schematic perspective view of device 90 according to an embodiment comprising the second operating state. The beam-deflecting means 18 can be connected to the multi-aperture imaging device by means of mounting elements 56a and 56b. The mounting element 56a and 56b can be part of a travel carriage.

Figure 18A:
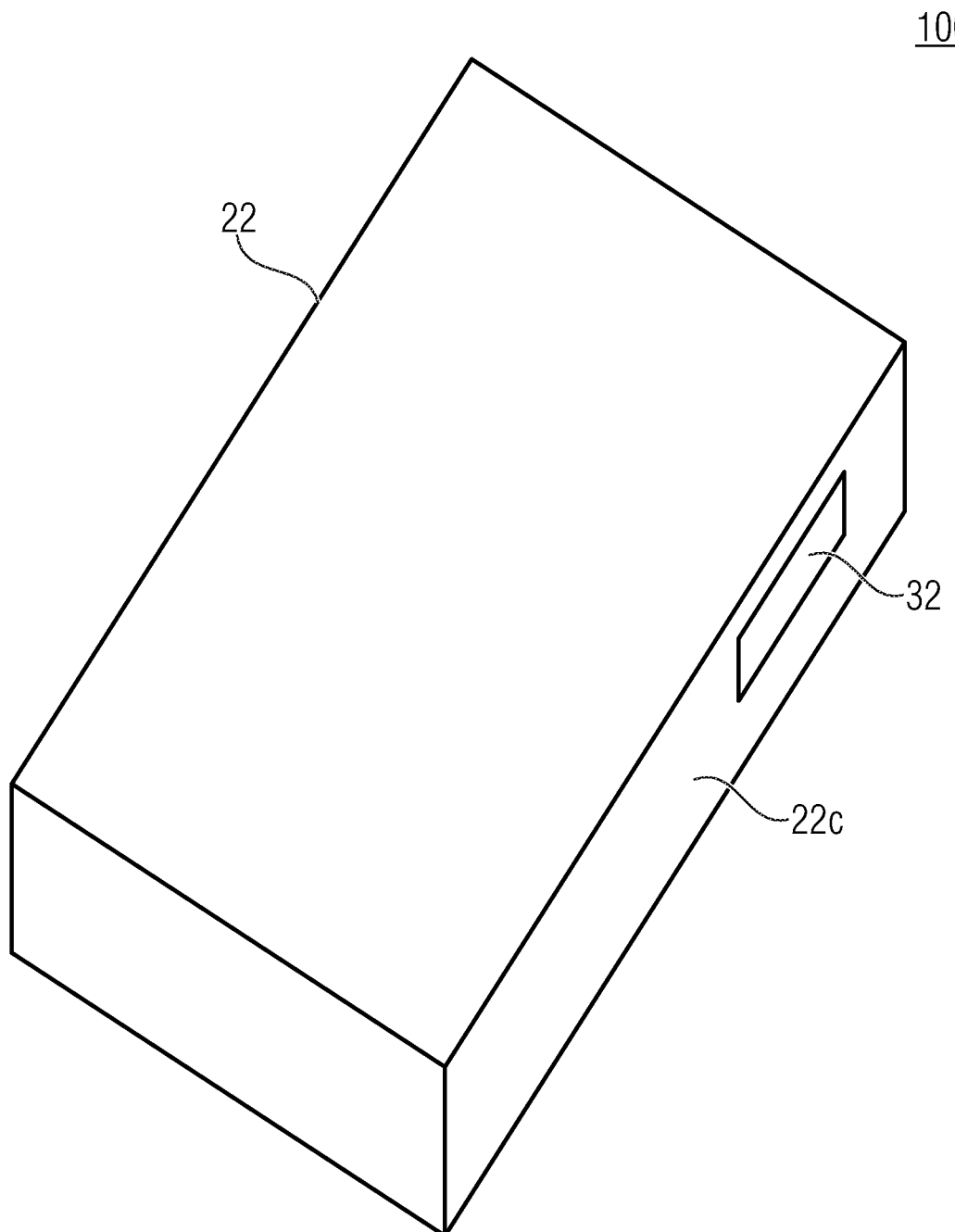
FIG. 18a is a schematic perspective view of a device according to an embodiment in the first operating state with an exemplary shape of a cover.

FIG. 18a shows a schematic perspective view of device 100 according to an embodiment in the first operating state. The cover 32 can form one plane with a housing main side and/or a housing secondary side, for example the housing plane side 22c. No gap or merely a small gap approximately less than or equal to 1 mm, less than or equal to 0.5 mm or less than or equal to 0.1 mm can be arranged between the cover 32 and the housing side 22c, such that a transition between the cover 32 and the housing side 22c is not or only hardly noticeable. Simply put, the cover 32 might not be visible.

Figure 18B:
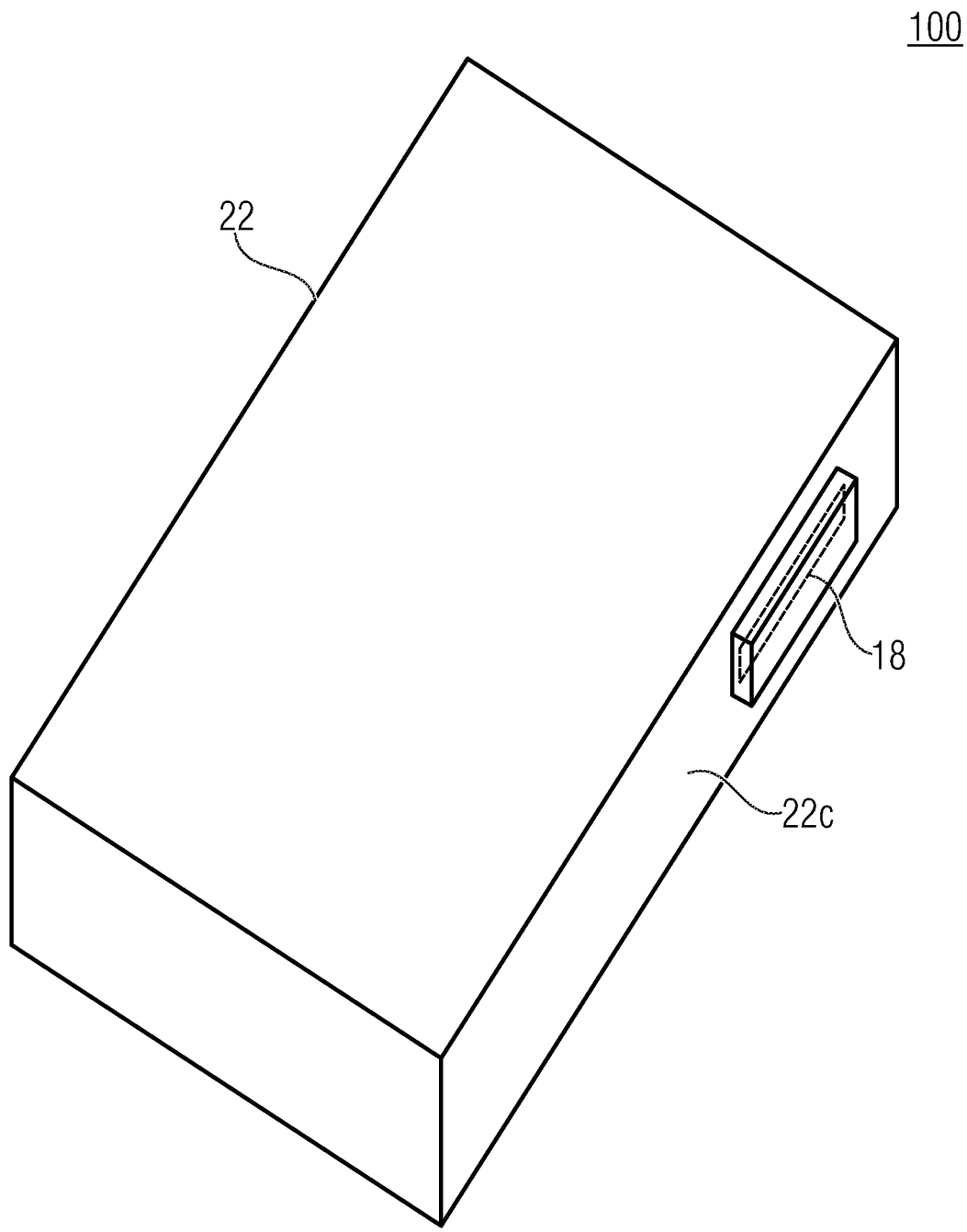
FIG. 18b is a schematic view of the device of FIG. 18a in the second operating state according to an embodiment.

FIG. 18b shows a schematic view of the device 100 in the second operating state. The beam-deflecting means 18 comprises the second position outside the housing volume. Seen from outside, the extended multi-aperture imaging device can be enclosed by the inactive housing frame on all sides and/or can have an appearance like a button. The device 100 can, for example, be configured to release a mechanical lock during mechanical pressure on the cover 32 according to FIG. 18a, such that the beam-deflecting means can be moved out of the housing 22, for example based on a spring force. The mechanical pressure can be generated, for example, by an actuator and/or by a user, such as by finger pressure. The beam-deflecting means can be moved from the second position again to the first position by means of the actuator or by means of the mechanical pressure and can activate a lock there. The actuator can, for example, be the actuator 33 or 33'. In other words, the movement can also be performed manually, such that the user retracts or extends and folds in or out, respectively, the parts or the total system on his own accord. The movement can, in particular, be a combination of manual operation and effect of spring force. In that way, the user folds or shifts parts and the total system, respectively, manually into the housing of the device, such as a smartphone, for switching off the camera, thereby compressing a spring and a locking mechanism maintains this position. When switching on the camera, for example by means of suitable software on the smartphone, the switchable locking mechanism is released by a suitable controllable mechanism, such as an electrical relay, and the spring force of the spring effects the extension and folding out, respectively, of parts of the camera and the total system, respectively. Further, the cover forming part of the housing, the extendable and/or tiltable part and/or a further mechanism based thereon can be implemented such that (finger) pressure on this cover releases the lock, the parts or the total system expand or fold out, respectively, and possibly the image capturing software on the device starts. The co-moving cover, which can form part of the housing on the lateral faces, can be enclosed on all sides by the inactive housing, visible from the outside, or can interrupt the lateral faces across the total height (=thickness direction of the housing).

Figure 18C:
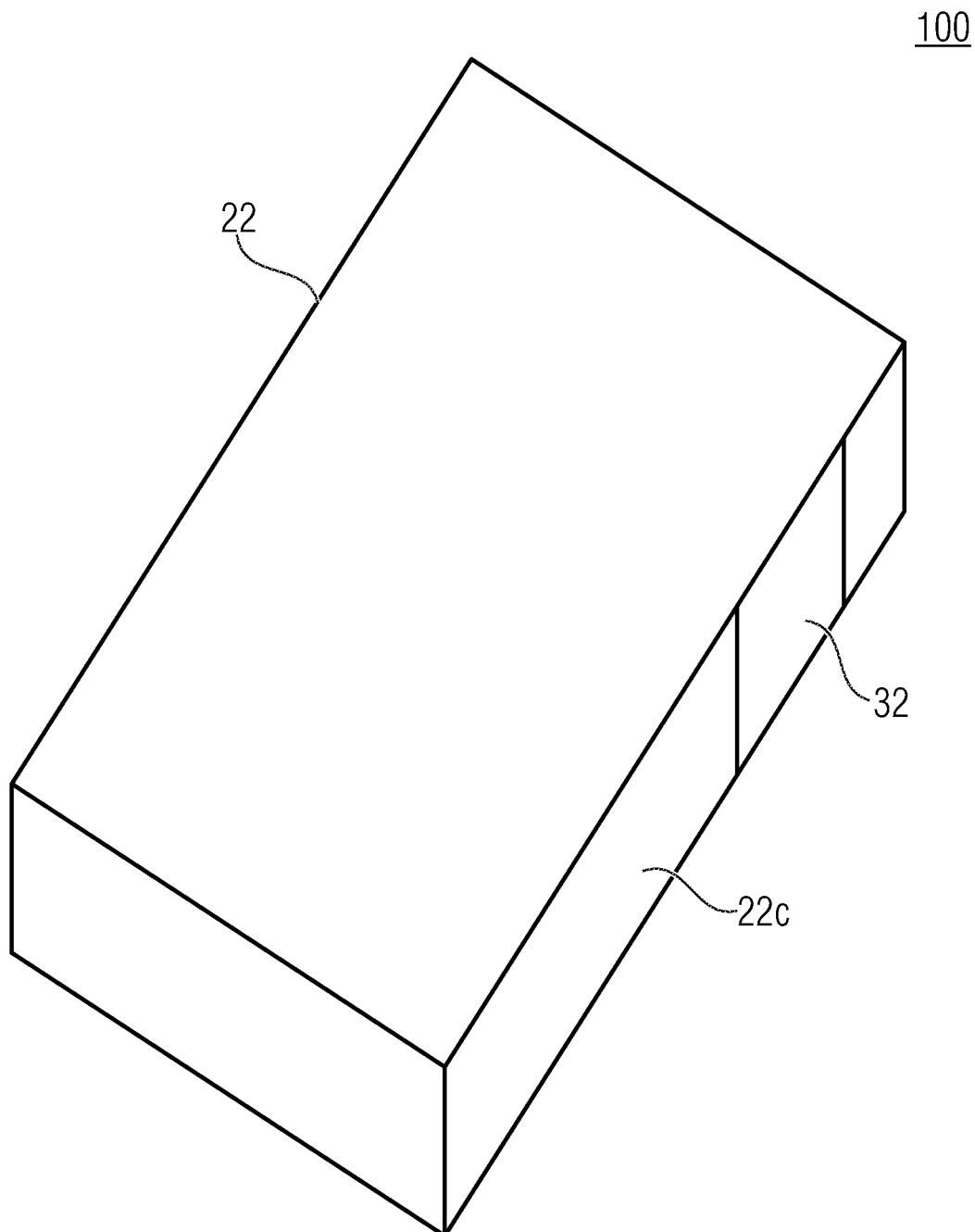
FIG. 18c is a schematic illustration of an alternative to FIG. 18a according to an embodiment.

FIG. 18c shows a schematic illustration of an alternative to FIG. 18a where the cover 32 is formed such that a continuous gap is formed in the secondary side 22c between main sides of the housing 22. This enables that merely two instead of four gaps illustrated in FIG. 18a can be perceived in the housing 22. The extendable or foldable cover 32 and/or further covers can be formed as part(s) of the housing 22 on one or several lateral faces of the flat housing.

In the following, reference is made to some possible embodiments of the multi-aperture imaging device as it can be used according to embodiments.

Figure 19A:
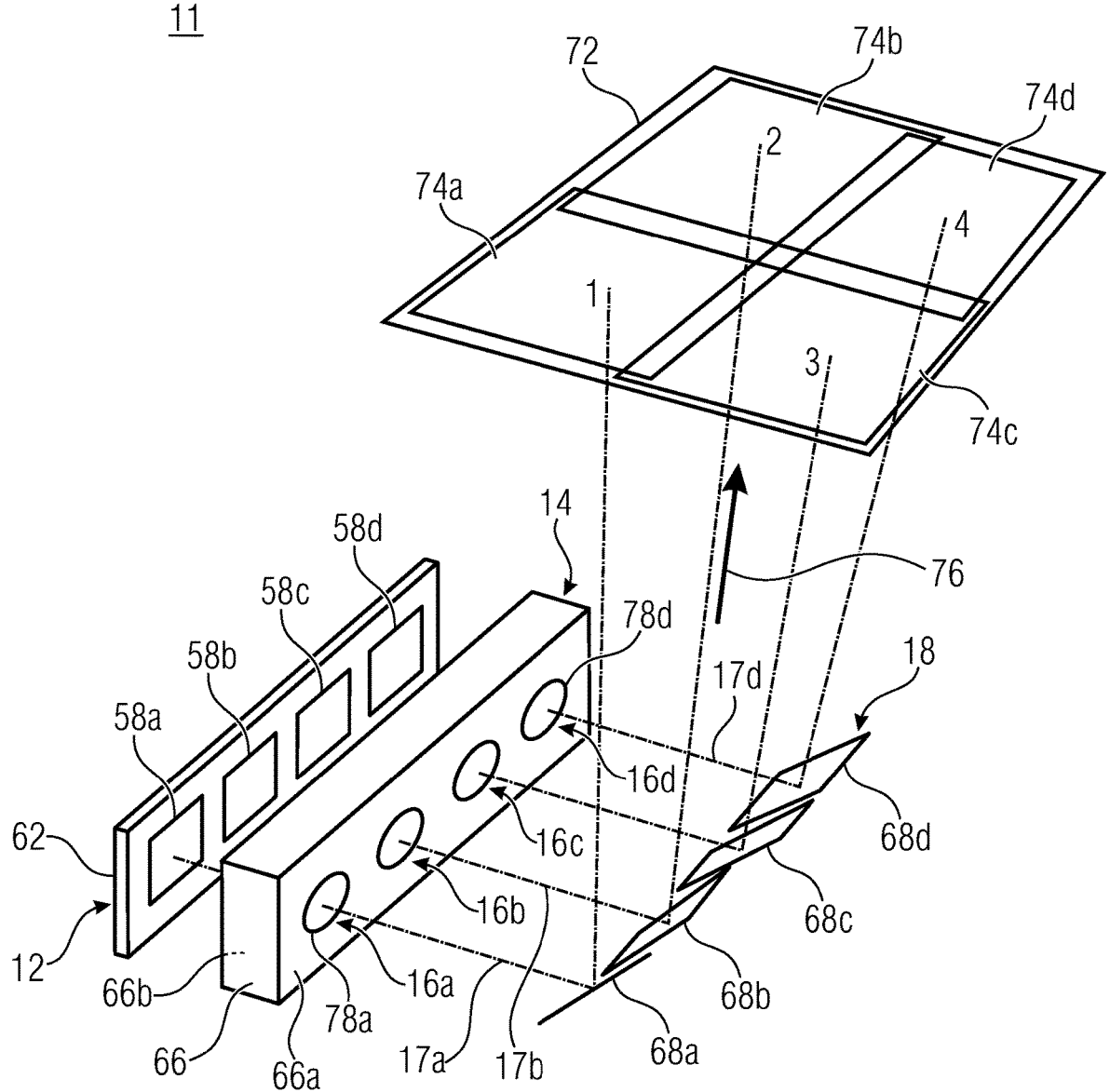
Figure 19B:
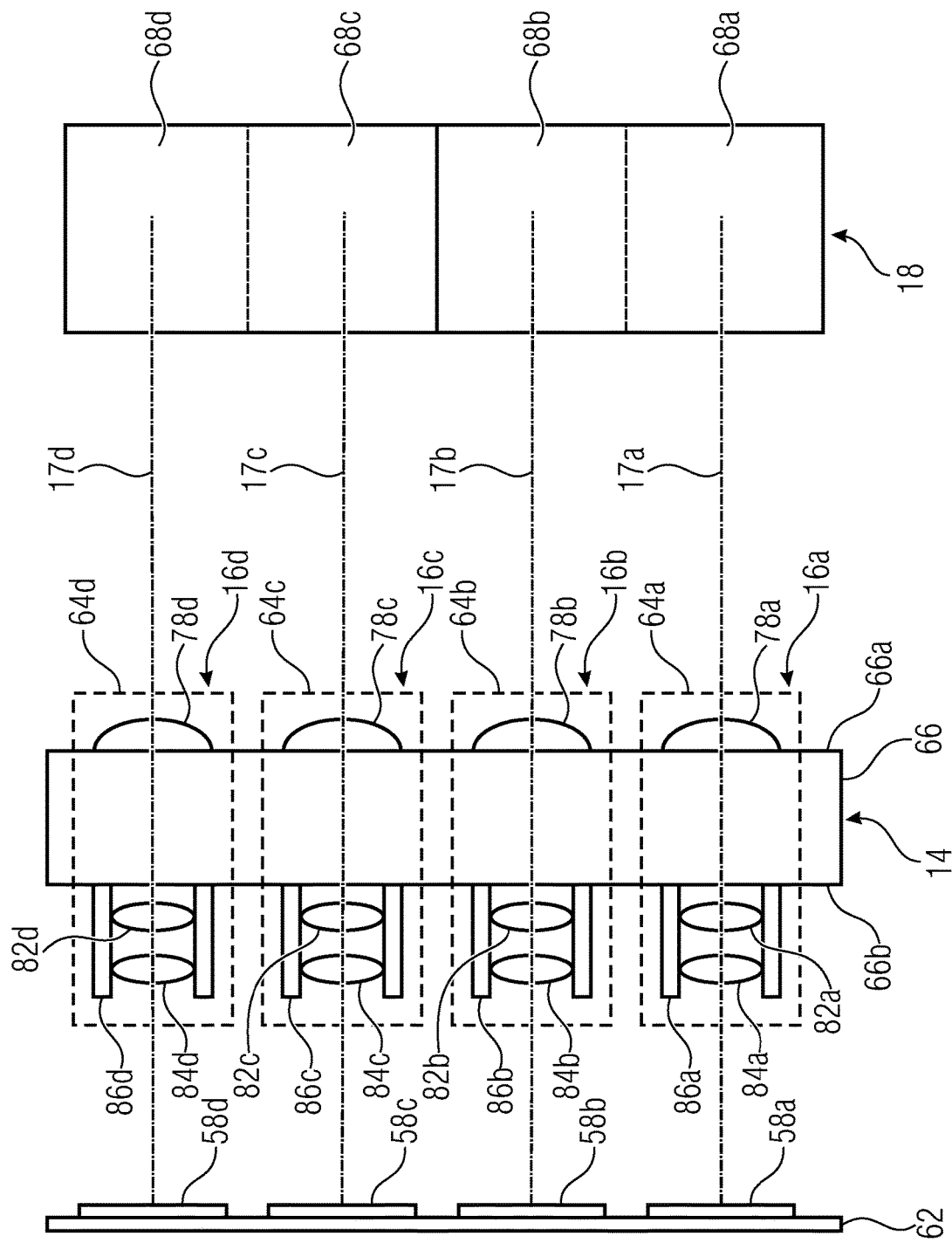

FIGS. 19a-c show a multi-aperture imaging device 11 according to an embodiment of the present invention. The multi-aperture imaging device 11 of FIGS. 19a-c includes a single-line array 14 of juxtaposed optical channels 16a-d. Each optical channel 16a-d includes optics 64a-d for projecting a respective partial field of view 74a-d of a total field of view 72 of the device 11 on a respectively allocated image sensor area 58a-d of an image sensor 12. The image sensor areas 58a-d can, for example, each be formed of one chip including a respective pixel array, wherein the chips can be mounted on a common substrate and a common printed circuit board 62, respectively, as indicated in FIGS. 19a-c. Alternatively, it would also be possible that the image sensor areas 58a-d are each formed of part of a common pixel array continuously extending across the image sensor areas 58a-d, wherein the common pixel array is formed, for example, on a single chip. For example, merely the pixel values of the common pixel array are read out in the image sensor areas 58a-d. Different mixtures of these alternatives are also possible, such as the presence of one chip for two or more channels and a further chip for again other channels or the same. In the case of several chips of the image sensor 12, the same can be mounted, for example, on one or several printed circuit boards, such as e.g., all together or in groups or the same.

In the embodiment of FIGS. 19a-c, four optical channels 16a-d are arranged in a single line beside one another in line-extension direction of the array 14, but the number four is merely exemplary and could also be any other number greater than one. Above that, the array 14 can also comprise further lines extending along the line-extension direction.

Optical axes and optical paths 17a-d, respectively, of the optical channels 16a-d run parallel to one another between the image sensor areas 58a-d and the optics 64a-d. For this, the image sensor areas 58a-d are arranged, for example, in a common plane and also the optical centers of optics 64a-d. Both planes are parallel to one another, i.e., parallel to the common plane of the image sensor areas 58a-d. Additionally, in a projection perpendicular onto the plane of the image sensor areas 58a-d, optical centers of the optics 64a-d coincide with centers of the image sensor areas 58a-d. In other words, in these parallel planes, optics 64a-d on the one hand and image sensor areas 58a-d are arranged with the same repeat distance in line-extension direction.

An image-side distance between image sensor areas 58a-d and the allocated optics 64a-d is adjusted such that the projections on the image sensor areas 58a-d are set to a desired object distance. The distance is, for example, in a range equal to or greater than the focal length of optics 64a-d or, for example, in a range between one time and two times the focal length of the optics 64a-d, both inclusive. The image-side distance along the optical axes 17a-d between image sensor area 58a-d and optics 64a-d can also be adjusted, such as manually by a user or automatically via autofocus control.

Without additional measures, the partial fields of view 74a-d of the optical channels 16a-d overlap essentially completely due to the parallelism of the optical paths and optical axes 17-d, respectively. For covering a greater total field of view 72 and so that the partial fields of view 74a-d merely overlap partly in space, the beam-deflecting means 18 is provided. The beam-deflecting means 18 deflects the optical paths 17a-d and optical axes, respectively, with a channel-individual deviation into a total field of view direction 76. The total field of view direction 76 runs, for example, parallel to a plane that is perpendicular to the line-extension direction of the array 14 and parallel to the course of the optical axes 17a-d prior to and without beam deflection, respectively. For example, the total field of view direction 76 results from the optical axes 17a-f by rotation around the line-extension direction by an angle that is >0° and <180° and is, for example, between 80 and 100° and can, for example, be 90°. Thus, the total field of view of the device 11 corresponding to the total coverage of the partial fields of view 74a-d is not in the direction of an extension of the series connection of the image sensor 12 and the array 14 in the direction of the optical axes 17a-d, but due to the beam deflection, the total field of view is on the side of the image sensor 12 and array 14 in a direction in which the installation height of the device 11 is measured, i.e., the lateral direction perpendicular to the line-extension direction. Additionally, the beam-deflecting means 18 deflects each optical path and the optical path of each optical channel 16a-d, respectively, with a channel-individual deviation from the deflection resulting in the direction 76 mentioned above. For this, the beam-deflecting means 18 comprises a reflecting facet 68a-d for each channel 16a-d. The same are slightly inclined with respect to one another. The mutual tilting of the facets 68a-d is selected such that, during beam deflection by the beam-deflecting means 18, the partial fields of view 74a-d are provided with a slight divergence such that the partial fields of view 74a-d overlap merely partly. Here, as indicated exemplarily in FIG. 19a, the individual deflection can also be designed such that the partial fields of view 74a-d cover the total field of view 72 in a two-dimensional manner, i.e., are arranged in a two-dimensionally distributed manner in the total field of view 72.

It should be noted that many of the details described so far concerning the device 11 have merely been selected exemplarily. This already concerned, for example, the above-mentioned number of optical channels. The beam-deflecting means 18 can also be formed differently than described above. For example, the beam-deflecting means 18 is not necessarily reflective. The same can also be implemented differently than in the form of a facet mirror, such as in the form of transparent prism wedges. In that case, for example, the average beam deflection could be 0°, i.e., the direction 76 could, for example, be parallel to the optical paths 17a-d prior to or without beam deflection or, in other words, the device 11 could still "look straight ahead" despite beam-deflecting means 18. The channel-individual deflection by the beam-deflecting means 18 would again have the effect that the partial fields of view 74a-d merely slightly overlap, such as in pairs with an overlap <10% with regard to the spatial angular ranges of the partial fields of view 74a-d.

Also, the optical paths and optical axes, respectively, could deviate from the described parallelism and the parallelism of the optical paths of the optical channels could still so distinct that the partial fields of view that are covered by the individual channels 16a-N and projected on the respective image sensor areas 58a-d, respectively, would mostly overlap without further measures, namely beam deflection, such that in order to cover a greater total field of view by the multi-aperture imaging device 11, the beam-deflecting means 18 would provide the optical paths with an additional divergence such that the partial fields of view of N optical channels 16a-N overlap less. The beam-deflecting means 18 has, for example, the effect that the total field of view has an aperture angle that is greater than 1.5 times the aperture angle of the individual partials fields of view of the optical channels 16a-N. With some sort of pre-divergence of the optical paths 17a-d, it would also be possible that, for example, not all facet inclinations differ but that some groups of channels have, for example, the facets with the same inclination. The latter could then be formed integrally and continuously merging, respectively, as virtually one facet that is allocated to this group of channels adjacent in line-extension direction. The divergence of the optical axes of these channels could then originate from the divergence of these optical axes, as it is obtained by lateral offset between optical centers of the optics and image sensors areas of the channels or prism structures or decentered lens sections. The pre-divergence could be limited, for example, to one plane. Prior to or without beam deflection, respectively, the optical axes could run, for example, in a common plane but divergent within the same, and the facets effect merely an additional divergence in the other transversal plane, i.e., the same are all parallel to the line-extension direction and inclined with respect to one another only varying from the above-mentioned common plane of the optical axes, wherein here again several facets can have the same inclination or can be allocated together to a group of channels, whose optical axes differ, for example, already in the above mentioned common plane of the optical axes in pairs prior to and without beam deflection, respectively.

When omitting the beam-deflecting means or implementing the beam-deflecting means as planar mirror or the same, the total divergence could be accomplished by the lateral offset between optical centers of the optics on the one hand and centers of the image sensor areas on the other hand or by prism structures or decentered lens sections.

The above-mentioned possibly existing pre-divergence can, for example, be obtained in that the optical centers of the optics are on a straight line along the line-extension direction, while the centers of the image sensor areas are arranged deviating from the projection of the optical centers along the normal of the plane of the image sensor areas on points on a straight line in the image sensor plane, such as on points deviating from the points on the above mentioned straight line in the image sensor plane in a channel-individual manner along the line-extension direction and/or along the direction perpendicular to both the line-extension direction and the image sensor normal. Alternatively, pre-divergence can be obtained in that the centers of the image sensors are on a straight line along the line-extension direction, while the centers of the optics are arranged deviating from the projection of the optical centers of the image sensors along the normal of the plane of the optical centers of the optics on points on a straight line in the optics center plane, such as on points deviating from the points on the above-mentioned straight line in the optics center plane in a channel-individual manner along the line-extension direction and/or along the direction perpendicular to both the line-extension direction and the normal of the optics center plane. It is advantageous when the above mentioned channel individual deviation from the respective projection merely runs in line-extension direction, i.e., merely the optical axes in a common plane are provided with a pre-divergence. Both optical centers and image sensor area centers are then on a straight line parallel to the line-extension direction but with different gaps in-between. A lateral offset between lenses and image sensors in perpendicular lateral direction to the line-extension direction would, in comparison, result in an enlargement of the installation height. A pure in-plane offset in line-extension direction does not change the installation height but possibly less facets result and/or the facets have only a tilting in one angular orientation which simplifies the structure.

Figure 19E:
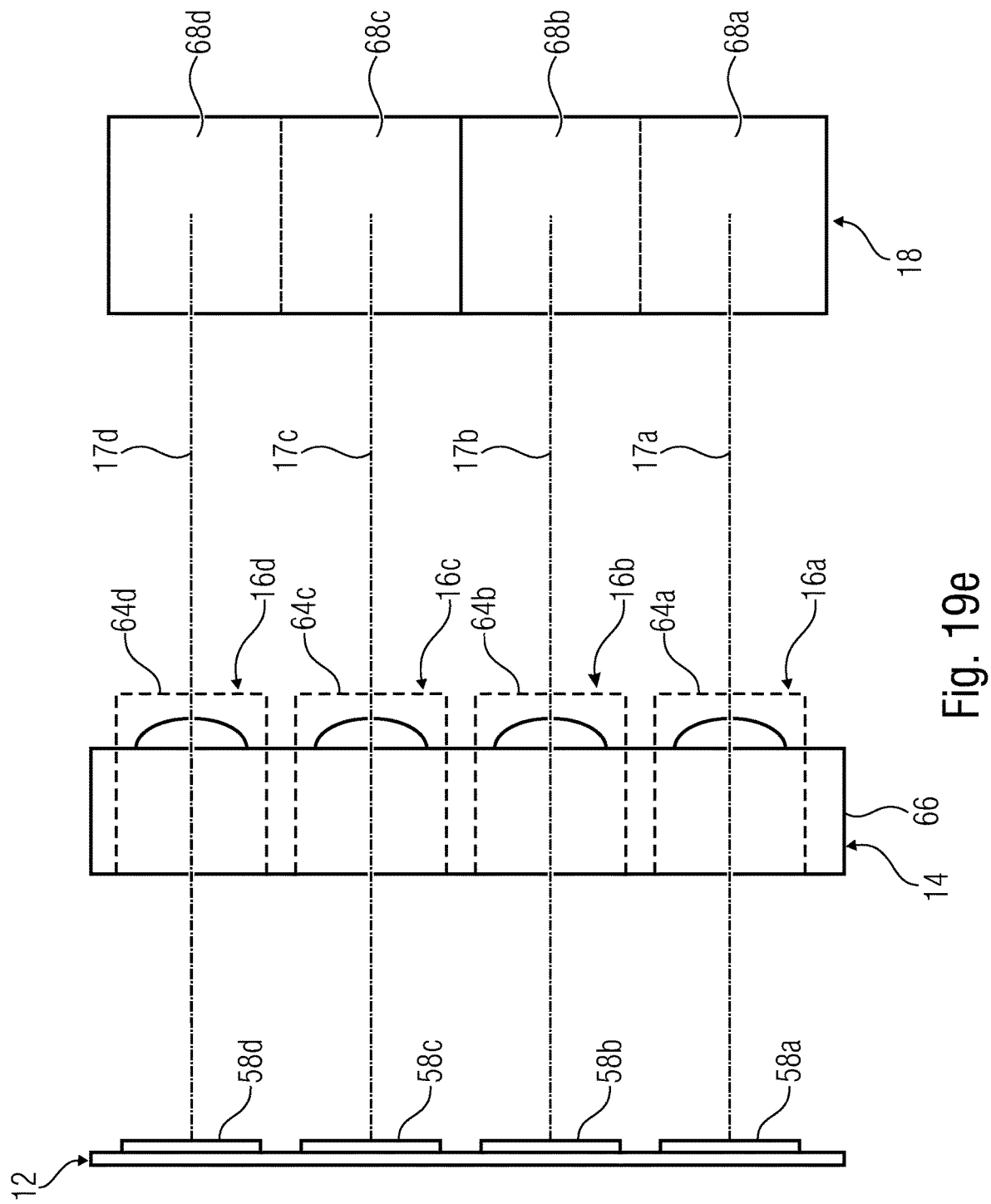

This is illustrated in FIGS. 19d and 19e exemplarily for the case of the optics held on a common carrier, where the adjacent channels 16a and 16b on the one hand and the adjacent channels 16c and 16d on the other hand comprise optical axes 17a and 17b and 17c and 17d, respectively, running in the common plane and squinting with respect to one another, i.e. provided with the pre-divergence. The facets 68a and 68b can be formed by one facet and the facets 68c and 68d can be formed by another facet as shown by dotted lines between the respective pairs of facets, and the only two facets are merely inclined in one direction and both parallel to the line-extension direction. It is also possible that individual facets merely comprise one tilting in a spatial direction.

Further, it could be provided that some optical channels are allocated to the same partial field of view, such as for the purpose of superresolution for increasing the resolution by which the respective partial field of view is scanned by these channels. The optical channels within such a group would then run parallel, for example, prior to beam deflection and would be deflected on a partial field of view by one facet. Advantageously, pixel images of the image sensor of a channel of a group would lie in intermediate positions between images of the pixels of the image sensor of a different channel of this group.

Even without superresolution purposes, but merely for stereoscopic purposes, an implementation would be possible where a group of immediately adjacent channels completely cover the total field of view in line-extension direction with their partial fields of view, and that a further group of immediately adjacent channels also completely cover the total field of view and the optical paths of both channel groups pass through the substrate and a carrier 66, respectively. This means that the multi-aperture imaging device can comprise a first plurality of optical channels that are configured to capture a total field of view, possibly completely. A second plurality of optical channels of the multi-aperture imaging device can be configured to also capture the total field of view possibly completely. In this way, the total field of view can be captured at least stereoscopically by the first plurality of optical channels and by the second plurality of optical channels. The first plurality of optical channels and the second plurality of optical channels can impinge on a common image sensor, can use a common array (array optics) and/or can be deflected by a common beam-deflecting means. In contrary to an array of individual cameras, a contiguous array camera is formed which can be controlled together as one device, for example with regard to focus and/or image stabilization, which is advantageous since all channels are influenced simultaneously and by using the same actuators. Additionally, from the monolithic structure, advantages result with regard to the mechanical stability of the total array in particular during temperature changes. This is advantageous for the assembly of the total image from the partial images of the individual channels as well as for obtaining three-dimensional object data during the usage in stereo, triple, quadruple, etc., systems with multiple scanning of the total field of view by different pluralities of channels 16.

The following discussion deals with the optics 64a-d whose lens planes are also parallel to the common plane of the image sensor areas 58a-f. As described below, lenses of the optics 64a-d of the optical channels 16a-d are mounted on a main side 66a of the substrate 66 via one or several lens holders and are mechanically connected to one another via the substrate 66. In particular, the optical paths 17a-d of the plurality of optical channels 16a-d run through the substrate 66. Thus, the substrate 66 is formed at least partly of transparent material and is plate-shaped or has, for example, the shape of a parallelepiped or another convex body having a planar main side 66a and an opposite main side 66b that is also planar. The main sides are positioned perpendicular to the optical paths 17a-d. As described below, according to embodiments, deviations from the pure parallelepiped shape can occur, which are based on an integral formation of lenses of the optics with the substrate.

The flat carrier substrate 66 in the embodiment of FIG. 11a-c is, for example, a substrate of glass or polymer. For example, the carrier substrate 66 can include a glass plate. The material of the substrate 66 can be selected according to aspects of high optical transparence and low temperature coefficient or further mechanical characteristics such as hardness, elasticity or torsion module.

The substrate 66 can be formed as simple planar part of the optical path without any additional lenses being mounted directly on the same. Additionally, diaphragms, such as aperture or stray light diaphragms or/and filter layers such as IR block filters, can be mounted on the substrate surfaces or can consist of several layers of different substrates on the surfaces of which diaphragms and filter layers can be mounted, which can differ again from channel to channel, for example as regards to their spectral absorption.

The substrate 66 can consist of a material having different characteristics in different areas of the electromagnetic spectrum that can be captured by the image sensor, in particular non-constant absorption.

In the embodiment of FIG. 19a-c, each optics 64a-d comprises three lenses. However, the number of lenses is freely selectable. The number could be 1, 2 or any other arbitrary number. The lenses could be convex, could comprise merely one optically projecting functional area, such as a spherical, aspherical or freeform area, or two opposing ones, for example, to result in a convex or concave lens shape. Also, several optically effective lens areas are possible, such as by structuring a lens of several materials.

In the embodiment of FIGS. 19a-c, a first lens 78a-d of each optical channel 16a-d or optics is formed on the main side 66a. The lenses 78a-d have been produced, for example, by molding on the main side 66a of the substrate 66 and consist, for example, of polymer, such as UV curable polymer. The molding takes place, for example by a molding tool and the annealing can, for example, take place via temperature and/or via UV radiation.

In the embodiment of FIG. 19a-c, each optics 64a-d has a further second and third lens 82a-d and 84a-d, respectively. Exemplarily, these lenses are mutually fixed via axially running tube-shaped lens holders 86a-d inside the respective lens holder and are fixed to the main side 66b via the latter, such as by means of adhering or another joining technology. Openings 88a-d of the lens holders 86a-d are provided, for example with a circular cross-section in the cylindrical inside of which the lenses 88a-d and 84a-d, respectively, are mounted. Thus, for each optics 64*a-d*, the lenses are co-axial on the respective optical axis of the optical paths 17*a-d*. The lens holders 86*a-d* can also have a cross-section varying across their length and along the respective optical axis, respectively. Here, the cross-section can have an increasingly rectangular or square character with decreasing distance to the image sensor 12. The outer shape of the lens holders can thus also differ from the shape of the openings. The material of the lens holders can be light-absorbing. According to the squinting optics described above in the context of FIGS. 11*d* and 11*e*, the lens holders can also be configured in a non-rotationally symmetric and/or non-coaxial manner.

Mounting via the above-mentioned lens holders takes, for example, place such that lens vertices of the lenses held by the same are spaced apart from the substrate 66.

As already mentioned above, it is possible that the substrate 66 is planar on both sides and hence has no refractive power effect. However, it would also be possible that the substrate 66 comprises mechanical substrates, such as recesses or projections allowing an easy form-fit and/or force-fit alignment of members to be connected, e.g. connecting individual lenses or housing parts. In the embodiment of FIG. 19*a-c*, for example, the substrate 66 could have structures easing the mounting or easing the orientation on the main side 6*b* at positions where the respective end of the tube of the lens holder 86*a-d* of the respective optics 64*a-d* is mounted. These structures can, for example be a circular recess or a recess having a different shape corresponding to the shape of the side of the respective lens holder facing the substrate which the side of the respective lens holder 84*a-d* can engage. It should again be emphasized that other opening cross-sections and hence correspondingly possibly other lens apertures than circular ones are possible.

Thus, the embodiment of FIG. 19*a-c* does not have a conventional structure of camera modules comprising individual lenses, and for holding the individual lenses, a non-transparent housing carrier completely enclosing the same. Rather, the above embodiment uses a transparent body 66 as substrate carrier. The same extends across several adjacent optical channels 16*a-d* in order to be penetrated by their projecting optical path. The same does not interfere with the projection but does also not increase the installation height.

Figure 19F:
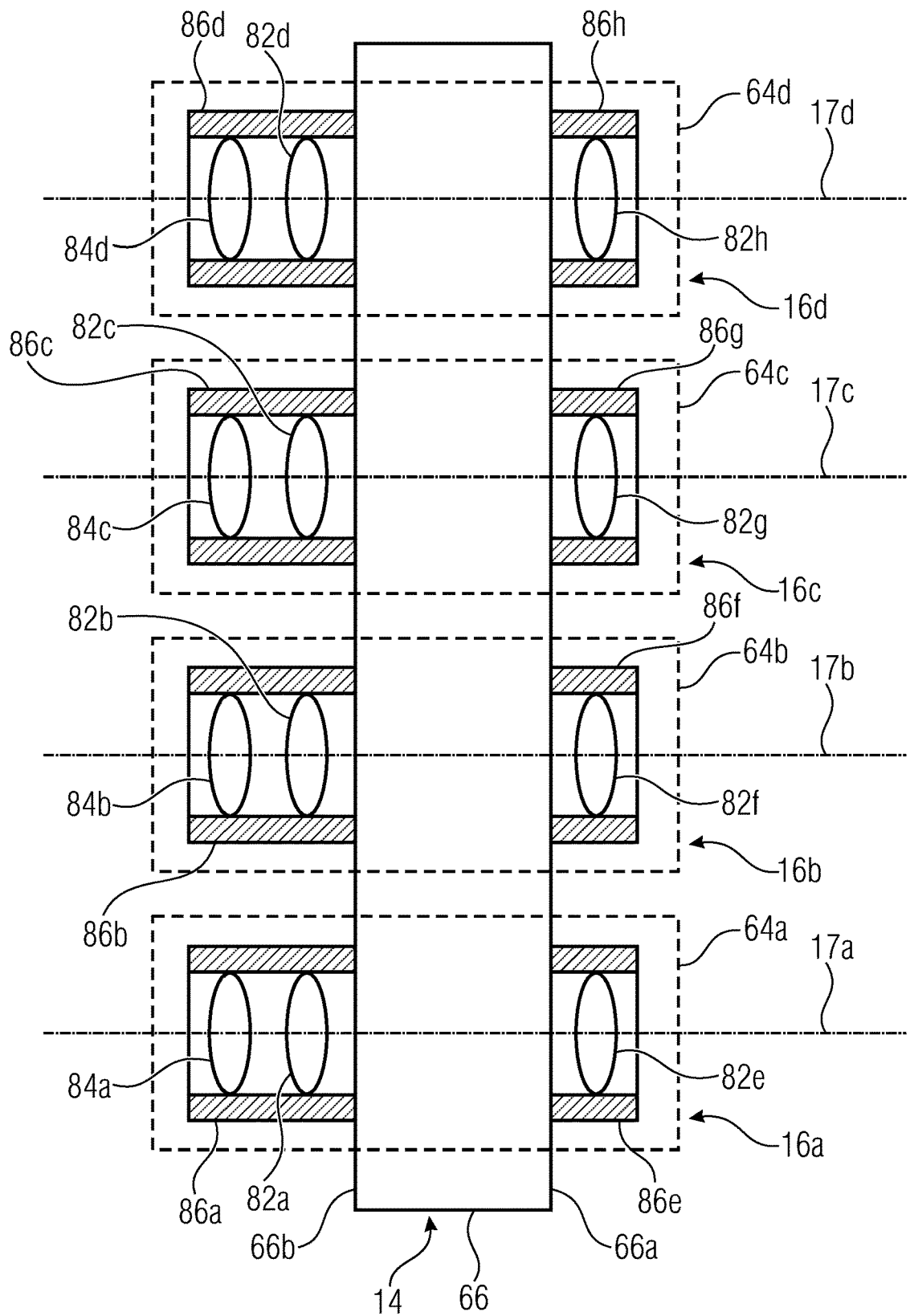

However, different options for varying the embodiment of FIG. 19*a-c* should be noted. For example, the substrate 66 does not necessarily extend across all channels 16*a-d* of the multi-aperture imaging device 11. Contrary to what is described above, it would be possible that each optics 64*a-d* comprises lenses held by lens holders on both sides 66*a* and 66*b*, as illustrated in FIG. 19*f*.

Also, the existence of merely the lenses 82*e-h* on the main side 66*a*, i.e. without the lenses 82*a-d* and/or 84*a-d* on the other side 66*b* would be possible, as well as the provision of the lenses 82*a-d* and/or 84*a-d* on the other side 66*a*, i.e. the side of the substrate 66 facing away from the image sensor 12 and not the side facing the same, i.e. 66*a*. Also, the number of lenses in the lens carriers 86*a-h* can be freely selected. Thus, merely one lens or more than two lenses could exist in one such carrier 86*a-h*. As shown in FIG. 18*f*, it could be possible that lenses are mounted on both sides 66*a* and 66*b* via respective lens carriers 86*a-d* and 86*e-h*, respectively, on the respective side 66*a* and 66*b*, respectively.

Figure 20:
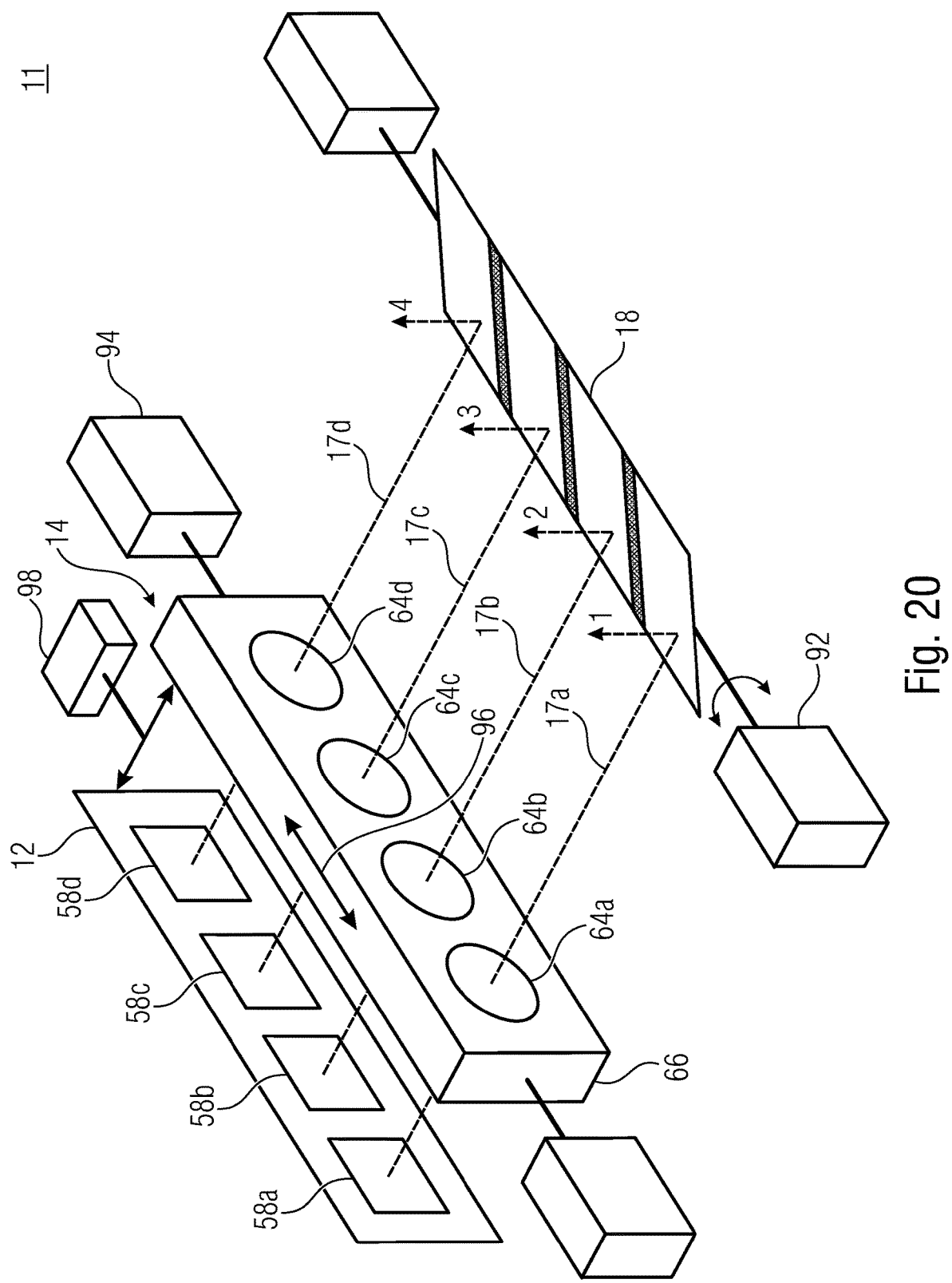
FIG. 20 is the multi-aperture imaging device according to FIG. 19a-c which is supplemented, according to an embodiment, by additional means for realizing relative movements for optical image stabilization and for adapting the focusing.

FIG. 20 shows exemplarily that the multi-aperture imaging device 11 of FIG. 19*a-c* could be supplemented by one or several of the additional means described below.

For example, FIG. 20 shows that means 92 could exist for rotating the beam-deflecting means 18 around the axis of rotation 44 which is parallel to the line-extension direction of the array 14. The axis of rotation 44 is, for example, within the plane of the optical paths 17*a-d* or remote from the same by less than a quarter of the diameter of the optics 64*a-d*. Alternatively, it would also be possible that the axis of rotation is further apart, such as less than one optics diameter or less than four optics diameters. The means 92 can, for example, be provided to rotate the beam-deflecting means 18 with short response time in a merely small angular range, such as within a range of less than 1° or less than 10° or less than 20° in order to compensate shaking of the multi-aperture imaging device 11, for example by a user. In this case, the means 92 would be controlled by an image stabilization control.

Alternatively or additionally, means 92 could be configured to change the direction of the total field of view defined by the total coverage of the partial field of view 74*a-d* (FIG. 19*a*) with greater angular adjustments. Here, it would further be possible to obtain deflections by rotation of the beam-deflecting means 18 where the total field of view is arranged in the opposite direction relative to the device 11, for example by forming the beam-deflecting means 18 as mirror array reflective on both sides.

Again, alternatively or additionally, a device 11 can comprise means 94 for translationally moving the optics 64*a-d* by means of the substrate 66 and the substrate 66 itself, and hence the optics 64*a-d*, respectively, along the line-extension direction. The means 94 could, for example, also be controlled by the above-mentioned image stabilization control in order to obtain, by a movement 96 along the line-extension direction, image stabilization transversal to the image stabilization effected by the rotation of the mirror deflecting device 18.

Further, additionally or alternatively, the device 11 can comprise means 98 for changing the image-side distance between image sensor 12 and optics 64*a-d* and between image sensor 12 and carrier 66, respectively, for obtaining adjustment of depth of field. The means 98 can be controlled by manual user control or by autofocus control and focusing means of the device 11, respectively.

Thus, the means 94 serves as a suspension of the substrate 66 and is, as indicated in FIG. 20, arranged laterally beside the substrate 66 along the line-extension direction in order to not increase the installation height. It also applies to means 92 and 98 that the same are arranged in the plane of the optical paths for not increasing the installation height. The means 98 can also be connected to the beam-deflecting means 18 and can move the same simultaneously or almost simultaneously such that when changing the image-side distance between image sensor 12 and optics 64*a-d*, a distance between optics 64*a-d* and beam-deflecting means 18 remains essentially constant or constant. The means 92, 94 and/or 98 can be implemented based on pneumatic, hydraulic, piezoelectric actuators, DC motors, step motors, thermal actuators, electrostatic actuators, electrostrictive and/or magnetostrictive actuators or drives.

It should be noted that the optics 64*a-d* cannot only be held mutually in constant relative position, such as via the already mentioned transparent substrate, but also relative to the beam-deflecting means, such as via a suitable frame not increasing the installation height and thus running in the plane of the components 12, 14 and 18 and in the plane of the optical paths, respectively. The consistency of the relative position could be limited to the distance between optics and beam-deflecting means along the optical axes, such that the means 98 moves, for example, the optics 64a-d together with the beam-deflecting means translationally along the optical axes. The optics/beam-deflecting distance could be set to a minimum distance, such that the optical path of the channels is not laterally limited by the segments of the beam-deflecting means 18, which reduces the installation height, since otherwise the segments 68a-d would have to be dimensioned for the greatest optics/beam-deflecting means distance as regards to the lateral extension in order to not restrict the optical path. Additionally, the consistency of the relative position of the above-mentioned frames could hold the optics and beam-deflecting means in a rigid manner to one another along the x axis, such that the means 94 would move the optics 64a-d together with the beam-deflecting means translationally along the line-extension direction.

The above-described beam-deflecting means 18 for deflecting the optical path of the optical channels allows, together with the actuator 92 for generating the rotational movement of the beam-deflecting means 18 of an optical image stabilization control of the multi-aperture imaging device 11, image and total field of view stabilization, respectively, in two dimensions, namely by the translational movement of the substrate 66, image stabilization along a first image axis running essentially parallel to the line-extension direction, and by generating the rotational movement of the beam-deflecting means 18, image stabilization along a second image axis running essentially parallel to the optical axes prior to and without beam-deflecting, respectively, or, when the deflected optical axes are considered, perpendicular to the optical axes and the line-extension direction. Additionally, the described arrangements can effect translation movement of the beam-deflecting means and array 14 fixed in the stated frame perpendicular to the line-extension direction, such as by the described actuator 98, which can be used for realizing focus adjustment and hence autofocus function.

As an alternative to or in addition to the rotational movement for obtaining image stabilization along the second image axis, also, a translational relative movement between the image sensor 12 and the array 14 can be implemented. This relative movement can be provided, for example, by the means 94 and/or the means 98.

For completeness sake, it should be noted with respect to the above statements that the device when capturing via the image sensor areas captures one image of a scene per channel which are projected by the channels on the image sensor areas, and that the device can optionally have a processor that assembles or joins the images to a total image corresponding to the scene in a total field view and/or provides additional data, such as 3D image data and depth information of the object scene for generating depth maps and for software realization, such as refocusing (determining the image sharpness regions after the actual capturing), all-in-focus images, virtual green screen (separation of foreground and background), etc. The latter tasks could also be performed by the processor or externally. The processor, however, could also represent a component external to the multi-aperture imaging device.

Figure 21A:
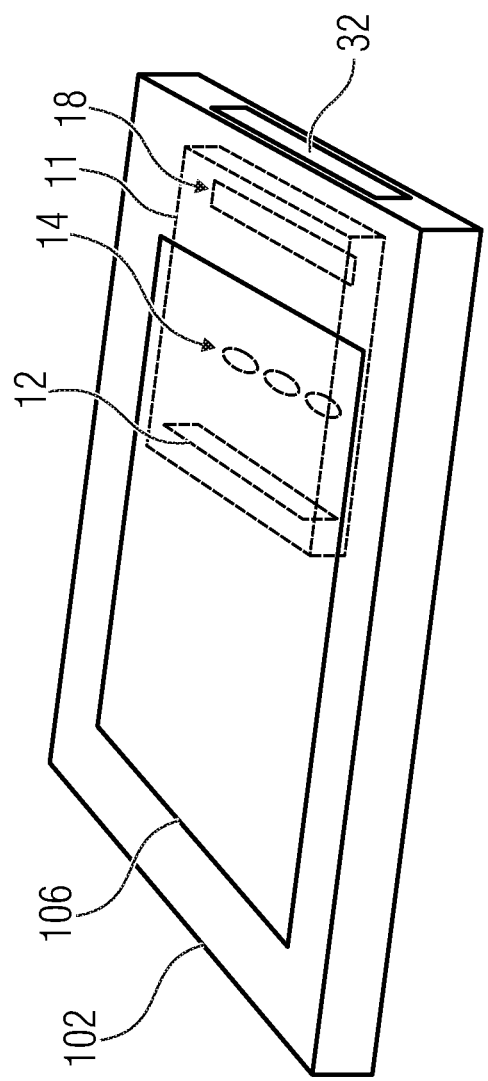
FIG. 21a is a schematic view of a multi-aperture imaging device arranged in a flat housing according to an embodiment.

FIG. 21a illustrates that devices 11 of the above-described alternatives can be installed, for example in a flat housing of a portable device 130, such as a mobile phone, a smartphone or media player or the same, wherein then, for example, the planes of the image sensor 12 and the image sensor areas, respectively and the lens planes of the optics of the optical channels 16 are oriented perpendicular to the flat extension direction of the flat housing and parallel to the thickness direction, respectively. In that way, for example, the beam-deflecting means 18 would have the effect that the total field of view of the multi-aperture imaging device 11 is in front of a front side 102 of the flat housing which also comprises, for example, a monitor. Alternatively, a deflection would also be possible such that the field of view is in front of a rear side of the flat housing opposing the front side 102. The housing 22 of the device 130 and the device itself, respectively, can be flat, since, due to the illustrated position of the device 11 in the housing, the installation height of the device 11, which is parallel to the thickness of the housing, can be kept low. Switchability could also be provided in that a window is provided on the side opposing the side 102 and, for example, the beam-deflecting means is moved between two positions, wherein the latter is implemented, for example, as mirror mirroring on the front and rear and rotated from the one to the other position, or as a facet mirror having a set of facets for the one position and another set of facets for the other position, wherein the sets of facets are beside one another in line-extension direction and switching between the position takes place by translationally moving the beam-deflecting means back and forth along the line-extension direction. Installation of the device 11 into a different, possibly non-portable device, such as a car, would also be possible.

Several modules 11 whose partial field of view of their channels cover the same field of view completely and optionally even congruently can be installed in the device 130 with a base distance BA (cf. FIG. 15) to one another along a line-extension direction which is the same for both modules, such as for the purpose of stereoscopy. More than two modules would also be possible. The line-extension directions of the modules 11 could also be non-collinear and merely parallel to one another. However, it should be noted again that, as mentioned above, also a device 11 and a module, respectively, could be provided with channels such that the same completely cover the same total field of view in groups. The modules can be arranged in one/several line(s)/row(s) or any position of the device. When several modules are arranged, the same can be formed in the same manner or differently. A first module can be configured, for example, to perform stereoscopic capturing of the total field of view. A second module can be configured to perform simple capturing, stereoscopic capturing or higher order capturing.

It should be noted that in alternative embodiments the beam-deflecting means could also be omitted in comparison to the above-described embodiments. When merely partial mutual overlapping of the partial field of use is desired, this could be obtained, for example, via mutual lateral offsets between the center of the image sensor area and the optical center of the optics of the respective channel. Obviously, the actuators according to FIG. 20 could still be used, wherein, as a substitute for the means 92, for example, the actuator 94 is additionally able for translationally moving the optics and the carrier 66, respectively.

Again, in other words, the above embodiments show a multi-aperture imaging device with single-line array of juxtaposed optical channels where somewhere in the optical path of the multi-aperture imaging device a substrate, for example of glass or polymer, extending across the channel extends for improving the stability. Additionally, the substrate can include lenses on the front and/or rear side. The lenses can be made of the material of the substrate (such as produced by hot stamping) or molded thereon. Further lenses, which are not on the substrate and are individually mounted, can be in front of and behind the substrate. Several substrates can exist in one structure, both along as well as perpendicular to the line-extension direction. Here, it would also be possible to connect several substrates with lenses along the optical paths in series, i.e. to keep the same in a predetermined positional relation to one another in a different way, such as via a frame without necessitating any joining action. In that way, twice as many main sides would be available for providing or mounting lenses, as carrier substrates are used, such as a substrate 66 which can be loaded with lenses according to the above examples, here exemplarily according to FIG. 19b, and the substrate which can also be loaded with lenses according to the above embodiments, i.e. among others with lenses that are mounted on the main sides 66a and/or 66b via lens holders, but here exemplarily illustrated integrally produced, for example by injection molding or the same, such that lenses are formed on both sides 66a and 66b, although also molded lenses of different materials than the material of the parallelepiped-shaped substrate 66 would be possible as well as lenses on only one of the sides 66a or 66b. Both substrates are transparent and are penetrated by the optical paths, through the main sides 66a and 66b. Thus, the above embodiments can be implemented in the form of a multi-aperture imaging device with single-line channel arrangement, wherein each channel transmits a partial field of view of a total field of view and the partial fields of view partly overlap. A structure having several such multi-aperture imaging devices for stereo, triple, quadruple, etc. structures for 3D image capturing is possible. Here, the plurality of modules can be implemented as one contiguous line. The contiguous line could use identical actuators and a common beam-deflecting element. One or several mechanically enforcing substrates possibly existing within the optical path can extend across the total line which can form a stereo, triple, quadruple structure.

Methods of superresolution can be used, wherein several channels project the same partial image areas. The optical axes can also already run in a divergent manner without beam-deflecting means, such that fewer facets are necessitated on the beam-deflecting unit. Then, advantageously, the facets have only one angular component. The image sensor can be integral, can comprise only one contiguous pixel matrix or several interrupted ones. The image sensor can be composed of many partial sensors that are, for example, juxtaposed on a printed circuit board. An autofocus drive of a focusing means can be implemented such that the beam-deflecting element is moved synchronously with the optics or is stationary. When no pre-divergence exists, embodiments provide for the optical paths running essentially or completely parallel between the image sensor 12 and the beam-deflecting means 18.

Figure 21B:
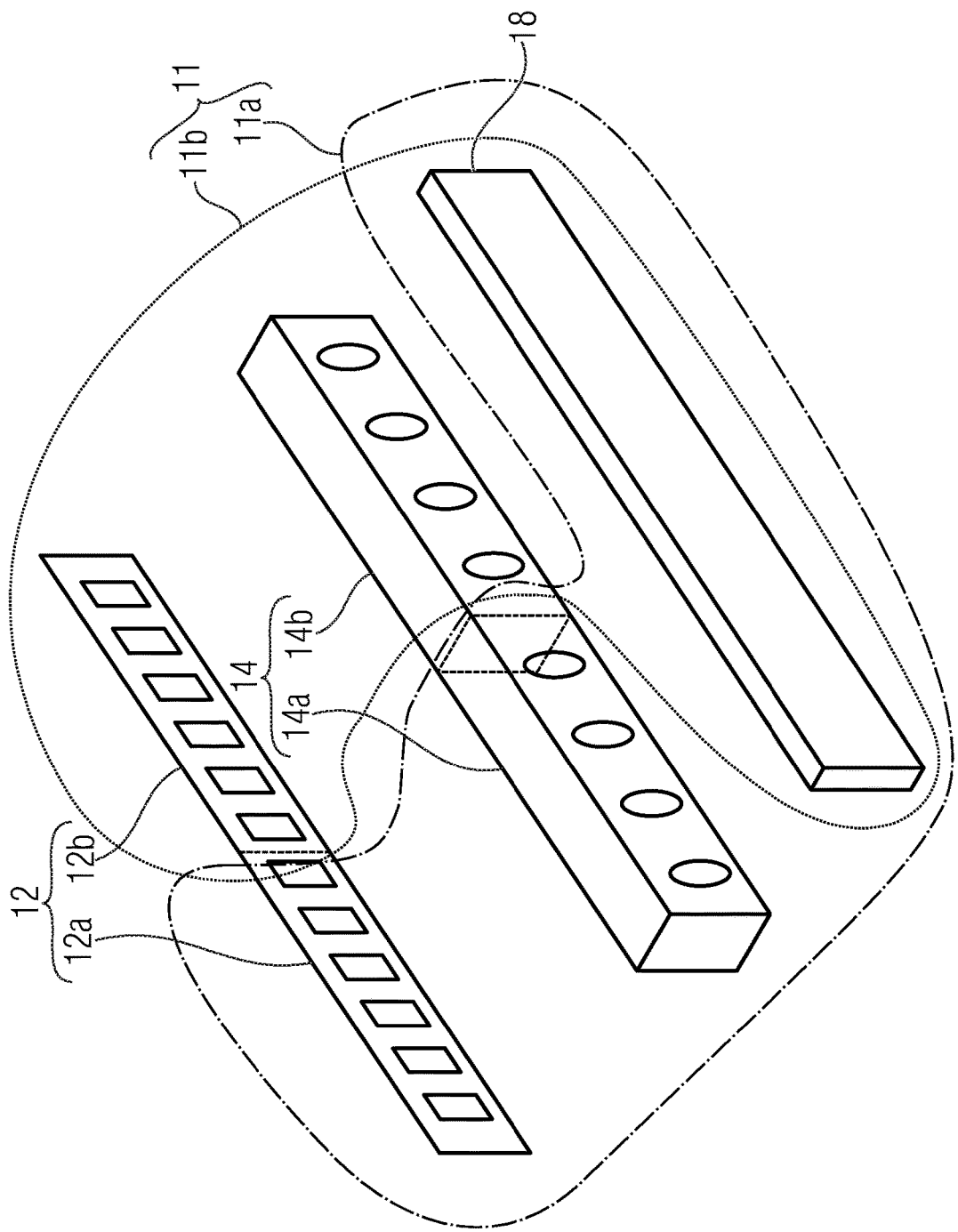
FIG. 21b is a schematic structure of a multi-aperture imaging device for stereoscopically capturing a total field of view.

FIG. 21b shows a schematic structure including a first multi-aperture imaging device 11a and a second multi-aperture imaging device 11b as it can be arranged, for example in the device 130. The two multi-aperture imaging devices 11a and 11b can form a common multi-aperture imaging device 11 and can comprise a common image sensor 12 and/or a common array 14. The single-line arrays 14a or 14$_1$ and 14b or 14$_2$ form, for example, a common line in the common array 14. The image sensors 12a and 12b can form the common image sensor 12 and can be mounted, for example, on a common substrate and on a common circuit carrier, such as a common printed circuit board or a common flexboard. Alternatively, the image sensors 12a and 12b can also include differing substrates. Different combinations of these alternatives are also possible, such as multi-aperture imaging devices including a common image sensor, a common array and/or a common beam-deflecting means 18 as well as further multi-aperture imaging devices comprising separate components. It is an advantage of a common image sensor, a common single-line array and/or a common beam-deflecting means that a movement of a respective component can be obtained with high precision by controlling a small amount of actuators and synchronization between actuators can be reduced or prevented. Further, high thermal stability can be obtained. Alternatively or additionally, further multi-aperture imaging devices can also comprise a common array, a common image sensor and/or a common beam-deflecting means. The structure of the multi-aperture imaging device 11 can be used, for example for stereoscopic capturing of a total or partial field of view when optical channels of different partial multi-aperture imaging devices 11a and 11b are directed on the same partial field of view. Comparably, further partial multi-aperture imaging devices can be integrated in the common multi-aperture imaging devices, such that capturing of a higher order than stereo is possible.

Figure 22A:
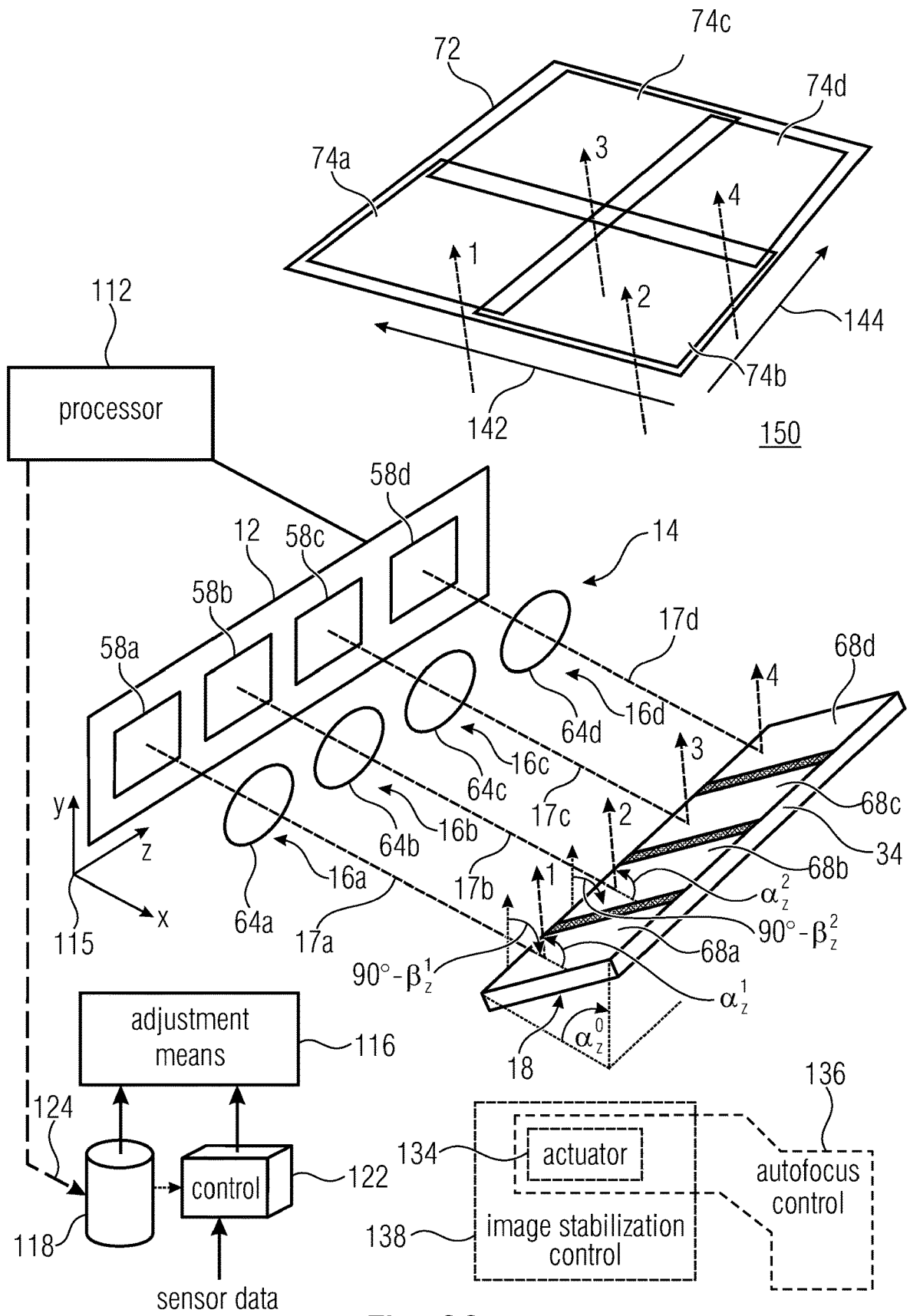
FIG. 22a is a schematic view of a further multi-aperture imaging device according to an embodiment supplemented, according to an embodiment, by additional means for realizing relative movements for focus control and optical image stabilization.
Figure 22B:
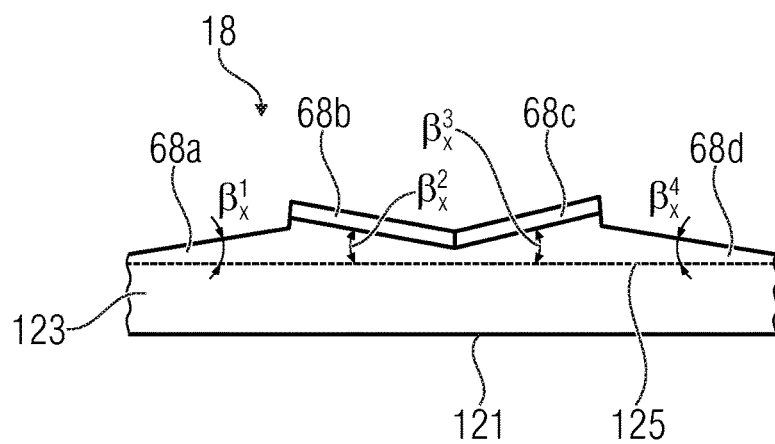
FIG. 22b-22e are schematic side views of a beam-deflecting device according to an embodiment.
Figure 22E:
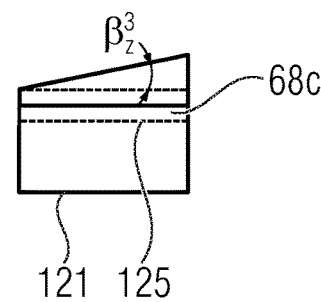
Figure 22C:
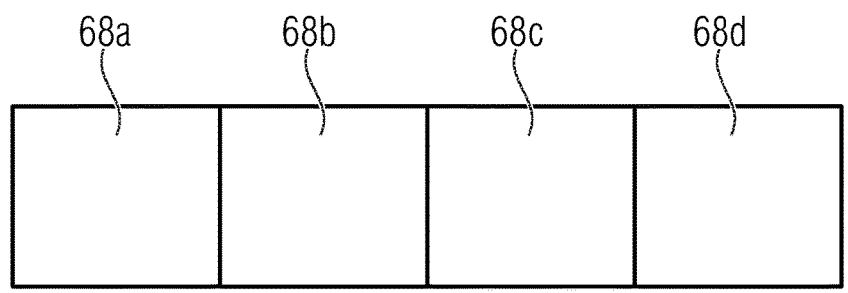
Figure 22D:
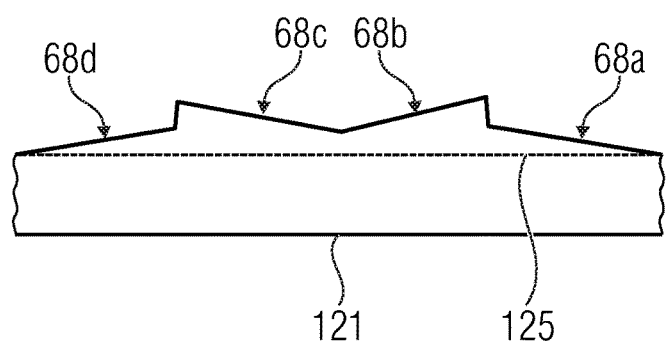

FIG. 22a shows an embodiment of a multi-aperture imaging device 150. The image sensor areas 58a-d are arranged in a common plane, namely the image plane of the optical channels 16 and their optics, respectively. In FIG. 22a, this plane is exemplarily parallel to the plane spanned by a z and a y axis of a Cartesian coordinate system which is, for simplifying the following description, shown in FIG. 22a and provided with the reference number 115.

In a linear array of optical channels, the extension of the multi-aperture imaging device 150, as it is limited by the image sensor 12 and the optics 64 towards the bottom, is greater along the line-extension direction than the diameter of a lens. The minimum extension of the multi-aperture imaging device 150, as it is determined by the mutual arrangement of image sensor 12 to optics 64 along the z axis, i.e., along the optical axes and optical paths of the optical channels 16a-d, is smaller than the minimum extension along the z axis, but due to the implementation of the optical channels 16a-d as a single-line array, the same is greater than the minimum expansion of the multi-aperture imaging device in the lateral direction y perpendicular to the line-extension direction z. The latter is given by the lateral extension of each individual optical channel 16a-d, such as the extension of the optics 64a-d along the y axis, possibly including the holder 66.

As described above, in the embodiment of FIG. 22a, the optical axes 17a-d are parallel to another prior to and without the deflection by the beam-deflecting means 18, respectively, for example, at the optics 64a-d, respectively, as shown in FIG. 22a, or the same only deviate slightly therefrom. The corresponding centered positioning of optics 64a-d as well as the image sensor areas 58a-d is easy to produce and favorable as regards to minimizing the installation space. The parallelism of the optical paths of the optical channels has also the effect that the partial fields of view covered by the individual channels 16a-d and projected on the respective image sensor areas 58a-d, respectively would overlap almost completely without any further measures, such as beam deflection. In order to cover a greater total field of view by the multi-aperture imaging device 150, a further function of the beam-deflecting means 18 is to provide the optical paths with divergence such that the partial fields of view of the channels 16a-d overlap less.

It is assumed, for example, that the optical axes 17a-d of the optical paths of the optical channels 16a-d are parallel to one another prior to and without the beam-deflecting means 18, respectively, or deviate, with regard to a parallel alignment along the alignment averaged across all channels, by less than a tenth of a minimum aperture angle of the partial fields of view of the optical channels 16a-d. Without additional measures, the partial fields of view would largely overlap. Thus, the beam-deflecting means 18 of FIG. 22a includes, for each optical channel 16a-d, a reflecting facet 68a-d clearly allocated to this channel, which are each optically planar and tilted with respect to one another, namely such that the partial fields of view of the optical channels overlap less with regards to the solid angle and cover, for example a total field of view having an aperture angle that is, for example, greater than 1.5 times the aperture angle of the individual partial fields of view of the optical channels 16a-d. In the exemplary case of FIG. 22a, the mutual inclination of the reflective facets 68a-d has, for example, the effect that the optical channels 16a-d that are actually arranged linearly juxtaposed along the z axis cover the total field of view 72 according to a two-dimensional arrangement of the partial fields of view 74a-d.

If, in the embodiment of FIG. 22a, the angular deflection of the optical axes 17a-d of the optical channels 16a-d is considered in the plane spanned by the averaged direction of the optical axes prior to beam deflection and the averaged direction of the optical axes after beam deflection, i.e., in the zy plane in the example of FIG. 22a on the one hand and in the plane running perpendicular to the latter plane and parallel to the averaged direction of the optical axes after beam deflection on the other hand, the example of FIG. 22a corresponds to the exemplary case that the averaged direction after beam deflection corresponds to the y axis. Thus, on average, the optical axes of the optical channels are deflected by 90° in the yz plane around the z axis and, on average, the optical axes are not tiled out of the yz plane.

For example, $\beta_x^1$ indicates the inclination angle of the facet 68a with respect to the xz plane measured in the xy plane, i.e., tilting of the facet 68a around the z axis with respect to the xz plane in which the optical axes 17a-d run. $\beta_z^1=0°$ corresponds to an alignment of the facet 68a parallel to the xz plane. Accordingly, $\alpha_z^1=2\cdot\beta_z^1$ applies. Accordingly, $\beta_z^1$ defines the inclination angle of the facet 68a with respect to a plane having the inclination $\beta_z^1$ with respect to the xz plane and running parallel to the z axis measured along the z axis. Therefore, $\alpha_x^1=2\cdot\beta_x^1$ applies accordingly. The same definitions apply for the other channels: $\alpha_x^i=2\cdot\beta_x^i$, $\alpha_z^i=2\cdot\beta_z^i$. For each optical channel, the setting angle can be greater than an inclination angle of the inclination of the reflecting facet allocated to this channel with respect to carrier substrate through which the optical channels run. Here, the carrier substrate can be positioned parallel to a line-extension direction of the array 14 and the setting angle can be in a plane perpendicular to the line-extension direction.

FIGS. 22b-22e show side views of a beam-deflecting device according to an embodiment for exemplarily four optical channels that are arranged linearly or unilaterally, respectively. The beam-deflecting device 18 of FIG. 22b-229e could be used as beam-deflecting device of FIG. 19a, wherein then the partial fields of view would not cover the total field of view clockwise 3, 4, 2, 1 as illustrated in FIG. 19a, but clockwise in the order 4, 2, 1, 3. The inclination angles of the facets 68a-d are indicated in FIG. 22b-e. The same are differentiated by superscript indices 1-4 and allocated to the respective channel, respectively. Here, both $\beta_x^1$ and $\beta_x^4$ are 0°. The rear side of the carrier substrate, i.e., the side opposing the surface provided with the facets 68a-d is indicated in FIG. 22b-22e by 121. The material forming the parallelepiped-shaped portion of the carrier substrate 123 is below the dotted line 125. It is obvious that the additional material added to the same has little volume such that molding is eased.

The carrier substrate 123 is placed inclined by a setting angle $\alpha_x^0$ with respect to the image sensor 12, namely around the axis around which the average direction of the optical axes of the optical channels is deflected, i.e., the z axis in FIG. 22a. This setting angle has the effect that the surface of the beam-deflecting device 18 facing the image sensor 12 already effects "coarse deflection" of the optical paths of the optical channels.

For the deflecting angles of the deflection of the optical path of each optical channel by the beam-deflecting means 18, this means that the same are each based on the setting angle $\alpha_x^0$ as well as on the respective inclination of the reflecting facet allocated to the optical channel with respect to the carrier substrate 123 itself. These mentioned facet-individual inclinations of the facets 68a-d can be defined, as described above, by an inclination angle in the xy plane and an inclination angle with respect to the normal of the carrier substrate 123 in the plane perpendicular thereto. It is advantageous when it applies that, for each channel, the setting angle $\alpha_x^0$ is greater than the inclination, i.e., $\alpha_x^0>\max(|\beta_x|, |\beta_z|)$ for all channels. It is even more advantageous when said inequality is fulfilled already for $\alpha_x^0/2$ or even for $\alpha_x^0/3$. In other words, it is advantageous when the setting angle is great compared to the inclination angles of the facets 68a-d, such that the additional material compared to a pure parallelepiped-shape of the beam-deflecting device 18 is low. $\alpha_x^0$ can, for example, lie between 30° and 60°, each inclusive.

Production of the beam-deflecting means 18 of FIG. 22b-22e can be performed, for example, in that the additional material is molded on the carrier substrate 123 by a molding tool. Here, the carrier substrate 123 could, for example, be glass while the molded additional material thereon is polymer. A further option is forming the beam-deflecting device 18 of FIG. 22b-22e integrally by injection molding or the same. This has the effect that the surface of the beam-deflecting means facing the image sensor is mirrored at least on the reflecting facets allocated to the optical channels. The carrier substrate can be pivoted as described, for example, in the context of FIG. 12b.

Some aspects of the structure of the multi-aperture imaging device described so far relate, so to speak, to a desired or instantaneous setting prior to or at the time of capturing a total image, for example. The multi-aperture imaging device 150 of FIG. 22a includes, for example, a processor, such as the processor 112 that merges images that have been captured by the image sensor areas 58a-d at, for example, the same time, with the above mentioned settings, to a total image representing the scene in the total field of view 72. The algorithm used by the processor 112 to join or merge the images projected by the optical channels 16a-d on the image sensor areas 58a-d and captured by the latter is, for example, designed such that assumptions on maintaining specific parameters of the above-described components of the multi-aperture imaging device 150 should be complied with such that the quality of the total image fulfils certain specifications or the algorithm can be applied at all. For example, the algorithm assumes compliance with one or several of the following assumptions:

1) The optics to image sensor area distances along the x axis are the same for all optical channels 16a-d;
2) The relative location of the partial fields of view 74a-d and in particular the overlap between the same corresponds to a predetermined specification or deviates from the same by less than a predetermined maximum deviation.

For various reasons, it can be the case that one or several of the above stated assumptions are not complied with or are not complied with sufficiently. Reasons for not complying with the same could, for example, be production tolerances, such as inaccuracies of the relative locations of the optics 64a-d to one another and relative to the image sensor 12. Production inaccuracies can also include an inaccuracy of the installation of the beam-deflecting device 18 and possibly the relative locations of the facets 68a-d to one another when the beam-deflecting means 18 comprises facets 68a-f. In addition to or as an alternative to the production-induced tolerance deviations, temperature variations can have the effect that one or several of the above stated assumptions does not apply or is not sufficiently complied with.

To some degree, the algorithm for joining and merging, respectively, the images of the image sensor areas 58a-d to the total image executed by the processor 112 can possibly compensate deviations from an optimum alignment and arrangement of the components, such as deviations of the positions of the partial fields of view 74a-d within the total field of view 72 from a set constellation of relative locations of the partial fields of view to one another. When joining and merging, respectively, the images, the processor 112 could compensate, for example, such deviations to a certain degree. However, when specific deviation limits are exceeded (not complying with assumption 2), the processor 112 would, for example, not be able to compensate the deviations.

Producing the multi-aperture imaging device 150 such that the above-mentioned assumptions are complied with, such as across a specific temperature range, has the tendency of increasing production costs of the multi-aperture imaging device 150. In order to prevent this, the multi-aperture imaging device 150 of FIG. 22a includes an adjustment means 116 for channel-individually changing a relative location between the image sensor area 58i of a respective optical channel 16i, the optics 64i of the respective optical channel 16i and the beam-deflecting means 18 and the respective segment 68i of the same, or for channel-individually changing an optical characteristic 16i or an optical characteristic of the segment 68i of the beam-deflecting means 18 relating to the deflection of the optical path of the respective optical channel. The adjustment means 116 is controlled by default values and performs the adjustment tasks according to the default values. The same are provided by a memory 118 and/or a control 122 that will be discussed below.

The device 150 comprises, for example, a memory 118 with stored default values for channel-individual control of the adjustment means 116. The default values can be determined by the manufacturer and can be stored in the memory 118. Additionally, for example, as indicated in FIG. 22a by a dotted line 124, the processor 112 can be able, via evaluations of captured images of the image sensor areas 58a-d, such as images to be joined and merged to a total image, respectively, by the processor 112, to improve and update the stored default values in the memory 118. The processor 112 captures, for example, a scene by adjusting the multi-aperture imaging device 150 with current stored default values via the adjustment means 116, as will be described in more detail below.

For this, the default values are read out of the memory 118 and used by the adjustment means 116 for channel-individual adjustment. By analyzing the images of the image sensor areas 58a-d captured in that way, the processor 112 obtains information on how the stored default values just used for capturing are to be modified in the memory 118 in order to result in a more accurate or improved compliance of the above assumptions in the next capturing by using these improved or updated default values.

The stored default values can comprise a complete set of adjustment values, i.e., a set of adjustment values for completely adjusting the device 150. The same are selected as described above and explained in more detail below in order to reduce or eliminate specific channel-individual deviations of the optical characteristics of the channels from a set characteristic.

It can be the case that the default values include several sets of adjustment values, such as one per sequence of successive temperature intervals such that for image capturing that set of adjustment values is used that is actually suitable for a current situation. For this, the control 122 can access or look up the table of allocations between default value sets and different predetermined situations in the memory 118. For this access, the control 122 receives sensor data reflecting the current situation, such as data concerning temperature, pressure, moisture, location of the device 150 in the room and/or a current acceleration or a current turning rate of the device 150 and determines from this data one of the several default value sets in the memory 118, namely the one allocated to the predetermined situation which is closest to the current situation as described by the sensor data. Sensor data can also be obtained from the image sensor data of image sensor areas. For example, the control 122 selects a set in the allocated temperature interval of which the current temperature falls. The default values of the selected set from the memory 118 used for specific image capturing by the adjustment means 116 can then be updated again when the optional feedback 124 is used.

The stored default values can be configured, for example, such that a measure for dispersion of a distribution of one or several characteristics among the optical channels is reduced by controlling the adjustment device by means of the stored default values, namely a transversal deviation of the partial fields of view from a regular distribution of the partial fields of view, focal lengths of the optics or depth-of-field distances of the optical channels.

Alternatively, the default values in the control 122 can be determined without any memory 118, namely when, for example, mapping of the current sensor data on suitable default values is firmly integrated in the control 122. The mapping can be described by a functional context between sensor data and default values. A functional context could be adapted by parameters. The parameters could be adapted via the feedback 124.

The memory 118 can, for example, be a non-volatile memory. Possibly, it is a read-only memory but a rewritable memory is also possible. The control 122 and the processor 112 can be implemented in software, hardware or in programmable hardware. The same can be programs executed on a common microprocessor. The sensors for providing the sensor data for the control 122 can belong to the device 150, such as, for example, the image sensor areas or can also be external components, such as components of the apparatus incorporated into the device as will be discussed with reference to the following figures.

In the following, possible implementations for the adjustment means 116 will be described. Here, the adjustment means 116 of FIG. 22a can apply to one, several or all of the implementation variations described below. Specific combinations will also be discussed below.

In the shown variation, the adjustment means 116 comprises, for example, one actuator 126*i* for each channel 16*i* which moves the optics 64*i* of the respective channel 16*i* in axial direction along the optical axis 17*i* and along the optical path and/or transversal thereto along the z axis and/or the y axis. Alternatively, the actuator 126*i* could, for example, also move the image sensor 12 or an individual image sensor area 58*i*. Generally, the actuator 126*i* could effect a relative movement of image sensor area 58*i*, optics 64*i* and/or the respective segment 64*i* of the beam-deflecting means 18.

According to a variation to which FIG. 23*a* relates, the adjustment means 116 comprises a phase changing optical element and a phase changing element 128*i* for each channel 16*i*, which can, as indicated in FIG. 23*a*, be integrated in the respective optics 64*ai* (128*i"*) into the segment 61*i* (128*i'''*) between image sensor area 58*i* and optics 64*i* (128*i'*) or can be positioned between optics 64*i* and beam-deflecting segment 68*i* (128*i''''*), wherein also combinations of the above-mentioned options are possible. The phase changing optical element 128*i* can, for example effect a location-dependent change of a refractive index, i.e. a local distribution of the same, such as by liquid crystals. Alternatively or additionally, the phase-changing optical element 128*i* causes a change of the shape of an optically active surface, such as by using piezos having a mechanical effect on flexible fixed transparent materials and cause a deformation or by using an electro-wetting effect. The phase-changing optical element 128*i"* could, for example change the refractive index of optics 64*i*. Alternatively, the phase-changing element 128*i"* could change a shape of an optical lens area of the optics 64*i* and thereby change the effective refractive force of the optics 64*i*. The phase-changing element 128*i'''* could, for example generate on an optically relevant surface of the segments 68*i*, such as on the reflective facet, a sinusoidal phase grid in order to effect virtual tilting of the respective surface. Similarly, the phase-changing element 128*i'* or phase-changing element 128*i"* could deflect the optical axis.

In other words, the phase change effected by the phase-changing optical element 128*i* could be almost rotationally symmetrical such as rotationally symmetrical around the optical axis 17*i* and hence effect in the case 128*i'*, for example a change of the focal width of the optics 64*i*. The phase change effected by the element 128*i* could, however, be almost linear such as linear along the z axis or along the y axis in order to effect a change of the deflection angle or a deflection of the optical axis 17*i* in the respective direction.

The rotationally symmetric phase change can be used for focusing and the linear phase change for a position correction of the partial field of view of the respective optical channel 16*i*.

Figure 23B:
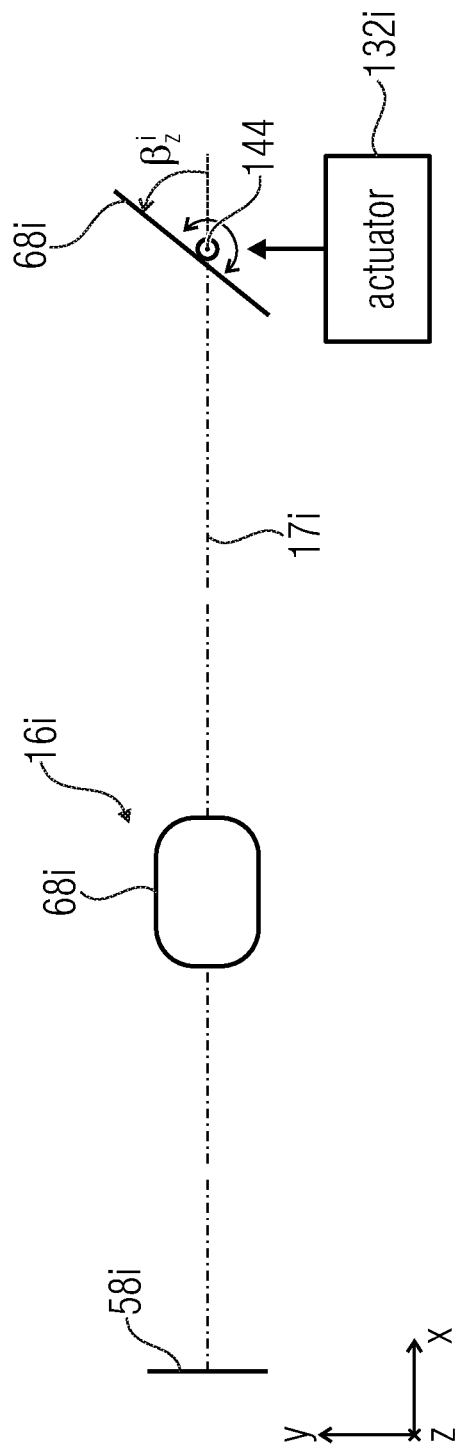
FIG. 23b is a variation of a multi-aperture imaging device with the adjustment means according to an embodiment.

According to a further variation illustrated in FIG. 23*b*, the adjustment means 116 comprises one actuator 132*i* for each channel 16*i*, which changes the segment 68*i*, such as the reflecting facet of the respective channel 16*i* in its angular orientation with respect to the optical axis 17*i*, i.e. the setting angle $\beta_x^i$. Here, it should be noted that the segment 68*i* is not limited to a reflecting facet. Each segment 68*i* could also be implemented as a prism deflecting the direction of the optical axis 17*i* in the yz plane while the prism is passed by the optical path of the optical channel 16*i*.

For realizing the relative movements by the actuators 126*i* and 132*i*, respectively, i.e. for generating the movement of the optics 68*i* which could be configured, for example in a translational manner, as well as for tilting the segment 68*i* by the actuator 132*i* and the z axis, for example, a pneumatic, hydraulic, piezoelectric, thermal, electrostatic or electrodynamic drive or DC or step motor or again a voice-coil drive could be used.

With renewed reference to FIG. 22*a*, it is indicated by dotted lines that the multi-aperture imaging device 150 can optionally include, in addition to the adjustment means 116, one or several actuators 134 for generating a channel global, i.e. for all optical channels 16*a-d* equal relative movement between image sensor 12, optics array 14 and beam-deflecting means 18. The one or the several additional actuators 134 could, as indicated in FIG. 22*a*, be part of an optionally existing autofocus control 136 (autofocus/focusing means) and/or an optionally existing image stabilization control of the multi-aperture imaging device.

Figure 24:
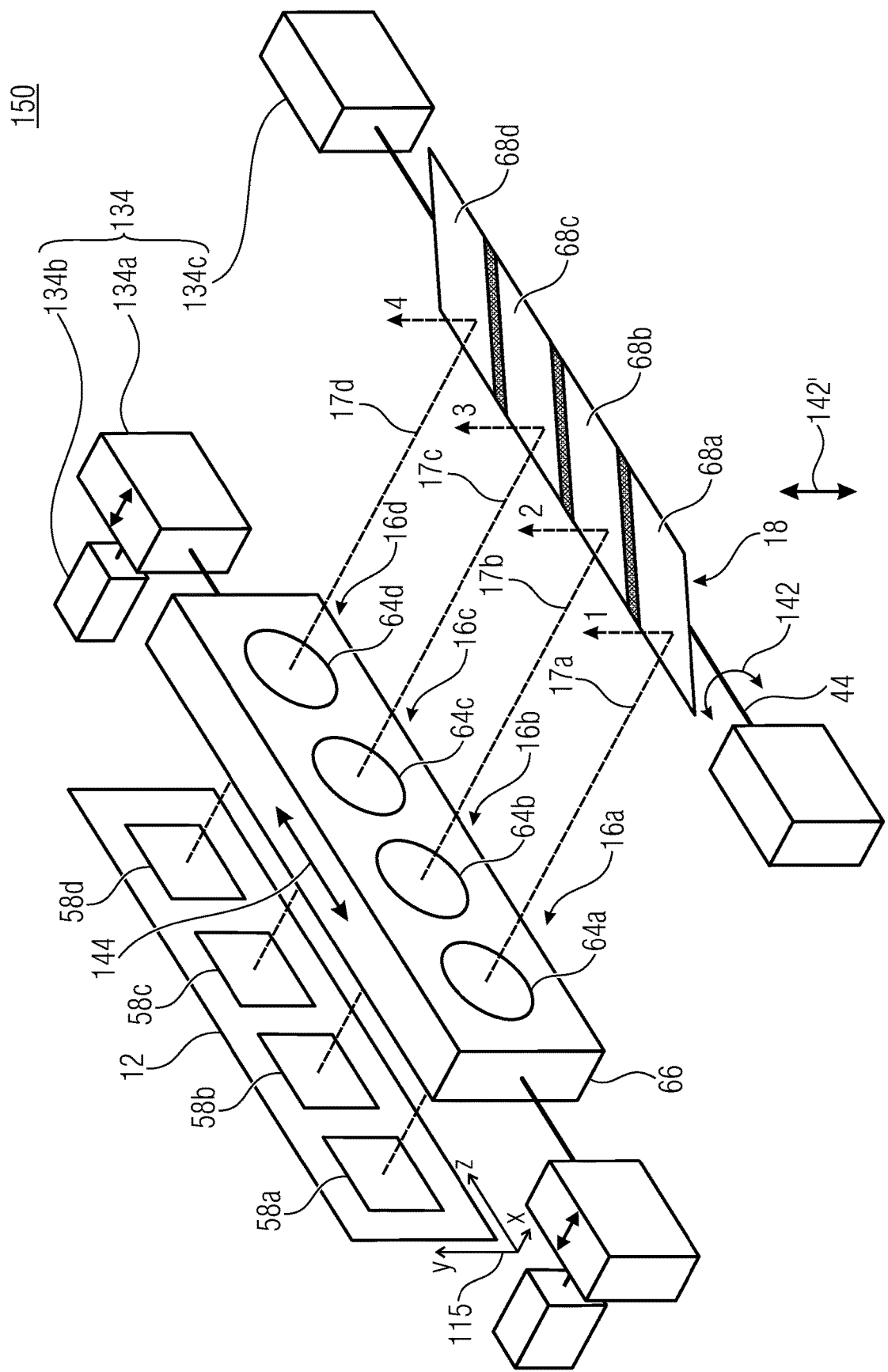
FIG. 24 is a schematic view of the device of FIG. 22a supplemented by additional actuators according to an embodiment.

A specific case is shown in FIG. 24. FIG. 24 shows the multi-aperture imaging device 150 of FIG. 22*a*, wherein the optics 64*a-d* of the optical channels 16*a-d* are mechanically fixed to one another via the common carrier 66. Via this common holder it is possible to subject the optics 64*a-d* to a global movement which is the same for all channels, such as by translational movement of the carrier 66 in the z direction, i.e. along the line-extension direction of the array 14. For this, an actuator 134*a* is provided. Thus, the actuator 134*a* generates a translational movement of the optics 64*a-d* which is the same for all optical channels 16*a-d*, in that the actuator 134*a* subjects the common carrier 66 to the translational movement along the x axis. Regarding the type of actuator 134*a*, reference is made to the examples that have been referred to with reference to FIGS. 23*a* and 23*b*. Further, the device 150 comprises an actuator 134*b* for channel global, i.e. for all optical channels 16*a-d* the same changing of the distance of the image sensor 58*i* to optics 54*i* along the x axis and along the optical axis 17*i*, respectively. As indicated in FIG. 24, for example the actuator 134*b* subject to optics 64*a-d* to the translational movement along the z axis for changing the distance from the allocated image sensor portions 58*a-d* not via the carrier 66 but also via the actuator 134, which is thus also subject to the translational movement along the x axis and actually serves as suspension for the carrier 66.

Additionally, the device 150 of FIG. 17 comprises an actuator 134*c* for rotating the beam-deflecting means 18 around an axis running parallel to the z axis and lying in or not far apart from the plane where the optical axes 17*a-d* run. Also concerning actuators 134*b* and 134*c* reference is made to the list of examples provided with reference to FIGS. 23*a* and 23*b* above concerning possible implementation examples. The rotational movement exerted by the actuator 134*c* on the beam-deflecting means 18 has the same or equal effect on the segments 68*a-d* on the beam-deflecting means 18 for all channels 16*a-d*, i.e. the same is channel global.

Via the actuator 134*b*, the autofocus control 136 is, for example able to control the focus of an image by the device 150 by means of the channels 16*a-d* in the channel global sense. The image stabilization control 138 is able to stabilize the total field of view 72 by means of the actuator 134*c* in a first direction 142 and by means of the actuator 134*a* in a direction 144 perpendicular thereto from shaking by a user. The first direction 142 can be obtained by a rotational movement around the axis of rotation 44. As indicated by the first direction 142', alternatively or additionally, translational movement of the beam-deflecting means 18 and/or the array 14 can be generated by the actuator 134. Here, the directions 142, 142' and 144 can be parallel to the image axis, in one plane of the direction or can correspond to the same. Image stabilizers described herein can be configured in order to commonly act for two, a plurality or all optical paths of the optical channels. This means that channel individual stabilization can be omitted which is advantageous.

For example, the device 150 of FIG. 22a comprises an actuator for each channel 16a-d, such as an actuator 126i for each channel 16i in order to subject the image sensor segments or areas 58a-d in a channel individual manner to a translational movement along the z axis and/or along the y axis in order to compensate, for example, to a reduction of inaccuracies or temperature-induced drifts of the partial fields of view within the total field of view. Alternatively or additionally, the device 150 of FIG. 22a could comprise an actuator 128i'' in order to compensate focal width differences of the optics 64a-d that have undesirably occurred caused by production. Additionally or alternatively, the device 150 of FIG. 22a can comprise an actuator 128i''' in order to compensate deviations of the relative inclinations of segments 68a-d among one another caused by production or temperature that developed such that the relative inclinations result in the desired coverage of the total field of view 72 by the partial fields of view 74a-d. Additionally or alternatively, the device 150 then can comprise actuators of the types 128i'' and 128i''', respectively.

Again, summarized, the device 150 can comprise an actuator 134c that is configured to rotate the beam-deflecting means 18 around an axis which is parallel to the line-extension direction z of the array 14. The axis of rotation is, for example in the plane of the optical axes 17a-d or apart therefrom left by a quarter of a diameter of the optics 64a-d. Alternatively, it could also be possible that the axis of rotation is further apart, such as less than one optics diameter or less than four optics diameters. The actuator 134c can, for example, be provided to rotate the beam-deflecting means 18 with a short response time in merely a small angular range, such as within a span of less than 5° or less than 10° in order to compensate shakings of the multi-aperture imaging device 150, for example by a user, during image capture. In this case, the actuator 134c would for example be controlled by the image stabilization control 138.

Alternatively or additionally, the actuator 134c could be configured to change the total field of view 72 with greater angular offsets, which is defined by the total coverage of the partial fields of view 74a-d (FIG. 22a) in its direction. Here it would further be possible that also deflections are obtained by rotating the beam-deflecting means 18 where the total field of view is arranged in the opposite direction relative to the device 150, for example in that the beam-deflecting means 18 is configured as a mirror array reflecting on both sides.

Again, alternatively or additionally, the device 150 can comprise an actuator 134a that is configured to move the optics 64a-d by means of the substrate 66 and the substrate 66 itself and hence the optics 64a-d in a translation manner along the line-extension direction. The actuator 134a could, for example also be controlled by the above-mentioned image stabilization control in order to obtain, by the movement 96 along the line-extension direction, image stabilization transversely to the image stabilization realized by the rotation of the mirror deflecting means 18.

Further, additionally or alternatively, the device 150 can comprise an actuator 134b for changing the image side distance between image sensor 12 and optics 64a-d and between the image sensor 12 and a body 66, respectively, to obtain depth of field adjustment, cf. FIG. 20. The means 98 can be controlled by a manual user control or by autofocus control of the device 150.

The actuator 134a serves as a suspension of the substrate 66 and, as indicated in FIG. 22a, the same is arranged laterally besides substrate 66 along the line-extension direction in order to not increase the installation height. It also applies for actuators 134b and 134c that the same are arranged in the plane of the optical path in order to not increase the installation height.

It should be noted that the optics 64a-d could not only be held with respect to one another, such as via the above-mentioned transparent substrate, but also relative to the beam-deflecting means in a constant relative position, such as via a suitable frame which does not increase installation height and hence once in the plane of the components 12, 14 and 66 and in the plane of the optical path, respectively, The consistency of the relative position could be limited to the distance between optics and beam-deflecting means along the optical axes, such that the actuator 134b moves, for example, the optics 64a-d together with the beam-deflecting means 18 in a translational manner along the optical axes. The optics-to-beam-deflecting means distance could be set to a minimum distance, such that the optical path of the channels is not laterally limited by segments of the beam-deflecting means 18, which reduces the installation height, since otherwise the segments 68i would have to be dimensioned, as regards to the lateral extension, for the greatest optics-to-beam-deflecting means distance in order to not limit the optical path. Additionally, the consistency of the relative position would mean that the above mentioned frame holds the optics and the beam-deflecting means along the z axis in a rigid manner to one another, such that the actuator 134a would move the optics 64a-d together with the beam-deflecting means translationally along the line-extension direction.

The above described beam-deflecting means 18 for deflecting the optical path of the optical channels allows, together with the actuator 134c for generating the rotational movement of the beam-deflecting means 18 and the actuator 134 of an optical image stabilization control of the multi-aperture imaging device 150 image and total image field stabilization, respectively, in two-dimension, namely by the translational movement of the substrate 66 image stabilization along a first image axis running essentially parallel to the line-extension direction and by generating the rotational movement of the beam-deflecting means 18 image stabilization along a second image axis running essentially parallel to the optical axis prior to and without beam deflection, respectively, or, if the deflected optical axes are considered, perpendicular to the optical axes and the line-extension direction. Additionally, the arrangement described herein can effect translational movement of the beam-deflecting means fixed in the state frame and the array 14 perpendicular to the line-extension direction such as by the described actuator 54, which can be used for realizing focus control and hence autofocus function.

Figure 25:
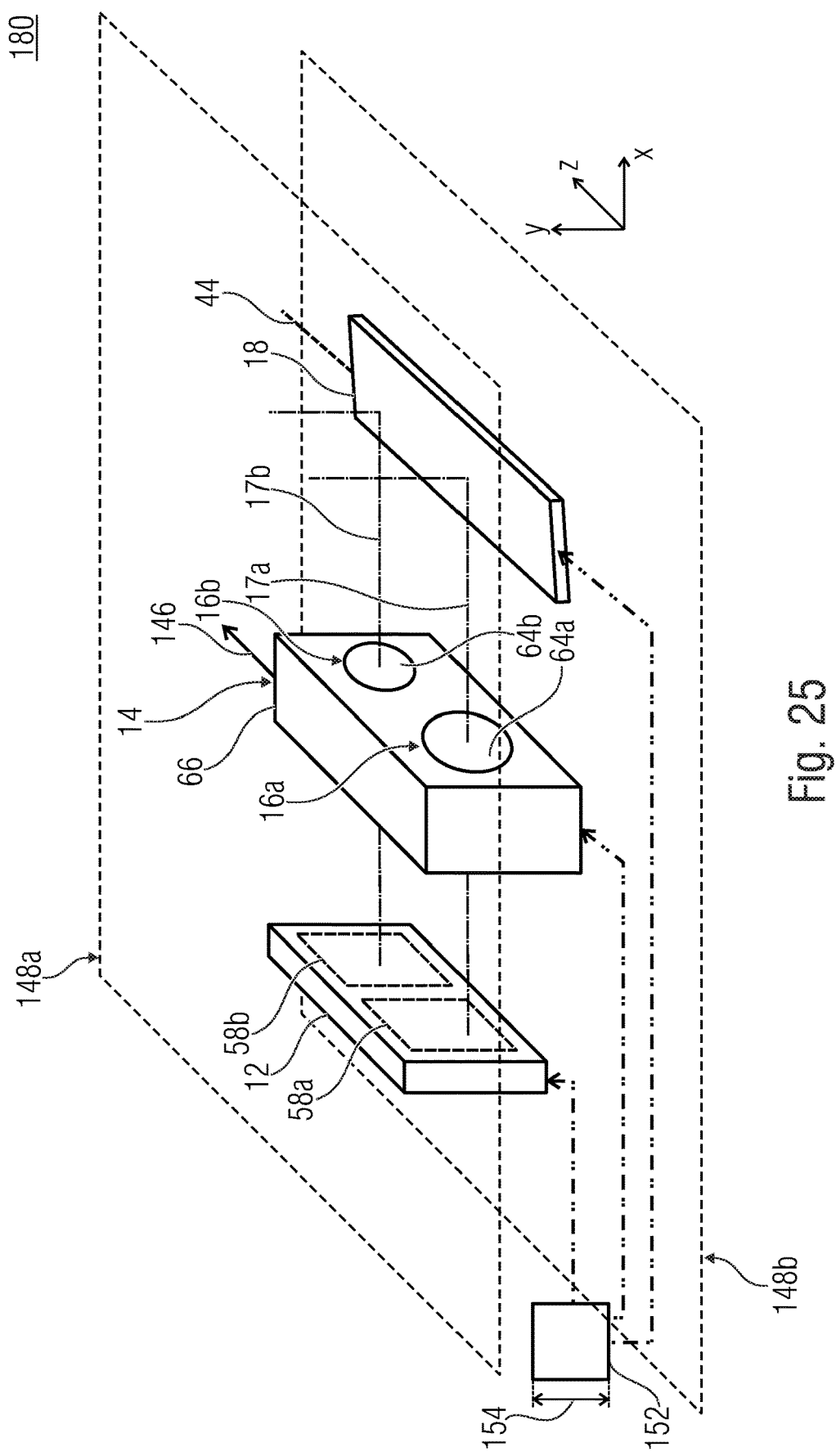
FIG. 25 is a schematic view of an arrangement of actuators in a multi-aperture imaging device according to an embodiment.

FIG. 25 shows a schematic view of a multi-aperture imaging device 180 for illustrating an advantageous arrangement of actuators, such as for image stabilization and/or for adjusting a focus. The image sensor 12, the array 14 and the beam-deflecting means 18 can span a cuboid in space. The cuboid can also be considered as virtual cuboid and can have, for example, a minimum volume and in particular a minimum perpendicular extension along a direction parallel to the y direction and a thickness direction, respectively, and can include the image sensor 12, the single-line array 14 and the beam-deflecting means 18. The minimum volume can also be considered that the same describes a cuboid spanned by the arrangement and/or operative movement of the image sensor course, the array 14 and/or the beam-deflecting means 18. The array 14 can have a line-extension direction 146 along which the optical channels 16a and 16b are arranged juxta post, possibly parallel to one another. The line-extension direction 146 can be arranged stationary in space.

The virtual cuboid can comprise two sides that run opposite parallel to one another, parallel to the line-extension direction 146 of the single-line array 14 as well as parallel to part of the optical path 17a and/or 17b of the optical channels 16a and 16b, respectively, between the image sensor 12 and the beam-deflecting means 18. Simply put, but without any limiting effect, this could, for example, be a top and a bottom of the virtual cuboid. The two sides can span a first plane 148a and a second plane 148b. This means the two sides of the cuboids can each be part of the plane 148a and 148b, respectively. Further components of the multi-aperture imaging device can be arranged completely but at least partly inside the area between the planes 148a and 148b, such that installation space requirements of the multi-aperture imaging device 180 along a direction parallel to a surface normal of the plane 148a and/or 148b is low, which is advantageous. A volume of the multi-aperture imaging device can have a low or minimum installation space between the planes 148a and 148b. Along the lateral sides or extension directions of the planes 148a and/or 148b, the installation space of the multi-aperture imaging device can be large or of any size. The volume of the virtual cuboid is, for example, influenced by an arrangement of the image sensor 12, the single-line array 14 and the beam-deflecting means 18, wherein the arrangement of these components can be performed according to the embodiments described herein such that the installation space of these components along the direction perpendicular to the planes and hence the distance of the planes 148a and 148b to one another becomes low or minimum. Compared to other arrangements of the components, the volume and/or the distance of other sides of the virtual cuboid can be enlarged.

The multi-aperture imaging device 180 includes an actuator means 152 for generating a relative movement between the image sensor 12, the single-line array 14 and the beam-deflecting means 18. The actuator means 152 is arranged at least partly between the planes 148a and 148b. The actuator means 152 can be configured to move at least one of the image sensor 12, the single-line array 14 or the beam-deflecting means 18 rotationally around at least one axis and/or translationally along one or several directions. For this, the actuator means 152 can comprise at least one actuator, such as the actuator 128i, 132i and 134 for channel individually changing a relative position between the image sensor area 58i of a respective optical channel 16i, the optics 64i of the respective optical channel 16i and the beam-deflecting means 18 and the respective segment 68i of the same, respectively, or for channel individually changing an optical characteristic 16i or an optical characteristic of the segment 68i of the beam-deflecting means 18 concerning the deflection of the optical path of the respective optical channel. Alternatively or additionally, the actuator means can implement autofocus and/or optical image stabilization as described above.

The actuator means 152 can have a dimension or extension 154 parallel to the thickness direction. A proportion of at the most 50%, at the most 30% or at the most 10% of the dimension 154 can project beyond the plane 148a and/or 148b starting from an area between the planes 148a and 148b or can project from the area. This means that the actuator means 152 at the most projects insignificantly beyond the plane 148a and/or 148b. According to embodiments, the actuator means 152 does not project beyond the planes 148a and 148b. It is an advantage that an extension of the multi-aperture imaging device 180 along the thickness direction is not enlarged by the actuator means 152.

While the 3D multi-aperture imaging device 1000 has been described such that the same comprises a number of at least two multi-aperture imaging devices 11, at least one of the multi-aperture imaging devices can also be implemented as a differing multi-aperture imaging device. Alternatively or additionally, a 3D multi-aperture imaging device 1000 can also comprise more than two multi-aperture imaging devices that can be formed in the same way or in a differing manner. The output signal can comprise a respective data header and/or respective payload information.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable. Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, wherein the computer program is stored on a machine readable carrier.

In other words, an embodiment of the inventive method is, therefore, a computer program comprising a program code for performing one of the methods described herein, when the computer program runs on a computer. A further embodiment of the inventive methods is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

A signal encoded according to the invention, such as an image or video signal, can be stored on a digital memory medium or can be transmitted on a transmission medium, such as a wireless transmission medium or a wired transmission medium, such as the internet.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A 3D multi-aperture imaging device, comprising:
an image sensor with a plurality of image sensor areas, wherein each image sensor area comprises a plurality of pixels;
a first plurality of optical channels for projecting overlapping first partial fields of view of a total field of view on first image sensor areas of the image sensor;
a second plurality of optical channels for projecting second partial fields of view of the total field of view overlapping each other and the first partial fields of view on second image sensor areas of the image sensor, wherein the first and second plurality of optical channels are arranged laterally offset from one another by a base distance;
a processor that is configured to receive image sensor data from the image sensor comprising information on the first and second partial fields of view projected on the first and second plurality of image sensor areas and that is configured to provide an output signal comprising a data header and payload data, wherein the data header comprises information regarding the structure of the 3D multi-aperture imaging device and wherein the payload data comprise image information acquired from the pixels of the first image sensor areas and the second image sensor areas;
wherein the processor is configured to form the output signal such that the data header comprises information regarding a pressure of an atmosphere surrounding the 3D multi-aperture imaging optics, an environmental temperature of the 3D multi-aperture imaging optics and/or an operating temperature of the 3D multi-aperture imaging optics; wherein the 3D multi-aperture imaging device is implemented according to at least one of:
that the processor is configured to form the output signal such that the data header comprises information regarding a number of the first plurality or the second plurality of optical channels;
that the processor is configured to form the output signal such that the data header comprises information regarding a segmentation of the total field of view into the first or second partial fields of view;
that the processor is configured to form the output signal such that the data header comprises information regarding the base distance;
that the processor is configured to form the output signal such that the data header comprises information regarding a defective pixel of the image sensor;
that the processor is configured to compress information on the first and second partial fields of view projected on the first and second plurality of image sensor areas to acquire compressed image data and to form the output signal such that the payload data comprise information regarding the compressed image data;
that the processor is configured to process information on the first and second partial fields of view projected on the first and second plurality of image sensor areas to acquire a total image, and wherein the processor is configured to form the output signal such that the payload data comprise information regarding the total image; and
that the data header or the payload data comprise, pixel by pixel or for pixel clusters, depth data, an indication on a segmentation of pixels towards pixel clusters and/or an indication of depth information and/or distance information regarding pixel clusters.

2. The 3D multi-aperture imaging device according to claim 1, wherein the processor is configured to form the output signal such that the data header comprises information regarding a number of the first plurality or the second plurality of optical channels.

3. The 3D multi-aperture imaging device according to claim 1, wherein the processor is configured to form the output signal such that the data header comprises information regarding a segmentation of the total field of view into the first or second partial fields of view.

4. The 3D multi-aperture imaging device according to claim 1 with a first image capturing module comprising the first plurality of optical channels and with at least one second image capturing module comprising the second plurality of optical channels, wherein the processor is configured to form the output signal such that the data header comprises information regarding a number of image capturing modules of the 3D multi-aperture imaging device.

5. The 3D multi-aperture imaging device according to claim 1, wherein the processor is configured to form the output signal such that the data header comprises, at least for a first image sensor area, information regarding a number of pixels concerning a first image extension direction and a number of pixels for a second image extension direction.

6. The 3D multi-aperture imaging device according to claim 1, wherein the processor is configured to form the output signal such that the data header comprises, for at least one of the optical channels, information regarding a spatial coordinate of the at least one optical channel in the 3D multi-aperture imaging device.

7. The 3D multi-aperture imaging device according to claim 1, wherein the processor is configured to form the output signal such that the data header comprises information regarding the base distance.

8. The 3D multi-aperture imaging device according to claim 1, wherein the processor is configured to form the output signal such that the data header comprises information regarding a field angle of at least one optical channel or that the data header comprises information regarding a central field area and an extension of the field along a first and second field of view extension direction.

9. The 3D multi-aperture imaging device according to claim 1, wherein the processor is configured to form the output signal such that the data header comprises information regarding a pixel size of at least one of the pixels of one of the first or second image sensor areas.

10. The 3D multi-aperture imaging device according to claim 1, wherein the processor is configured to form the output signal such that the data header comprises information regarding a distortion of at least one optical channel of the 3D multi-aperture imaging device.

11. The 3D multi-aperture imaging device according to claim 1, wherein the processor is configured to form the output signal such that the data header comprises information regarding vignetting of at least one optical channel of the 3D multi-aperture imaging device.

12. The 3D multi-aperture imaging device according to claim 1, wherein the processor is configured to form the output signal such that the data header comprises information regarding a defective pixel of the image sensor.

13. The 3D multi-aperture imaging device according to claim 1, wherein the processor is configured to form the output signal such that the payload data comprise information regarding a line break or a column break of the captured image.

14. The 3D multi-aperture imaging device according to claim 1, wherein the processor is configured to compress information on the first and second partial fields of view projected on the first and second plurality of image sensor areas to acquire compressed image data and to form the output signal such that the payload data comprise information regarding the compressed image data.

15. The 3D multi-aperture imaging device according to claim 1, wherein the processor is configured to process information on the first and second partial fields of view projected on the first and second plurality of image sensor areas to acquire a total image, and wherein the processor is configured to form the output signal such that the payload data comprise information regarding the total image.

16. The 3D multi-aperture imaging device according to claim 1, wherein the first plurality of optical channels is arranged in a first single-line array and wherein the second plurality of optical channels is arranged in a second single-line array.

17. The 3D multi-aperture imaging device according to claim 1, wherein the processor is configured to form the output signal such that the data header comprises information regarding the base distance and information regarding a segmentation of the total field of view into the first of second partial fields of view and to form the output signal such that the payload data comprise, for each first image sensor area, information on the image captured in the image sensor area and, for each second image sensor area, information on the image captured in the image sensor area.

18. The 3D multi-aperture imaging device according to claim 1, wherein the first plurality of optical channels forms a first one-dimensional array arranged along a first direction, while the first partial fields of view of the total field of view form a second one-dimensional array arranged along a second direction perpendicular to the first direction; and
the second plurality of optical channels forms a third one-dimensional array arranged along the first direction.

19. The 3D multi-aperture imaging device according to claim 1, further comprising:
a memory for storing the output signal; or
a data interface for outputting the output signal.

20. The 3D multi-aperture imaging device according to claim 1, further comprising a third plurality of optical channels for projecting third partial fields of view of the total field of view overlapping each other and the first partial fields of view on third image sensor areas of the image sensor, wherein the first and second plurality of optical channels are arranged laterally offset from one another by a base distance;
wherein the processor is configured to receive image sensor data from the image sensor which comprise information on the third partial fields of view projected on the third plurality of image sensor areas, and is configured to provide the output signal such that the payload data comprise image information acquired from the pixels of the first image sensor areas, the second image sensor areas and the third image sensor areas.

21. The 3D multi-aperture imaging device according to claim 1, wherein the data header or the payload data comprise, pixel by pixel or for pixel clusters, depth data, an indication on a segmentation of pixels towards pixel clusters and/or an indication of depth information and/or distance information regarding pixel clusters.

22. A non-transitory storage medium having stored thereon information representing a signal, the signal comprising:
a data header comprising information regarding a structure of a 3D multi-aperture imaging device, wherein the data header comprises information regarding a pressure of an atmosphere surrounding the 3D multi-aperture imaging optics, an environmental temperature of the 3D multi-aperture imaging optics and/or an operating temperature of the 3D multi-aperture imaging optics; and
payload data comprising image information acquired from pixels of first image sensor areas and second image sensor areas of the 3D multi-aperture imaging device, wherein the image information of the first and second image sensor areas each relate to a plurality of partial fields of view of a total field of view; wherein the signal comprises at least one of:
in the data header, information regarding a number of the first plurality or the second plurality of optical channels;
in the data header, information regarding a segmentation of the total field of view into the first or second partial fields of view;
in the data header, information regarding the base distance;
in the data header, information regarding a defective pixel of the image sensor;
in the payload data, information regarding compressed image data;
in the payload data, information regarding a total image being acquired by processing information on first and second partial fields of view projected on first and second plurality of image sensor areas; and
in the data header or in the payload data, pixel by pixel or for pixel clusters, depth data, an indication on a segmentation of pixels towards pixel clusters and/or an indication of depth information and/or distance information regarding pixel clusters.

23. A device for processing an input signal comprising a data header and payload data, wherein the data header comprises information regarding a structure of a 3D multi-aperture imaging device, wherein the data header comprises information regarding a pressure of an atmosphere surrounding the 3D multi-aperture imaging optics, an environmental temperature of the 3D multi-aperture imaging optics and/or an operating temperature of the 3D multi-aperture imaging optics and wherein the payload data comprise image information acquired from pixels of first image sensor areas and second image sensor areas, wherein the image information of the first and second image sensor areas each relate to a plurality of partial fields of view of a total field of view, the device comprising:
  an input interface for receiving the input signal; and
  a processor for processing the payload data by considering the information regarding the structure of the 3D multi-aperture imaging device for at least first image sensor information of a first partial field of view of the partial fields of view and a second partial field of view of the partial fields of view;
  wherein the processor is implemented for at least one of:
  that the processor is configured to form the output signal such that the data header comprises information regarding a number of the first plurality or the second plurality of optical channels;
  that the processor is configured to form the output signal such that the data header comprises information regarding a segmentation of the total field of view into the first or second partial fields of view;
  that the processor is configured to consider information regarding the base distance contained in the data header;
  that the processor is configured to consider information regarding a defective pixel of the image sensor contained in the data header;
  that the processor is configured to consider information regarding compressed image data contained in the payload data;
  that the processor is configured to consider information regarding a total image contained in the payload data, the total image being acquired based on first and second partial fields of view projected on first and second plurality of image sensor areas; and
  that the processor is configured to consider pixel by pixel or for pixel clusters, depth data, an indication on a segmentation of pixels towards pixel clusters and/or an indication of depth information and/or distance information regarding pixel clusters contained in the data header or the payload data.

24. A method for providing an output signal of a 3D multi-aperture imaging device comprising:
  providing an image sensor with a plurality of image sensor areas, wherein each image sensor area comprises a plurality of pixels;
  providing a first plurality of optical channels for projecting overlapping first partial fields of view of a total field of view on first image sensor areas of the image sensor;
  providing a second plurality of optical channels for projecting second partial fields of view of the total field of view overlapping each other and the first partial fields of view on second image sensor areas of the image sensor, wherein the first and the second plurality of optical channels are arranged such that the same are laterally offset from one another by a base distance;
  receiving image sensor data from the image sensor that comprise information on the first and second partial fields of view projected on the first and second plurality of image sensor areas; and
  generating the output signal, such that the output signal comprises a data header and payload data, such that the data header comprises information regarding the structure of the 3D multi-aperture imaging device and such that the payload data comprise image information acquired from the pixels of the first image sensor area and the second image sensor area;
  wherein the data header comprises information regarding a pressure of an atmosphere surrounding the 3D multi-aperture imaging optics, an environmental temperature of the 3D multi-aperture imaging optics and/or an operating temperature of the 3D multi-aperture imaging optics; wherein the output signal is provided according to at least one of:
  such that the data header comprises information regarding a number of the first plurality or the second plurality of optical channels;
  such that the data header comprises information regarding a segmentation of the total field of view into the first or second partial fields of view;
  such that the data header comprises information regarding the base distance;
  such that the data header comprises information regarding a defective pixel of the image sensor;
  information on the first and second partial fields of view projected on the first and second plurality of image sensor areas is compressed to acquire compressed image data and that the output signal is formed such that the payload data comprise information regarding the compressed image data;
  information on the first and second partial fields of view projected on the first and second plurality of image sensor areas is processed to acquire a total image, and the output signal is formed such that the payload data comprise information regarding the total image; and
  that the data header or the payload data comprise, pixel by pixel or for pixel clusters, depth data, an indication on a segmentation of pixels towards pixel clusters and/or an indication of depth information and/or distance information regarding pixel clusters.

* * * * *